US012100981B2

(12) United States Patent
Furui et al.

(10) Patent No.: US 12,100,981 B2
(45) Date of Patent: Sep. 24, 2024

(54) POWER TOOL SYSTEM HAVING RECEPTACLE FOR WIRELESS COMMUNICATION ADAPTER

(71) Applicant: MAKITA CORPORATION, Anjo (JP)

(72) Inventors: Nobuyasu Furui, Anjo (JP); Hitoshi Suzuki, Anjo (JP); Masaaki Fukumoto, Anjo (JP); Takuya Umemura, Anjo (JP); Kosuke Ito, Anjo (JP); Hitoshi Sengiku, Anjo (JP); Shuji Yoshikawa, Anjo (JP); Tatsuya Nagahama, Anjo (JP)

(73) Assignee: MAKITA CORPORATION, Anjo (JP)

( * ) Notice: Subject to any disclaimer, the term of this patent is extended or adjusted under 35 U.S.C. 154(b) by 0 days.

(21) Appl. No.: 18/208,958

(22) Filed: Jun. 13, 2023

(65) Prior Publication Data

US 2023/0336010 A1    Oct. 19, 2023

Related U.S. Application Data

(60) Division of application No. 17/393,780, filed on Aug. 4, 2021, now Pat. No. 11,721,990, which is a division
(Continued)

(51) Int. Cl.
*H02J 7/00* (2006.01)
*B25F 3/00* (2006.01)
(Continued)

(52) U.S. Cl.
CPC .............. *H02J 7/0042* (2013.01); *B25F 3/00* (2013.01); *B25F 5/00* (2013.01); *B25F 5/02* (2013.01);
(Continued)

(58) Field of Classification Search
USPC ........................................................ 320/112
See application file for complete search history.

(56) References Cited

U.S. PATENT DOCUMENTS

| 2,383,379 A | 8/1945 | Forss |
| 3,629,680 A | 12/1971 | Baynes et al. |

(Continued)

FOREIGN PATENT DOCUMENTS

| CN | 101305404 A | 11/2008 |
| CN | 102097836 A | 6/2011 |

(Continued)

OTHER PUBLICATIONS

Communication from the European Patent Office dated Dec. 9, 2015 in related EP application No. 12 775 059.4, including grounds for rejection and examined claims 1-14.
(Continued)

*Primary Examiner* — Mohammed Alam
(74) *Attorney, Agent, or Firm* — J-TEK LAW PLLC; Jeffrey D. Tekanic; Scott T. Wakeman

(57) ABSTRACT

A power tool includes a motor and a controller in a power tool housing. A battery pack interface is defined on and/or in the power tool housing. A receptacle is defined on and/or in the power tool housing to removably accommodate a wireless communication adapter such that the wireless communication adapter is disposed entirely within a shell of the power tool and no portion of the wireless communication adapter extends beyond an outer contour of the power tool housing. At least one communication terminal is disposed within the receptacle and is electrically connectable to the wireless communication adapter. The controller outputs to the at least one communication terminal a signal indicating a charge level of a battery pack attached to the battery pack interface, a number of hours of operation of the power tool,
(Continued)

a power tool overheated alert, and/or a battery pack overloaded alert.

20 Claims, 39 Drawing Sheets

Related U.S. Application Data of application No. 16/923,347, filed on Jul. 8, 2020, now Pat. No. 11,114,870, which is a continuation of application No. 16/508,950, filed on Jul. 11, 2019, now Pat. No. 10,749,360, which is a continuation of application No. 15/689,725, filed on Aug. 29, 2017, now Pat. No. 10,396,573, which is a continuation of application No. 14/233,792, filed as application No. PCT/JP2012/004684 on Jul. 24, 2012, now Pat. No. 9,780,583.

(60) Provisional application No. 61/593,533, filed on Feb. 1, 2012, provisional application No. 61/581,950, filed on Dec. 30, 2011, provisional application No. 61/564,513, filed on Nov. 29, 2011, provisional application No. 61/511,092, filed on Jul. 24, 2011.

(51) Int. Cl.
*B25F 5/00* (2006.01)
*B25F 5/02* (2006.01)
*G05B 13/02* (2006.01)
*G08C 17/02* (2006.01)

(52) U.S. Cl.
CPC ........... *G05B 13/024* (2013.01); *G08C 17/02* (2013.01); *H02J 7/00* (2013.01)

(56) References Cited

U.S. PATENT DOCUMENTS

| | | |
|---|---|---|
| 4,677,362 A | 6/1987 | Lawrence |
| 4,827,534 A | 5/1989 | Haugen |
| 5,109,540 A | 4/1992 | Dzung et al. |
| 5,680,026 A | 10/1997 | Lueschen |
| 5,809,432 A | 9/1998 | Yamashita |
| 5,914,585 A | 6/1999 | Grabon |
| 6,043,626 A | 3/2000 | Snyder et al. |
| 6,154,007 A | 11/2000 | Shaver et al. |
| 6,502,949 B1 | 1/2003 | Horiyama et al. |
| 6,536,536 B1 | 3/2003 | Gass et al. |
| 6,577,104 B2 | 6/2003 | Sakakibara |
| 6,607,041 B2 | 8/2003 | Suzuki et al. |
| 6,803,744 B1 | 10/2004 | Sabo |
| 6,845,279 B1 | 1/2005 | Gilmore et al. |
| 6,870,089 B1 | 3/2005 | Gray |
| 6,872,121 B2 | 3/2005 | Wiesner et al. |
| 6,920,050 B2 | 7/2005 | Little et al. |
| 7,030,590 B2 | 4/2006 | Sakakibara et al. |
| 7,053,567 B2 | 5/2006 | Yamamoto |
| 7,064,520 B2 | 6/2006 | Heigl et al. |
| 7,182,150 B2 | 2/2007 | Grossman |
| 7,185,998 B2 | 3/2007 | Oomori et al. |
| 7,227,335 B2 | 6/2007 | Sakakibara et al. |
| 7,273,159 B2 | 9/2007 | Brotto |
| 7,357,526 B2 | 4/2008 | Zeiler |
| 7,394,347 B2 | 7/2008 | Kady |
| 7,443,137 B2 | 10/2008 | Scott et al. |
| 7,540,334 B2 | 6/2009 | Gass et al. |
| 7,641,518 B2 | 1/2010 | Lee et al. |
| RE41,160 E | 3/2010 | Gilmore et al. |
| 7,784,104 B2 | 8/2010 | Innami et al. |
| 7,863,862 B2 | 1/2011 | Idzik et al. |
| 7,942,084 B2 | 5/2011 | Wilson et al. |
| 8,062,060 B2 | 11/2011 | Rejman |
| D659,636 S | 5/2012 | Okuda et al. |
| 8,169,298 B2 | 5/2012 | Wiesner et al. |
| 8,319,376 B2 | 11/2012 | Kitamura et al. |
| 8,912,751 B2 | 12/2014 | Suzuki et al. |
| 8,919,456 B2 | 12/2014 | Ng et al. |
| 9,049,641 B2 | 6/2015 | Wible et al. |
| 9,189,663 B2 | 11/2015 | Goren et al. |
| 9,256,988 B2 | 2/2016 | Wenger et al. |
| 9,367,062 B2 | 6/2016 | Volpert |
| 9,537,335 B2 | 1/2017 | Furui et al. |
| 9,713,116 B2 | 7/2017 | Wible et al. |
| 9,746,860 B2 | 8/2017 | Sakaue et al. |
| 9,756,402 B2 | 9/2017 | Stampfl et al. |
| 9,780,583 B2 | 10/2017 | Furui et al. |
| 10,396,573 B2 | 8/2019 | Furui et al. |
| 11,007,633 B2 | 5/2021 | Brennenstuhl et al. |
| 2001/0010455 A1 | 8/2001 | Brotto et al. |
| 2001/0017531 A1 | 8/2001 | Sakakibara et al. |
| 2002/0122707 A1 | 9/2002 | Sakai et al. |
| 2002/0149346 A1 | 10/2002 | Sakakibara |
| 2002/0156537 A1 | 10/2002 | Sakakibara et al. |
| 2002/0157080 A1 | 10/2002 | Kato et al. |
| 2002/0162086 A1 | 10/2002 | Morgan |
| 2003/0030342 A1* | 2/2003 | Chen ............... H02K 21/24 310/40 MM |
| 2003/0090239 A1* | 5/2003 | Sakakibara ......... H02J 50/80 320/166 |
| 2003/0107470 A1 | 6/2003 | Kady |
| 2003/0182916 A1 | 10/2003 | Iida et al. |
| 2003/0203669 A1 | 10/2003 | Glauning |
| 2004/0069920 A1 | 4/2004 | Dirks |
| 2004/0070369 A1 | 4/2004 | Sakakibara |
| 2004/0117744 A1 | 6/2004 | Nation et al. |
| 2004/0144552 A1 | 7/2004 | Suzuki et al. |
| 2004/0160212 A1 | 8/2004 | Mastaler et al. |
| 2005/0011655 A1 | 1/2005 | Crowell et al. |
| 2005/0017686 A1 | 1/2005 | Sakakibara et al. |
| 2005/0069391 A1 | 3/2005 | Dils et al. |
| 2005/0075149 A1 | 4/2005 | Gerber et al. |
| 2005/0111214 A1 | 5/2005 | Zeiler |
| 2005/0173142 A1 | 8/2005 | Cutler et al. |
| 2005/0197093 A1 | 9/2005 | Wiklof et al. |
| 2005/0267998 A1 | 12/2005 | Ferguson et al. |
| 2006/0096771 A1 | 5/2006 | Brotto |
| 2006/0112572 A1 | 6/2006 | Mccambridge et al. |
| 2006/0142894 A1 | 6/2006 | Tsuchiya et al. |
| 2006/0155582 A1 | 7/2006 | Brown |
| 2006/0244414 A1 | 11/2006 | Lay |
| 2007/0170220 A1 | 7/2007 | Fragassi |
| 2007/0174805 A1 | 7/2007 | Hsu et al. |
| 2007/0224492 A1 | 9/2007 | Scott et al. |
| 2007/0252553 A1 | 11/2007 | Mori et al. |
| 2007/0276457 A1 | 11/2007 | Gordon |
| 2008/0008928 A1 | 1/2008 | Partin et al. |
| 2008/0135272 A1 | 6/2008 | Wallgren |
| 2008/0150474 A1 | 6/2008 | Ball et al. |
| 2008/0238609 A1* | 10/2008 | Wiesner ............... B25F 5/00 173/217 |
| 2008/0309285 A1 | 12/2008 | Choksi et al. |
| 2009/0096430 A1 | 4/2009 | Van Der et al. |
| 2009/0108806 A1 | 4/2009 | Takano et al. |
| 2009/0145621 A1 | 6/2009 | Lau et al. |
| 2009/0291330 A1 | 11/2009 | Onnerud et al. |
| 2010/0062326 A1 | 3/2010 | Konuma et al. |
| 2010/0096151 A1 | 4/2010 | Östling |
| 2010/0134984 A1 | 6/2010 | Lum et al. |
| 2010/0171367 A1 | 7/2010 | Kitamura et al. |
| 2010/0216415 A1 | 8/2010 | Arimura et al. |
| 2010/0283599 A1 | 11/2010 | Ma et al. |
| 2011/0111796 A1 | 5/2011 | Sobti et al. |
| 2011/0121782 A1 | 5/2011 | Marsh et al. |
| 2011/0140654 A1 | 6/2011 | Osswald et al. |
| 2011/0148344 A1 | 6/2011 | Manor et al. |
| 2011/0189512 A1 | 8/2011 | Onnerud et al. |
| 2011/0197389 A1 | 8/2011 | Ota et al. |
| 2012/0035804 A1 | 2/2012 | Roberts |
| 2012/0104991 A1 | 5/2012 | Suzuki et al. |
| 2012/0104992 A1 | 5/2012 | Suzuki et al. |
| 2012/0111589 A1 | 5/2012 | Schmidt et al. |
| 2012/0170204 A1 | 7/2012 | Ahn et al. |

(56) References Cited

U.S. PATENT DOCUMENTS

| | | |
|---|---|---|
| 2012/0238119 A1 | 9/2012 | Rejman et al. |
| 2012/0267134 A1 | 10/2012 | Matthias et al. |
| 2012/0292070 A1 | 11/2012 | Ito et al. |
| 2013/0044002 A1 | 2/2013 | Schneider et al. |
| 2013/0141519 A1 | 6/2013 | Sayeed et al. |
| 2013/0154584 A1 | 6/2013 | Sakaue et al. |
| 2013/0193891 A1 | 8/2013 | Wood et al. |
| 2013/0200831 A1 | 8/2013 | Nakano et al. |
| 2013/0295426 A1 | 11/2013 | Halavart et al. |
| 2013/0327552 A1 | 12/2013 | Lovelass et al. |
| 2013/0342638 A1 | 12/2013 | Sobti et al. |
| 2013/0344917 A1 | 12/2013 | Sobti et al. |
| 2014/0103858 A1 | 4/2014 | Bertsch et al. |
| 2014/0151079 A1* | 6/2014 | Furui .................. H02J 7/0042 173/171 |
| 2014/0159640 A1 | 6/2014 | Yoshikawa et al. |
| 2014/0159919 A1 | 6/2014 | Furui et al. |
| 2014/0159920 A1 | 6/2014 | Furui et al. |
| 2014/0240125 A1 | 8/2014 | Burch et al. |
| 2014/0292245 A1 | 10/2014 | Suzuki et al. |
| 2014/0326477 A1 | 11/2014 | Thorson et al. |
| 2014/0367134 A1 | 12/2014 | Phillips et al. |
| 2015/0054447 A1 | 2/2015 | Suzuki et al. |
| 2015/0054464 A1 | 2/2015 | Suzuki et al. |
| 2015/0171638 A1 | 6/2015 | Huang |
| 2016/0171788 A1 | 6/2016 | Wenger et al. |
| 2016/0311094 A1* | 10/2016 | Mergener .............. B25B 21/008 |
| 2017/0008159 A1 | 1/2017 | Boeck et al. |
| 2017/0054305 A1 | 2/2017 | Kidakarn |
| 2018/0076639 A1* | 3/2018 | Furui ........................ B25F 3/00 |
| 2019/0334357 A1 | 10/2019 | Furui et al. |
| 2022/0102995 A1* | 3/2022 | Fieldbinder ............. H02J 50/12 |

FOREIGN PATENT DOCUMENTS

| | | |
|---|---|---|
| DE | 4204420 A | 8/1993 |
| DE | 9311901 | 12/1993 |
| DE | 10127821 C1 | 7/2002 |
| DE | 202006014606 | 1/2007 |
| DE | 102008060703 A | 6/2009 |
| DE | 102009045946 A | 4/2011 |
| EP | 1251618 A | 10/2002 |
| EP | 1690648 A | 8/2006 |
| EP | 1852760 A | 11/2007 |
| EP | 2072192 A | 6/2009 |
| GB | 2386746 A | 9/2003 |
| GB | 2420487 A | 5/2006 |
| JP | S61106033 A | 5/1986 |
| JP | S61142372 U | 9/1986 |
| JP | H10275635 A | 10/1998 |
| JP | 2000123803 A | 4/2000 |
| JP | 2001069686 A | 3/2001 |
| JP | 2002260611 A | 9/2002 |
| JP | 2003311659 A | 11/2003 |
| JP | 2004181549 A | 7/2004 |
| JP | 2005073350 A | 3/2005 |
| JP | 2005278375 A | 10/2005 |
| JP | 2008005573 A | 1/2008 |
| JP | 2008236881 A | 10/2008 |
| JP | 2009033807 A | 2/2009 |
| JP | 2009535007 A | 9/2009 |
| JP | 2009262254 A | 11/2009 |
| JP | 2010206871 A | 9/2010 |
| JP | 2010226890 A | 10/2010 |
| JP | 2011034793 | 2/2011 |
| JP | 2011131377 A | 7/2011 |
| JP | 4835697 B2 | 12/2011 |
| JP | 5569717 B2 | 8/2014 |
| WO | 9907079 A1 | 2/1999 |
| WO | 0180396 A1 | 10/2001 |
| WO | 0241465 A | 5/2002 |
| WO | 2006044693 A | 4/2006 |
| WO | 2007042924 A | 4/2007 |
| WO | 2007058596 A | 5/2007 |
| WO | 2007121533 A | 11/2007 |
| WO | 2008088266 A1 | 7/2008 |
| WO | 2011032803 A | 3/2011 |
| WO | 2012017833 A1 | 2/2012 |
| WO | 2012123210 A | 9/2012 |
| WO | 2012056672 A3 | 11/2012 |
| WO | 2015061370 A1 | 4/2015 |

OTHER PUBLICATIONS

Extended European Search Report from the European Patent Office dated Mar. 25, 2015 in related EP application No. 12 775 059.4, including Search Opinion, Search Report and examined claims 1-15.

Office Action from the Chinese Patent Office dated Jul. 17, 2015 in related Chinese application No. 201280036859.7, and translation thereof.

Office Action from the Chinese Patent Office dated Mar. 14, 2016 in related Chinese application No. 201280036859.7, and translation thereof.

Office Action from the Chinese Patent Office mailed Sep. 5, 2016 in related Chinese application No. 201280036859.7, and translation of substantive portions thereof.

Office Action from the Japanese Patent Office dated Jun. 7, 2016 in related Japanese application No. 2014-503343, and translation of substantive portions thereof.

Office Action from the Japanese Patent Office mailed Nov. 15, 2016 in related Japanese application No. 2014-503343, and translation of substantive portions thereof.

Office Action from the United States Patent Office mailed Jun. 20, 2016 in related U.S. Appl. No. 14/233,804.

Office Action from the United States Patent Office mailed May 1, 2018 in related U.S. Appl. No. 15/402,584, including examined claims 1-2, 3, 5, 7-18, 20, 61-64.

International Search Report and Written Opinion mailed Apr. 19, 2013 in parent application No. PCT/JP2012/004684.

\* cited by examiner

POWER TOOL SYSTEM HAVING RECEPTACLE FOR WIRELESS COMMUNICATION ADAPTER

CROSS-REFERENCE

This application is a divisional of U.S. patent application no. 17/393,780 filed on Aug. 4, 2021, now pending, which was a divisional of U.S. patent application no. 16/923,347 filed on Jul. 8, 2020, now U.S. Pat. No. 11,114,870, which was a continuation of U.S. patent application no. 16/508,950 filed on Jul. 11, 2019, now U.S. Pat. No. 10,749,360, which was a continuation of U.S. patent application No. 15/689,725 filed on Aug. 29, 2017, now U.S. Pat. No. 10,396,573, which was a continuation of U.S. patent application No. 14/233,792 filed on Jan. 20, 2014, now U.S. Pat. No. 9,780,583, which is the U.S. National Stage of International Application No. PCT/JP2012/004684 filed on Jul. 24, 2012, which claims priority to U.S. Provisional Application No. 61/511,092 filed on Jul. 24, 2011, No. 61/564,513 filed on Nov. 29, 2011, No. 61/581,950 filed on Dec. 30, 2011, and No. 61/593,533 filed on February 1, 2012, the contents of all of which are hereby incorporated by reference as if fully set forth herein.

TECHNICAL FIELD

The present invention generally relates to portable battery pack charging systems for charging the battery pack of a power tool system, methods for recharging the battery pack and adapters for use with the portable battery pack charging systems.

BACKGROUND ART

Electronic adapters for use with power tools are generally known in the art.

For example, U.S. Pat. No. 7,357,526 discloses a power tool and accessory (adapter) combination. The power tool has multiple terminals to which a battery pack or battery assembly can be connected. The accessory (adapter) can be electrically connected to an unused tool terminal that is otherwise engageable by a battery pack.

U.S. Pat. No. 6,502,949 discloses an adapter designed to be interposed between a power tool and a battery pack. The adapter includes an additional device for use with the power tool, such as a light, a dust collector or a hook.

U.S. Pat. No. 6,577,104 discloses an adapter that connects a power tool to a battery pack and provides a warning function in order to inform the user when the battery pack requires recharging.

U.S. Pat. No. 7,030,590 discloses an adapter that includes a first electrical contact that connects with a battery pack, a second electrical contact that connects with a battery charger and a discharging circuit for discharging the rechargeable batteries.

U.S. Pat. No. 7,227,335 discloses an adaptor having a battery diagnosing device that is interposed between a charging device and a rechargeable battery pack.

Furthermore, US 2001/0010455 A1 discloses a battery pack for a power tool having a memory for storing use profile information concerning the battery, a reader for uploading the use profile information from the battery or the power tool and a computer for uploading and analyzing the user profile information uploaded from the reader.

US 2006/0142894 A1 discloses an assist apparatus that connects to a memory located in the power tool to read information stored therein concerning the model or specification of the power tool and a use record. The assist apparatus then determines whether the power tool is suitable for the work description for which the power tool is used or not by using this information. The assist device presents the power tool suitable for the work description when the power tool is determined not to be suitable for the work description.

US 2003/0182916 A1 discloses a power tool having a microcontroller and a memory that can calculate and store a degree of wear of the power tool as a function of sensor inputs. When maintenance is performed, the memory can be read out in order to determine whether any parts have exceeded a predetermined degree of wear.

SUMMARY

It is an object of the present teachings to provide improved portable charging systems, as well as methods and adapters for use in recharging a battery pack of a power tool.

In one aspect of the present teachings, an adapter preferably includes one or more battery terminals configured or adapted to connect to one or more charging terminals of a charger. According to this aspect of the present teachings, the adapters may be configured to conduct a charging current from the charger to the battery pack, e.g., while the battery pack is connected to the power tool.

In another aspect of the present teachings, the charger is preferably portable and may include a self-contained power supply, such as one or more rechargeable battery cells. A means for attaching the charger to a user or a means for carrying the charger may also be provided, such as a harness, strap, belt or a back pack. In this case, the charger may be worn by the user while the user is performing power tool operations.

The charger and adapter may be configured to continuously supply a charging current to the battery pack, when necessary, or the charger and adapter may be configured to supply the charging current to the battery pack when the user attaches the battery terminals of the adapter to the charging terminals of the charger. For example, the adapter may be provided with a belt hook that includes the battery terminals. The charging terminals of the charger may be provided on, in or adjacent a belt worn by the user. Thus, when the user hangs the power tool on the tool belt, charging current may be automatically supplied to the battery pack via the adapter, if necessary.

A charging control circuit for determining whether charging current should be supplied to the rechargeable battery cell(s) of the battery pack and, if so, the amount and voltage of the charging current, may be located in the adapter, in the charger or even in the battery pack.

Furthermore, a method for charging the battery pack while it is connected to the power tool is provided. The charger is preferably worn by or attached to the user and charging operations can be performed every time (if necessary) the user hangs the power tool on his/her tool belt. The power for the charging may be communicated from the charger to the battery pack either via a wired connection or wirelessly.

In other words, the adapter may include at least one input terminal for receiving or conducting a charging current from a source of energy/power, such as a charger or another DC power supply, such as another rechargeable battery pack. In this embodiment, adapter enables the user to charge the battery pack while the battery pack is attached to the power tool.

Preferably, the charger may be a cordless charger that includes or is attached to a self-contained power supply, such as a rechargeable battery.

In another aspect of the present teachings, an (the) adapter for a battery-powered tool may include, in addition or in the alternative to the any of the preceding or following circuitry or functionality, a controller, such as at least one central processing unit (CPU), e.g., one or more microprocessors, and at least one memory and/or storage device in communication therewith. The adapter also may include one or more communication devices configured or adapted to access a memory and/or storage device located in the power tool, in the battery pack or in both the power tool and the battery pack. More preferably, the adapter includes circuitry configured or adapted to read data stored in such a memory and/or storage device and/or to write data to such memory and/or storage device.

Further, the adapter may be configured or adapted to facilitate a communication path of a power tool system containing the adapter that is: battery pack—power tool —adapter.

In such an arrangement, the adapter is not required to contain wiring for conducting current between the battery pack and the power tool, thereby minimizing space and manufacturing requirements. In addition or in the alternative, the adapter can be adapted or configured to be more firmly or fixedly attached to the power tool than conventional adapters, so that the adapter will not be readily dislodged from the power tool during operation.

In a preferred embodiment of this aspect of the present teachings, each of the battery pack, power tool and adapter preferably comprises at least one controller, such as at least one microprocessor or microcontroller. In this case, the adapter controller(s) preferably communicates with the battery pack controller(s) via the power tool controller(s) and thus the adapter controller(s) indirectly communicate(s) with the battery pack controller(s).

In further exemplary embodiments of this aspect of the present teachings, the adapter may be configured or adapted to read and/or write one or more of the following types of data or information from/to the memory or memories of the power tool and/or the battery pack:
a) one or more control programs and/or data for the power tool and/or the battery pack, and/or
b) management information for the power tool and/or the battery pack, and/or
c) information indicative of the status of the battery pack and/or power tool, such as the charge/discharge state of the battery pack, remaining battery capacity, a measured or detected value relating to current, voltage, temperature, etc., the number of additional power tool operations that can be performed using the remaining battery capacity, and/or
d) one or more values relating to operational parameters of the battery pack and/or the power tool, such as charging speed, maximum current limit, maximum temperature threshold, maximum charged level of the battery cell(s), etc., and/or
e) maintenance information, such as usage history, service history and information concerning when to replace one or more worn parts, including any of the below-described maintenance information.

In another aspect of the present teachings, the adapter may include, in addition or in the alternative to the any of the preceding or following circuitry or functionality, means for wirelessly communicating with an external device, e.g., an external device that comprises a data input device, a controller (computing means) and/or a display. As will be further discussed below, the wireless communication protocol is not particularly limited according to the present teachings.

In this aspect of the present teachings, the adapter may be further configured or adapted to transmit maintenance information, which concerns the power tool and/or the battery pack, to the external device. The adapter may also optionally be configured or adapted to store and/or display such maintenance information.

The maintenance information may be one, or any combination of two or more, of:
  (i) the date of the last maintenance check/inspection,
  (ii) the result of the last maintenance check/inspection,
  (iii) the accumulated or total usage (operation) time of the power tool and/or the battery pack,
  (iv) the available charge or charge status (remaining battery capacity) of the battery pack,
  (v) the number of charging cycles experienced by the battery pack,
  (vi) the condition of one or more battery cells in the battery pack, e.g., as calculated from an internal impedance measurement of the battery cell(s),
  (vii) the expected remaining service life of one or more replaceable parts in the power tool and/or the battery pack,
  (viii) a maintenance schedule for the power tool and/or the adapter and/or the battery pack,
  (ix) a usage history of the power tool and/or the adapter and/or the battery pack,
  (x) a name of a person responsible for administering or managing the adapter, battery pack and/or power tool,
  (xi) a serial number of the battery pack and/or the power tool,
  (xii) the voltage of one or more (e.g., either individually or a summation of two or more) battery cell(s),
  (xiii) the discharge current of one or more (e.g., either individually or a summation of two or more) battery cell(s),
  (xiv) the temperature of one or more (e.g., either individually or a summation of two or more) battery cell(s),
  (xv) the number of times that the battery pack and/or the power tool has been switched ON and/or OFF, and/or
  (xvi) the amount of charging or discharging that has occurred within a predetermined time period (e.g., the amount of discharged power during the previous 2 hours).

Power tools according to this aspect of the present teachings can be manufactured with a base set of electrical functions and then the user can easily select one or more additional electronic functions to add to the power tool by attaching the appropriate adapter (i.e. an adapter equipped with the desired functionality). In particular, the detachable adapter may communicate one or more of the above-mentioned types of maintenance information concerning the power tool.

Thus, in this aspect of the present teachings, power tools can be advantageously provided with one or more additional functions that are user-specific. In addition or the alternative, by providing a plurality of adapters that each perform at least one different function from the other(s), a range of functions can be provided to the power tool in an exchangeable manner.

Representative, but not limiting, examples of additional functions that may be implemented in the adapters according to this aspect of the present teachings include:

wirelessly communicating information to and/or from the power tool, such as any of the information identified above or below, including wirelessly communicating with an external device, such as a base station, a workstation, a computer, a personal data assistant, a smart phone, etc., displaying information concerning the power tool on a display, such as any of the information identified above or below, measuring and/or displaying and/or communicating the remaining battery capacity of the battery pack and/or the estimated number of additional power tool operations of the same type that can be performed with the remaining battery capacity, measuring and/or displaying and/or communicating the value(s) of one or more operating parameters, e.g., a maximum current limit, stored in a memory of the battery pack and/or the power tool, measuring and/or displaying and/or communicating a detected discharge current and/or power tool recommendation, providing an anti-theft function or key, identifying or communicating the person responsible for administering or managing the adapter, battery pack and/or power tool, inputting and/or displaying and/or communicating information concerning a change of the charging speed of the battery pack, measuring and/or displaying and/or communicating value(s) indicative of the operational state of the battery pack and/or the power tool, and/or any other function described in U.S. Provisional Application No. 61/511,092, which additional functions are incorporated herein by reference.

The above-identified and below-described functions are intended to be described individually for written description purposes, such that any one, or any arbitrary combination of two or more, may be selected, separate from the others, for further amendments of the description or claims.

In a preferred embodiment of the above-noted aspect of the present teachings, the power tool system comprises a plurality of hand-held power tools, and each adapter is preferably adapted or configured to attach to the housing of any one of the hand-held power tools and provide a different or additional function to the hand-held power tool.

In another aspect of the present teachings, in addition or in the alternative to the any of the preceding or following circuitry or functionality, a power tool system preferably includes a hand-held power tool comprising a housing having a battery pack interface, an electrically-driven device and a first connector. A battery pack is adapted or configured to be detachably attached, e.g., directly, to the battery pack interface and to supply current to the electrically-driven device. An (the) adapter preferably comprises a second connector configured to be physically and electrically connected with the first connector in a detachable manner. The adapter is further adapted or configured to (i) receive power from the battery pack via the hand-held power tool and (ii) provide at least one additional electrical function to the hand-held power tool or to perform at least one additional electrical function that the hand-held power tool is not otherwise capable of performing. The adapter may be any one of the adapters described above or below.

Such an adapter is preferably at least partially disposed, located or accommodated within a space between the housing and the battery pack when the housing and battery pack are attached to each other. More preferably at least 50% of the longest extension of the adapter is disposed, located or accommodated within the space between the housing and the battery pack when the housing and battery pack are attached to each other, even more preferably at least 70%, even more preferably at least 85% and further preferably 100%.

If the adapter of the above-noted aspect is at least partially disposed, located or accommodated between the housing and the battery pack, the embedded portion of the adapter is physically protected by the housing and/or the battery pack, e.g. when the hand-held power tool is dropped or bumps against something. Thus, this aspect of the present teachings provides a robust and durable structure for protecting the adapter in rugged work environments.

According to any of the above- or below-described aspects or embodiments of the present teachings, the term "power tool" is intended to encompass a wide range of electric power tools, including but not limited to electric power tools for processing metals, electric power tools for processing wood, electric power tools for processing stone, and electric power tools for gardening. Specific examples include, but are not limited to, electric drills, electric impact and screw drivers, electric impact wrenches, electric grinders, electric circular saws, electric reciprocating saws, electric jig saws, electric band saws, electric hammers, electric cutters, electric chain saws, electric planers, electric nailers (including electric rivet guns), electric staplers, electric shears, electric hedge trimmers, electric lawn clippers, electric lawn mowers, electric brush cutters, electric blowers (leaf blowers), electric flashlights, electric concrete vibrators and electric vacuum cleaners.

The adapters according to the present teachings may be capable of being used with two or more of such electric power tools, so that the adapters can be used across a range of power tool products.

In another preferred embodiment of this aspect of the present teachings, the adapter according to any preceding embodiment or aspect may be provided without the power tool and/or the battery pack.

In each of the above embodiments, the power tool and/or battery pack is (are) preferably configured so that it (they) may be utilized regardless of whether the adapter is attached or not.

In another aspect of the present teachings, the adapter is preferably powered by the battery pack. However, it is also possible to provide a self-contained power supply (e.g., a rechargeable battery) in the adapter for supplying power to the adapter's electronics. In this case, the adapter may optionally be configured to obtain supplemental power and/or a battery charging current from the battery pack, if necessary.

Further objects, advantages, features, embodiments and details of the invention will be readily understood by the skilled person upon reading the following detailed description and claims in view of the appended drawings.

DETAILED DESCRIPTION

Figure 1A:
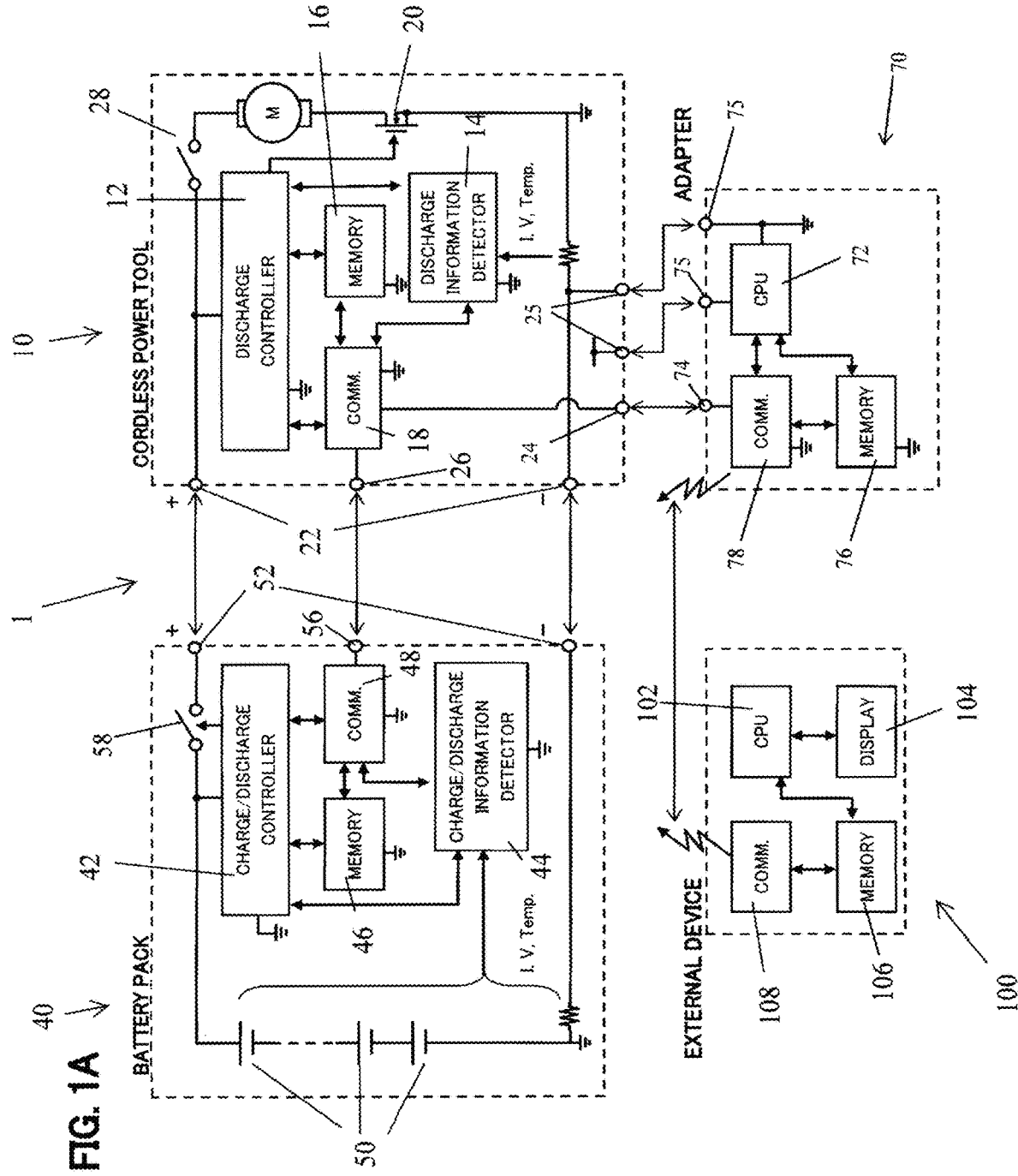
FIG. 1A shows a schematic diagram of a power tool system according to a first exemplary embodiment of the present teachings, in which the adapter directly connects only to the power tool.

Before describing presently-preferred embodiments in greater detail, a further summary of additional features, functions, aspects, advantages, etc. of the present teachings will be provided. As was indicated above, any of these features, functions, aspects, advantages, etc. may be utilized with any other features, functions, aspects, advantages, etc. of other embodiments disclosed herein in any combination.

In certain aspects of the present teachings, the adapter are configured or adapted to perform a communication function, e.g., to enable the battery pack and/or power tool to communicate, e.g., wirelessly, with one or more external device(s).

In such aspects, a method for wirelessly communicating information to/from the battery pack and/or power tool is also provided. This method enables a wide variety of functions (e.g., any of the above- or below described function) to be performed on the battery pack and/or power tool from a remote location and/or enables information concerning the battery pack and/or power to be displayed on the external device, e.g., a portable device, such as a smart phone, PDA, tablet computer, laptop computer or a dedicated display device.

The "external device" according to the present teachings is not particularly limited, as long as it comprises a means for communicating, e.g., wirelessly, with the adapter. The external device may generally comprise circuitry adapted or configured to analyze and/or display information transmitted from the adapter to the external device and/or to transmit information from the external device to the adapter for use by the battery pack or power tool. The external device may be "dumb" in that it basically only comprises the communication means and the display, such that the external device merely displays the information calculated or generated by the adapter. Or, the external device may be "smart" in that it comprises the communication means and at least one controller, e.g., one or more microprocessors and one or more memory and/or storage devices, such that the external device is capable of processing and/or analyzing data received from the adapter, as well as generating data and/or instructions to be transmitted to the battery pack and/or power tool via the adapter. The external device may directly communicate the information to the user, e.g., via a display, or may further communicate the information to another external device that serves as an (another) interface with the user.

For example, the external device may be a hand-held or portable device, such as a mobile telephone (e.g., a "smart phone"), a personal data assistant (PDA), a tablet computer, a portable (laptop) computer, a dedicated portable electronic device, etc., or it may be a device intended to remain in a fixed location, such as a personal (desktop) computer, a server or a mainframe.

In the alternative, the external device may be "dumb", such as a dedicated display/input device or a phone that is not itself capable of executing programs for operating the adapter, battery pack or power tool. For example, the adapter could be configured to send a text (SMS) message or email message to the phone. Or, the adapter may be configured to send information for display on the dedicated display/input device and to receive information/instructions that are input at the dedicated display/input device.

In each case, the external device and/or adapter may further preferably comprise wireless communication means, such as one or more of a wireless local area network (WLAN) device, e.g., a WiFi network interface controller or access point (i.e. operating according to the wireless communication protocol specified by IEEE 802.11), a Bluetooth® communication device, cordless telephony or cellular (mobile) network devices, radio (RF) communication devices or any other type of known or future-developed wireless communication technology.

In another aspect of the present teachings, the power tool and/or the battery pack may include one or more of such wireless communication means, in which case the adapter may be omitted, such that the external device communicates directly with the battery pack and/or the power tool.

In one embodiment of this aspect of the present teachings, the adapter enables the user to access the memory of one or both of the power tool and the battery pack, in order to modify and/or update a control program and/or data stored in the memory of the power tool and/or the battery pack.

In an exemplary embodiment of the present teachings, the adapter may be adapted or configured to enable the user to change a maximum current limit stored in the memory of the power tool and/or in the memory of the battery packs. Generally speaking, cordless power tools are designed to operate safely and reliably up to a certain (rated) current threshold. If the actual current exceeds the current threshold, the electric motor, gear transmission and/or batteries could be permanently damaged, thereby shortening the service life of the power tool and/or the battery pack.

Therefore, some known power tools and/or the battery packs include a controller or current limiting device that controls the discharge current of the battery pack, i.e. the power supply to the electric motor of the power tool. The controller or current limiting device performs the discharge current control based upon a control program and data stored in the memory of the power tool and/or the battery pack. For example, the control program/data may include a current limit value ($I_{limit}$) for the discharge current and the controller may simply shut off the current flow to the electric motor when the discharge current reaches the limit value.

By setting the current limit at a relatively low value, the service life of the power tool and the battery pack can be maximized, because the internal components will never experience excess (damaging) current flows. However, if the current limit is set at a relatively low value, the operation of the power tool may be frequently interrupted due to the current limit being reached, especially when heavy-duty operations are being performed. In this case, the user's productivity may be significantly reduced, because it may become impossible to quickly perform certain power tool operations.

On the other hand, if the current limit is set at a relatively high value, power tool operations may rarely be interrupted, thereby improving the productivity of the user. However, the higher current limit may shorten the service life of the power tool and/or battery pack due to the higher currents that may be experienced by the various internal components.

In short, a generally inverse relationship exists between the maximum current limit and the convenience of operation, i.e. power tool operations free from interruptions or tool stoppages caused by the maximum current limit being reached or exceeded. However, the maximum current limit is a variable that the user may wish to control, rather than only being able to operate the power tool according to a non-changeable current limit set at the factory when the tool or battery pack is manufactured.

Therefore, in this exemplary embodiment, the system is adapted or configured to enable the user to change the current limit value and/or other parameters via the adapter. The instructions may be directly input at the adapter or may be communicated from the external device via the adapter. For example, the user (or another person) may set a higher current limit value in order to prevent disruptive interruptions or tool stoppages. In the alternative, the user may elect to set a lower current limit value in order to extend the service life of the power tool and the battery pack. Naturally, the present teachings also encompass the possibility that the user may also set various current limit values in accordance with different power tool operations that will be performed.

In one representative example, if a heavy-duty power tool operation may be briefly performed, the user may temporarily increase the current threshold value to ensure that the heavy-duty power tool operation can be quickly and efficiently performed. However, after that operation has been completed, the user may want to decrease the current threshold value again in order to protect the power tool system from excessive currents that could cause permanent damage.

In certain aspects of the present teachings, the adapter is configured or adapted to enable the user to access the memory of the power tool and/or the battery pack, in order to read out maintenance information stored in the memory of the power tool and/or the battery pack.

For example, many power tools includes parts that may be replaced when worn out or broken, such as a carbon brush of the electric motor or a trigger switch having electric contacts. In order to avoid an abrupt and unexpected failure (breakdown) of the power tool and interruption of the work, which may possibly occur at an inconvenient time, it is important to regularly check the condition of such parts, which may be burdensome if it is necessary to disassemble the power tool in order to check the condition.

Moreover, each replaceable part may have a different service life, which also may vary significantly depending upon the actual operation time of the power tool and/or the manner in which the power tool is normally used and/or any significant overload conditions experienced by the power tool or the battery pack. Therefore, even if the condition of the replaceable parts are visually inspected on a regular basis (e.g., once a month), it may still be difficult to obtain current and reliable information concerning the conditions of the various replaceable parts between inspections.

In the light of the foregoing, another aspect of the present teachings provides a power tool system having a memory that can store one or more types of maintenance information, including but not limited to: (i) the date of the last check/inspection, (ii) the result of the last check/inspection, (iii) the accumulated or total usage (operation) time of the power tool and/or the battery pack, (iv) the available charge or charge status (remaining battery capacity) of the battery pack, (v) the number of charging cycles experienced by the battery pack, (vi) the condition of the battery, which may be calculated from an internal impedance measurement of the battery cell(s), (vii) the expected remaining service life of one or more of the replaceable parts, such as carbon brushes or even the battery cell(s) of the battery pack, (viii) a maintenance schedule for the power tool and/or the battery pack, (ix) a usage history of the power tool and/or the adapter and/or the battery pack, (x) the name(s) of an administrator or responsible person for the tool, (xi) a serial number of the battery pack and/or the power tool, (xii) the voltage of one or more (e.g., either individually or a summation of two or more) battery cell(s), (xiii) the discharge current of one or more (e.g., either individually or a summation of two or more) battery cell(s), (xiv) the temperature of one or more (e.g., either individually or a summation of two or more) battery cell(s), (xv) the number of times that the battery pack and/or the power tool has been switched ON and/or OFF, and/or (xvi) the amount of charging or discharging that has occurred within a predetermined time period (e.g., the amount of discharged power during the previous 2 hours). The memory may store only one or any arbitrary combination thereof, all of which possible combinations are expressly disclosed herein by reference.

This memory may be located in the power tool and/or in the battery pack, and/or even in the memory of the adapter that provides the communication function. The adapter may be configured or adapted to analyze and/or display this information itself and/or may be configured or adapted to communicate maintenance information (e.g. raw data and/or processed data) to the external device for communication to the user and if necessary, for further analysis and/or processing.

In a preferred embodiment, the user may access the memory of the adapter using the external device, e.g., a smart phone, in order to check the current condition of the replaceable parts. In a further preferred embodiment, an application program ("app") for this function may be made available for downloaded from the website of the tool manufacturer or another source.

In another aspect of the present teachings, the adapter may include anti-theft functionality. For example, one or both of the power tool and the battery pack may include an electronic lock, i.e. a device that prevents operation of the power tool and/or battery pack if a "key", e.g., a password, e.g., an encrypted password, is not received by the electronic lock. The adapter may include communication means for communicating the necessary key to the electronic lock in order to enable usage of the power tool and/or battery pack.

For example, the external device, which may be a computer or server connected to a wireless access point (e.g., a wireless router), located at a manufacturing facility or a construction site may wirelessly broadcast the key in the vicinity of the worksite. When the adapter receives the key, the adapter communicates the key to the power tool and/or battery pack, thereby enabling usage thereof. The power tool and/or battery pack may be configured to operate for a certain amount of time, e.g., one hour, one day, etc., after receiving the key and to then require the key to be re-input again within the certain period of time in order to continue uninterrupted operation of the power tool and/or battery pack. If the key is not timely received, the electronic lock may internally shut off operation of the power tool and/or battery pack in a manner that can not be overridden unless the adapter, battery pack or power tool is brought into communication with the external device again. Such an embodiment provides a theft-deterrence, because the power tool and/or battery pack can only be used at a worksite where the key is being broadcast.

Naturally, other possibilities for communicating the key to the power tool and/or battery pack via the adapter are possible, such as wired connections. In such an embodiment, the adapter may be directly connected to the external device in order to enable usage of the adapter and/or to communicate the key to the adapter. In this case, the adapter would be required to be physically proximal to the external device or to at least an interface of the external device in order to obtain the necessary key.

In another aspect of the present teachings, the adapter may include functionality that better enables construction companies and/or manufacturing companies to manage a large number of power tools and battery packs that are commonly or interchangeably used by a plurality of users. In particular, adapters according to this aspect of the present teachings address the problem that some of the power tools and the battery packs may be lost or may prematurely breakdown.

According to this aspect of the present teachings, an administrator may be appointed for each one of the power tools and the battery packs. Further, the maintenance information of the power tool and the battery pack, respectively, may preferably include information identifying the name of the administrator thereof. In this case, when the power tool or the battery pack breaks down, a tool manager in the company can confirm who the administrator of the battery pack is and/or power tool by using an external device, such as a smart phone, in order to ascertain the cause of the problem.

In another aspect of the present teachings, the adapter may be capable of providing advice or a recommendation, e.g., to the user, administrator or tool manager, as to the most appropriate power tool for a particular power tool operation.

For example, the adapter may include a circuit that monitors the discharge current supplied to the electronic motor of the power tool during a power tool operation. The detected discharge current is then supplied to the controller of the adapter for analysis, or the detected discharge current is communicated to the external device for processing either directly by the battery pack or power tool or via the adapter connected to one or both of the battery pack and power tool. The controller of the adapter or the external device may then determine whether another power tool and/or battery pack having a higher or lower rated power output is more appropriate for the power tool operation being performed.

As utilized herein, the term "detected discharge current" is intended to include, but is not limited to, an actual or transitory current measured at any time during a single power tool operation, a peak current measured during a single power tool operation, an average or mean current supplied during a single power tool operation, a current profile measured over the single power tool operation, an average of peak currents measured over a plurality of power tool operations or a peak, average or mean current measured over a plurality of power tool operations.

In one exemplary embodiment, the "detected discharge current" may be compared to an upper current threshold and/or to a lower current threshold stored in a memory within the adapter, the power tool and/or the battery pack. If the detected discharge current is greater than the upper current threshold, the controller may recommend the use of a power tool having a higher rated or nominal power output, in order to ensure that the currently-used power tool is not overloaded, which may lead to overheating and thus permanent damage to the power tool or battery pack. On the other hand, if the detected discharge current is less than the lower current threshold, the controller may recommend the use of a power tool having a lower rated or nominal power output, which may be a lighter tool and thus less cumbersome and/or tiring to operate.

In another exemplary embodiment, the detected discharge current may be used as an index for a look up table (LUT) that contains a set of power tools and corresponding current ranges. By looking up the power tool(s) corresponding to the detected discharge current in the LUT, the controller may be capable of recommending a specific power tool, or a category of power tool(s) based upon rated output power, for further use in performing the current power tool operation.

In another exemplary embodiment, a transitory (e.g., peak) or average power output may be determined based upon the detected discharge current and may be used as an index for a look up table (LUT) that contains a set of power tools and corresponding current ranges.

Naturally, the determination as to the most appropriate power tool for the current power tool operation may be performed in a variety of ways, including by providing an algorithm that calculates the necessary output power required to perform the power tool operation based upon the detected discharge current and/or power output.

As will be discussed below, the recommendation concerning the most appropriate power tool for a particular power tool operation may be communicated to the user, the tool administrator, the tool manager or another person either via a display on the adapter or via a display on the external device. Naturally, this information may also be communicated in an audible manner, including by providing an audio alarm in case the recommended current or power output of the power tool is being exceeded, e.g., by a certain percentage or by a nominal current amount or wattage amount.

In another aspect of the present teachings, the adapter may be configured or adapted to enable the user, tool administrator, tool manager or another person to change the charging speed, and/or the charging current and/or the maximum threshold temperature for the battery pack.

As is well known, slower charging typically uses lower current(s) and is thus less damaging to the battery cells. Therefore, slower charging typically extends or maximizes the service life of the battery cells. However, as a tradeoff, the charging time is longer and thus work productivity may be negatively influenced if the user must wait for the battery pack to complete recharging. On the other hand, the charging speed can be increased, e.g., by increasing the charging current and/or the battery pack threshold temperature, which reduces total charging time, but possibly also reduces battery cell life.

Normally, the charging speed is set at the factory, such that the user is not permitted to individually decide which charging speed is most appropriate for the intended usage of the battery pack. In the alternative, the charger may only be provided with two charging options, i.e. a fast charge and a slow charge. Therefore, by providing this charging speed functionality in the adapter, the user has greater freedom to varying the charging speed as appropriate in order to maximize productivity and/or maximize battery service life.

The adapter may be configured to change the charging speed by directly inputting the instructions at the adapter, e.g., via a touch pad, touch panel, toggle switch or push button(s), or the adapter may be configured to receive the charging instructions from the external device. Again, an "app" may be downloaded from the tool manufacturer or another source to provide this functionality to the adapter and/or to the external device. For example, the app may be downloaded to the external device, the external device may execute the app and then simply transmit an instruction to the adapter. In the alternative, the app may be downloaded from the external device into the adapter and then the adapter controller may execute the app.

In another aspect of the present teachings, the adapter, battery pack and/or power tool may enable the user to set the maximum charged level of the battery pack. Similar to be preceding aspect of the present teachings, although the maximum charged level is normally set at the factory, the user may wish to modify this value in order to optimize the battery pack performance and/or service life for the user's intended usage of the battery pack.

As utilized herein, the term "maximum charged level" is intended to meet a value indicative of the timing for stopping a charging operation based upon the remaining battery capacity of the battery cell(s).

For example, if the "maximum charged level" of a battery pack having a nominal capacity of 2.0 amp-hours (Ah) is 95%, it means that the 2.0 Ah nominal capacity battery will be charged up to a remaining battery capacity of 1.9 Ah and the charging operation will be terminated, even though the battery could be charged further. Similarly, a "maximum charged level" of 80% means that the 2.0 Ah nominal capacity battery will be charged up to a remaining battery capacity of 1.6 Ah and the charging operation will be terminated.

By terminating the charging at a lower charged level, the service life of the battery can be increased, e.g., including increasing or maximizing the total number of possible charge/discharge cycles of the battery. However, if the battery is recharged to less than its full capacity, the number or amount of power tool operations that can be performed per charging cycle will be less, and possibly significantly less if the maximum charged level is a relatively low value.

If the user normally only uses the battery pack relatively briefly, then the user may wish to extend the battery service life by utilizing a lower maximum charged level. On the other hand, if the user normally uses the battery pack continuously and possibly throughout the workday, then the user may wish to increase the amount of work that can be done before having to replace the depleted battery pack with a recharged battery pack, thereby improving productivity. In this case, the user may wish to set the maximum charged level relatively high.

The present teachings enable the user to change the maximum charged level by either inputting a new value via an input device on the adapter, e.g., a touch screen, up/down buttons or other push buttons, such as a keyboard, or by inputting the new value at the external device (e.g., a computer, PDA or phone). In the latter case, the external device may transmit the new value to the battery pack and/or power tool via the adapter, or even directly to the battery pack and/or power tool.

In another aspect of the present teachings, the adapter may be configured or adapted to enable the power tool and the battery pack to access the external device (e.g., the user's smart phone) in order to transmit, e.g., wirelessly, information indicative of the state of battery charge/discharge.

Such an adapter may improve worker productivity by ensuring the user is timely supplied with a fully charged battery pack when needed. In this regard, it is noted that the charge storage capacity of the battery pack may not be sufficient to drive the power tool all day long, or at least until an extended break sufficient to recharge the battery pack. Therefore, when the battery pack is discharged and is no longer capable of supplying energy to the power tool, it is necessary replace the discharged battery pack with a recharged battery pack in order to keep working. In other words, a recharged battery pack must be ready when the battery pack currently in use is no longer capable of driving the power tool or work productivity may suffer.

Thus, in this aspect of the present teachings, the adapter can be configured to provide useful information concerning the charge status of the battery pack, as well as provide reliable predictions concerning how much longer the currently-used battery pack is expected to continue to provide power before becoming fully discharged. For example, the adapter may analyze the type of work currently being performed by the user, e.g., tightening screws, in view of the remaining battery charge of the battery pack and output a prediction concerning, e.g., how many additional screws can be tightened with the current battery pack before it must be replaced, i.e. before its energy is depleted.

As will be discussed below, the adapter of this embodiment may either include a display that directly shows the user the charge status and/or prediction concerning the remaining power tool operations that can be performed, or the adapter may transmit this information, e.g., wirelessly, to an external device for display.

In the alternative, the adapter may simply transmit raw data, e.g., a value indicative of the current discharge battery voltage, or partially-processed data, e.g., a value indicative of the energy output of the currently-performed power tool operation. Then, the external device may perform the necessary calculations to determine the remaining battery charge and/or the predicted number of remaining power tool operations before the battery pack requires recharging.

The adapter may also transmit information concerning the type of operation currently being performed and/or information indicative of the power consumed by each currently-performed power tool operation. For example, the adapter may dynamically measure the "detected discharge current" (as defined above) in order to provide a more precise estimate of the power consumption for each power tool operation currently being performed, because various factors may affect the power consumption of a particular operation, such as screwing in a screw. That is, the hardness of the material, into which the screw is being driven, will affect power consumption, as harder materials generally require more power for the same size screw. Similarly, the size of the screw affects the power consumption, as larger screws generally consume more power for the same material. Naturally, the presence or absence of a pilot hole will also affect the power consumption.

Therefore, by dynamically measuring the actual power consumption of the currently performed power tool operation, a fairly precise estimate can be provided as to the number of additional power tool operations of the same type that can still be performed with the remaining battery capacity of the battery pack.

In addition or in the alternative, the user may input information concerning the current usage of the tool and the external device may perform the necessary information using a stored value, which corresponds to the average power usage for the inputted power tool operation, and the remaining battery capacity.

Again, an "app" may be downloaded from the tool manufacturer's website or another source in order to provide this function in the external device.

In addition or in the alternative, the adapter may transmit the raw data (measured discharge voltage) or calculated remaining battery capacity, to a server or to a smart phone of the tool manager. In this case, the external device may notify the tool administrator or tool manager when it is time to deliver a recharged battery pack to the user whose battery pack is approaching the fully discharged state, e.g., by performing the calculations as to the number of remaining power tool operations that may be performed. For example, the external device may also store one or more time values indicating the average or typical amount of time (which may be empirically determined) that a particular power tool operation takes, and then the external device can provide an estimate as to the amount of time (e.g. in minutes) that the user can be expected to continue to operate the power tool before the currently-used battery pack will be depleted of energy.

In addition or in the alternative, the adapter may transmit other discharge-related information concerning the power tool and/or the battery pack to the external device (e.g., smart phone) of the tool manager. For example, the discharge-related information may include a temperature detected within the power tool and/or the battery pack. Generally speaking, a power tool that has exceeded a certain temperature threshold may indicate that it is currently being operated in an overloaded state. If the user were to continue to operate the power tool and/or the battery pack in the overloaded state, the power tool and/or the battery pack could be permanently damaged by the excessive heat.

In order to prevent damage caused by overheating (i.e. overloaded conditions), the adapter may be configured or adapted to transmit a warning signal or an alarm signal to the external device (e.g., the smart phone) of the user or the tool manager when the power tool and/or the battery pack is overheated. In this case, the tool manager may be notified in order to deliver another power tool and/or the battery pack to the user, or the user may be directly warned by the alarm to stop usage of the overheated power tool system.

As was described above, the power tool system of this aspect of the present teachings may also be configured or adapted to permit changes to the maximum temperature threshold as input either via the adapter or the external device by the user, a tool administrator, a tool manager, etc.

In addition or in the alternative to all the foregoing embodiments and aspects, the adapter may optionally include a display, such as a liquid crystal display (LCD), light-emitting diode (LED) display, including an organic LED (OLED) display, or an organic electroluminescent (EL) display. The display may optionally be a touch pad or touch panel that enables the user to input data into the memory of the power tool and/or the battery pack via the adapter.

In such embodiments, the adapter is preferably configured or adapted to display information read from the memory of the power tool and/or the battery pack. For example, the display of the adapter may visually indicate any of the information or functions described above or below, such as the present charge level (remaining battery capacity) of the battery pack, an alarm indicating overheating, the predicted number of further power tool operations that may be performed based upon the remaining battery capacity of the battery pack, the name of the administrator of the power tool and the battery pack, the maximum charged level, etc.

The display of the adapter may perform the same function as the display of the external device, e.g., a smart phone, in the above- or below-described embodiments of the adapter enabled to perform communication functions.

According to another exemplary embodiment according to the present teachings, a "belt charger" is provided. In this example, the charger is configured to be worn or carried by the user while the user is performing power tool operations. While it is presently envisioned that the charger will be worn on the user's belt, it could also be attached to the user in various other locations. For example, the charger may be provided with a harness or strap, which includes a detachable connector, such as a Velcro(R) connector, a hook-and-loop fastener, a clasp, a snap-fit connector, etc., configured to attach to the arm, leg or torso of the user. In the alternative, the charger may be configured or adapted to be worn on the user's back, such as in a back pack or on a harness that fits over the user's shoulder(s).

Output power terminals of the charger (regardless of where the charger is disposed on the user's body) are preferably disposed on or adjacent to a belt worn by the user, such as a work belt or tool belt typically worn when performing power tool operations. The output power terminals are configured to transmit or output a charging current and may optionally be disposed in or on a hook engaging or receiving device configured or adapted to receive a belt hook disposed on a lateral surface of the adapter or on the lateral surface of the battery pack in embodiments in which the adapter is omitted.

Input power terminals for receiving the charging current are disposed in or on the belt hook of the adapter or the battery pack in an arrangement that is complementary to the output power terminals of the charger, i.e. so that the output power terminals contact the input power terminals when the user hangs the power tool on his/her belt using the belt hook.

Therefore, each time that the power tool is hung on the tool belt with the input and output power terminals in contact, the adapter and/or the battery pack is electrically connected to the charger, thereby enabling the battery pack to be charged.

This embodiment is particularly advantageous with lithium-based rechargeable batteries, which do not develop a "memory" after repeated recharging operations, unlike other types of battery chemistries, such as nickel cadmium and nickel metal hydride. Therefore, no problems result by intermittently supplying charging current to the lithium-based battery, even if it is in a nearly fully charged state.

This embodiment also provides the advantage that the battery pack attached to the power tool can be recharged every time that the power tool is not in use and is hung on the user's tool belt. Thus, the belt charger embodiment can significantly extend the amount of time that the battery pack can be used without requiring replacement for recharging, thereby improving worker productivity. In fact, if the user takes frequent breaks between power tool operations, the battery pack may be continuously maintained in a fully charged or nearly fully charged state.

In addition or in the alternative, this embodiment provides the advantage that the charging of the battery cell(s) can be stopped at a lower charge level or state (i.e. the upper charging limit or maximum charging level can be decreased or set at a lower level), because the battery cell(s) are frequently recharged and thus the energy (stored charge) of the battery pack is not likely to be depleted during a normal power tool operation. That is, if a battery pack is not recharged during use, the user may prefer to maximize the amount of stored charge (i.e. increase the upper charging limit or maximum charge level) during a recharging operation, so that the operating time of the power tool for one recharged battery pack can be maximized. However, when the battery cell(s) are repeatedly recharged to the maximum rated (nominal) charge storage capacity of the battery cell(s), the service life of the battery cell(s) is negatively influenced. Therefore, by placing an upper limit on the charging that is less than the maximum rated (nominal) charge storage capacity of the battery cell(s), the service life the battery cell(s) can be extended. Moreover, due to the frequent recharging of the battery pack, the user is not inconvenienced by having to replace a depleted battery pack with a recharged battery pack, even though the battery pack is never recharged to its maximum rated (nominal) charge storage capacity.

The battery cell(s) of the charger may utilize a battery chemistry and/or capacity that differs from the battery chemistry and/or capacity of the battery cell(s) in the power tool battery pack. In particular, the charger battery is not required to deliver relatively high currents, as is the case for power tool battery packs. Thus, higher-capacity battery cells may be used in the charger battery than in the power tool battery pack, thereby increasing the charge storage density and/or reducing weight requirements for the charger. The charger battery is preferably capable of storing an amount of charge (energy) equivalent to at least one complete recharging of the power tool battery pack, more preferably at least five rechargings, even more preferably at least ten rechargings. Ergonomic considerations, such as the total weight of the belt charger, and the battery chemistry (i.e. its charge storage density) will determine the appropriate balance of stored charge to weight. Naturally, the battery chemistry and/or capacity of the battery cell(s) of the charger may be same as the battery chemistry and/or capacity of the battery cell(s) of the battery pack for the power tool. High capacity Li-ion cell(s) may be utilized in the charger and High power Li-ion cell(s) may be utilized in the battery pack.

In addition or in the alternative, the adapter of this embodiment need not contain a microprocessor or other computing capabilities. For example, the battery pack or the power tool may include two sets of battery terminals. The first set of battery terminals is configured or adapted to engage the corresponding battery terminals of the power tool or the battery pack. The second set of battery terminals is configured or adapted to engage the charging terminals of the charger. The second set of battery terminals may be provided, e.g., on, in or adjacent to a belt hook, which may serve as the adapter in this embodiment. The battery terminals on the belt hook may then directly connect to the charging terminals of the charger, which may be provided on a tool belt worn by the user. Thus, the charging current can be communicated from the charger to the battery pack via the belt hook adapter, which may be directly connected to the battery pack or the power tool.

In the alternative to the use of charging terminals for the charger and corresponding battery terminals for the battery pack or the adapter, which require a direct or wired connection to communicate (conduct) the charging current, it is also possible to wirelessly communicate power from the charger to the battery pack. In such an embodiment, the charger may include a wireless power transmitting antenna, such as an induction coil, which may be disposed, e.g., on the user's tool belt. The adapter may include a wireless power receiving antenna, such as an induction coil, that is complementary to the wireless power transmitting antenna, so as to enable the wireless transmission of power using induction coupling or more preferably, resonant induction coupling.

In such an embodiment, when the wireless power receiving antenna is brought into proximity with the wireless power transmitting antenna, power may be transmitted to the adapter or to the battery pack, in embodiments in which the adapter is omitted, in a wireless manner, e.g., as an oscillating electromagnetic field or magnetic flux. The power received by the adapter may then be converted into a current that is supplied to the battery cells of the battery pack. The adapter may itself generate the appropriate charging current or the charging current may be generated within the battery pack, in particular in case the adapter is omitted.

This embodiment provides the advantage that the user is not required to directly connect or contact the charging terminals with the battery terminals in order to perform the charging operation. Instead, the charging operation will automatically begin (if necessary) as long as the wireless power receiving antenna of the adapter is brought into proximity with the wireless power transmitting antenna of the charger. A proximity sensing device, such as a mechanical contact, a pressure sensor, a radio frequency identification (RFID) device, a magnet (and magnet sensor, such as a reed switch or a Hall sensor), an electrical resistance or capacitive sensor, etc. may be provided on or in one or both of the adapter (or battery pack) and the charger, e.g., adjacent to the power transmitting and receiving antennae. In this case, the charger will wirelessly transmit power only when charging current can be communicated to the battery pack, thereby avoiding unnecessary waste of power.

As was mentioned above, it is reiterated that the adapter may be entirety omitted in such a wireless charging embodiment. For example, the wireless power receiving antenna may be provided on or in the battery pack. In this case, when the wireless power receiving antenna of the battery pack is brought into proximity with the wireless power transmitting antenna of the charger, e.g., by hanging the battery pack (connected to the power tool) on the user's tool belt, power may be wirelessly transmitted directly from the charger to the battery pack. In such an embodiment, the wireless power receiving antenna is preferably disposed on the lateral side of the battery pack that includes a belt hook, so that the charging operation will always begin when the belt hook is hung on the user's tool belt adjacent to the wireless power transmitting antenna. Therefore, the user is not required to take any special measure to ensure that the battery pack is correctly orientated on the tool belt in order to enable the charging operation.

In certain aspects of the present teachings, the adapter is preferably at least partially disposed, located or accommodated within a space between the housing and the battery pack when the housing and battery pack are attached to each other.

If the adapter of the above-noted aspect is at least partially disposed, located or accommodated between the housing and the battery pack, the adapter is physically protected by the housing and/or the battery pack, e.g. when the hand-held power tool is dropped or bumps against something. Thus, this aspect of the present teachings provides a robust and durable structure for protecting the adapter in rugged work environments.

In a preferred embodiment of the above-noted aspect of the present teachings, the battery pack is preferably adapted or configured to be attached to and detached from the housing regardless of whether the adapter is attached to or detached from the housing. The adapter of this embodiment is preferably adapted or configured as an optional accessory or device for the power tool and the adapter is preferably not necessary for normally operating the hand-held power tool (i.e. operating the power tool without the additional function(s) performed or provided by the adapter). Therefore, the battery pack can be attached to the housing to supply current to the hand-held power tool even when the adapter is detached from the housing.

Furthermore, according to such a preferred embodiment, the power tool user can detach the battery pack from the housing to charge the battery pack, and then reattach the (or another) charged battery pack to the housing without having to detach the adapter from the housing. This embodiment is particularly advantageous for users who use the power tool for relatively long durations (e.g., during an entire work day), because in such applications of the present teachings it may be necessary to replace a depleted battery pack with a charged battery pack several times during the day.

In another preferred embodiment of the above-noted aspect of the present teachings, the adapter is preferably adapted or configured to be attachable to and detachable from the housing only when the battery pack is detached from the housing. With the adapter of this preferred embodiment, the power tool user can safely attach and detach the adapter, because the battery pack must be detached from the power tool in order to attach/detach the adapter such that no power is being supplied to either the hand-held power tool or the adapter while the adapter is being handled.

In another preferred embodiment of the above-noted aspect of the present teachings, the adapter is preferably adapted or configured to be attached to and detached from the housing in a first direction, the battery pack is preferably adapted or configured to be attached to and detached from the housing in a second direction, and the first direction is substantially perpendicular to the second direction. More preferably, the adapter and battery pack are preferably adapted or configured to be slidably attached to and detached from the power tool housing.

In another preferred embodiment of the above-noted aspect of the present teachings, the housing and the battery pack together define an opening therebetween that visibly exposes at least a portion of the adapter while the adapter is attached to the housing (e.g., the opening is defined through an outer surface of the hand-held power tool and/or the battery pack).

With the adapter according to this preferred embodiment, the power tool user can conveniently view the attached adapter (without having to remove it from the power tool or otherwise perform an inconvenient operation to visually examine the adapter) in order to determine which kind of adapter is attached to the power tool.

In another preferred embodiment of the above-noted aspect of the present teachings, the adapter is preferably adapted or configured to fit in the opening with no significant clearance (e.g., with the minimum amount of clearance necessary for manufacturing tolerance purposes) when the adapter and the battery pack are attached to the housing. In such an embodiment, dust and moisture may be prevented from entering into any space between the housing and the battery pack, thereby protecting the first and second connecters from negative outside influences.

In another preferred embodiment of the above-noted aspect of the present teachings, the power tool system preferably further comprises a dummy adapter adapted or configured to be detachably attached to the housing instead of the adapter. More preferably, the dummy adapter may be designed to fit in the opening with no substantial clearance when the dummy adapter and the battery pack are attached to the housing. In case the power tool user does not require the use the (functional) adapter of the preceding aspects and/or embodiments, the user can insert the dummy adapter into the first (adapter) connector on the power tool housing in order to prevent the ingress of dust and moisture into the first (adapter) connector.

In another preferred embodiment of the above-noted aspect of the present teachings, the dummy adapter is preferably adapted or configured to cover the first connector when the dummy adapter is attached to the housing. In this embodiment, the first connecter is protected from dust and moisture even when the battery pack is detached from the housing.

In another preferred embodiment of the above-noted aspect of the present teachings, the first connecter is preferably a female connector that comprises at least one contact pin and a peripheral wall that surrounds the at least one contact pin. In addition, the second connector is preferably a male connector that comprises at least one hole configured to receive the at least one contact pin and at least one contact plate located within the at least one hole and adapted or configured to physically and electrically contact the at least one contact pin.

With respect to this embodiment, it is noted that a female connector generally costs less to manufacture than a male connector. Therefore, in order to avoid increasing the manufacturing cost of the power tool, the power tool may preferably employ a female connector (contact pin(s)), and the adapter may preferably employ a male connector (contact terminal(s)). Because the adapter is intended to be an optional accessory and some users may not require the adapter, this embodiment will enable the manufacturing cost of the power tool to remain lower.

In another preferred embodiment of the above-noted aspect of the present teachings, the adapter is affixable to the housing via a threaded fastener, e.g., a screw or a bolt. According to this embodiment, the adapter can be firmly affixed to the housing such that the connection between the first and second connectors is stably and reliably maintained.

In another preferred embodiment of the above-noted aspect of the present teachings, the adapter is primarily positioned with respect to the housing by the coupling of the first and second connectors and is secondarily positioned with respect to the housing by the tightened threaded fastener.

In another preferred embodiment of the above-noted aspect of the present teachings, the adapter comprises a cylindrical portion, through which the threaded fastener is insertable in order to tighten and affix the adapter onto the power tool housing.

In addition, the cylindrical portion optionally may be exposed through an outer surface of the power tool. In addition or in the alternative, the cylindrical portion optionally may be adapted or configured to be attached to a strap. In this embodiment, the cylindrical portion is reinforced by the threaded fastener that extends through the cylindrical portion, and is therefore prevented from breaking. In addition or in the alternative, a strap (e.g., a carrying strap) can be easily attached to the adapter via the cylindrical portion.

In another preferred embodiment of the above-noted aspect of the present teachings, the power tool system preferably comprises a plurality of adapters, and each adapter is preferably adapted or configured to attach to the housing and to provide at least one different or additional electrical function to the hand-held power tool (i.e. an electrical function that the hand-held power tool does not inherently possess) or to perform at least one different or additional electrical function.

This embodiment enables a range of adapters to be made in order to impart a variety of different electrical functions to the power tool. It is noted that any of the electrical functions described in U.S. Provisional Application No. 61/511,092 or hereinbelow may be implemented in the adapters according to the present teachings, and thus, the description of all of the functions and circuitry mentioned in U.S. Provisional Application No. 61/511,092 is incorporated herein by reference.

In another aspect of the present teachings, the adapters may include, in addition or in the alternative to the foregoing circuitry or functionality, an illuminating device, such as an incandescent lamp, a fluorescent lamp and/or one or more light-emitting diodes. In such an embodiment, the illuminating device is preferably connected to a base portion of the adapter via a flexible, but rigid cord that is capable of positioning or holding the illuminating device in an arbitrary position relative to the power tool housing, but preferably in the direction that the power tool is operating on a workpiece.

Representative, non-limiting examples or exemplary embodiments of the present invention will be described below in greater detail. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved adapters, battery packs connected to such adapters, power tools connected to such adapters, power tool systems, chargers and methods for manufacturing and using the same.

Moreover, combinations of features and steps disclosed in the following detailed description may not be necessary to practice the invention in the broadest sense, and are instead taught merely to particularly describe representative examples of the invention. Furthermore, various features of the above-described aspects, features and representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the particular combination of features in the embodiments and/or the claims. In addition, all value ranges or indications of groups of entities are intended to disclose every possible intermediate value or intermediate entity for the purpose of original written disclosure, as well as for the purpose of restricting the claimed subject matter.

It is expressly noted that all of the above- or below-described (or claimed) functions may be implemented in any of the following exemplary embodiments, e.g., by appropriately programming the controller(s) of the adapter, battery pack, power tool, charger and/or external device. In the alternative, some or all of the above-described functions may be implemented in analog circuitry, dedicated digital circuitry, e.g., a state machine, or mixed dedicated circuitry in any of the below-described exemplary embodiments, as would be well understood by a person of skill in the art after reading the present disclosure.

First Exemplary Embodiment

Figure 1B:
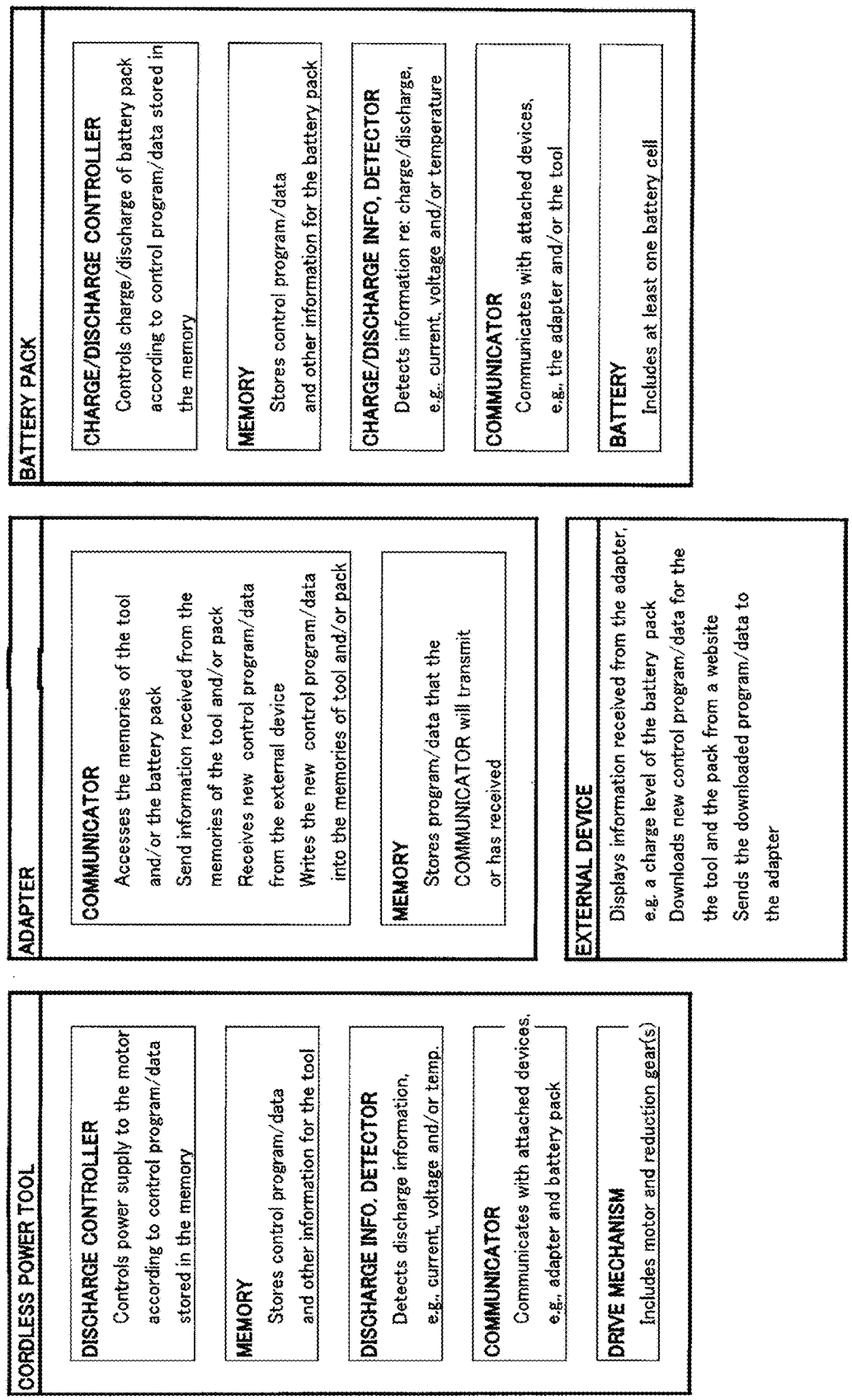
FIG. 1B shows the power tool system according to the first exemplary embodiment of the present teachings in a block diagram.
Figure 1C:
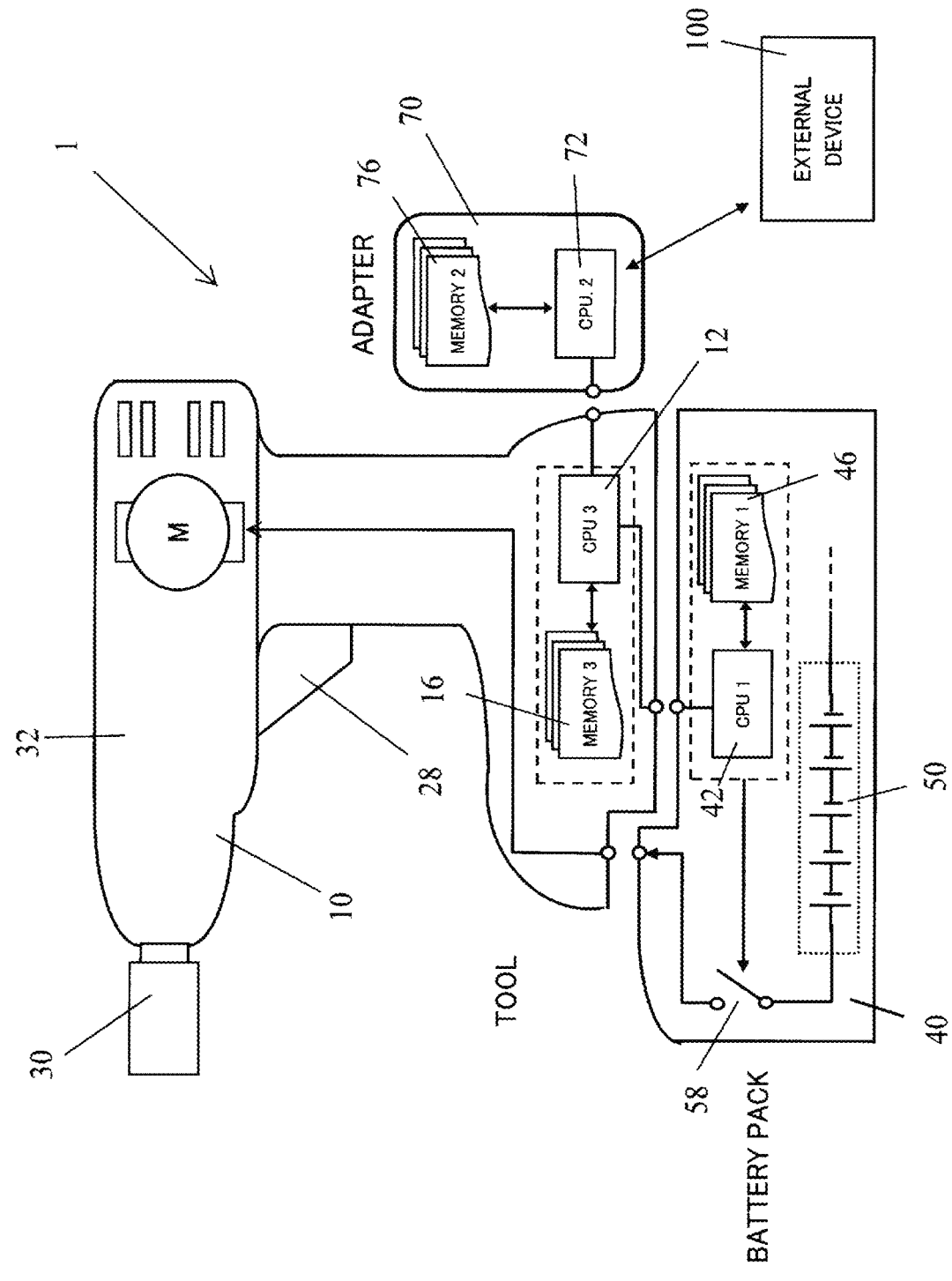
FIG. 1C shows a cutaway view of the power tool system according to the first exemplary embodiment of the present teachings.

Referring to FIGS. 1A-1C, a first exemplary embodiment of a power tool system 1 according to the present teachings will now be described in further detail. The power tool system 1 may generally comprise a cordless (battery-powered) power tool 10, a battery pack 40, an adapter 70 and an external device 100.

The power tool 10 according to this exemplary embodiment generally comprises a controller 12, a discharge information detector 14, a memory 16 and a communicator 18. Power is supplied to the power tool 10 via two battery terminals 22 to drive the electric motor M by opening and closing power FET 20, e.g., utilizing a pulse-width modulation technique as is well known in the art. The operation of the motor M is manually controlled by a switch 28, which may be a trigger switch as is well known in the art. As shown in FIG. 1C, the motor M is enclosed in a housing 32 and drives a tool chuck 30, to which an appropriate tool, e.g., a screw bit, may be connected. A reduction gear (not shown) may optionally be interposed between the motor M and the tool chuck 30.

The battery pack 40 according to this exemplary embodiment generally comprises a controller 42, a charge/discharge information detector 44, a memory 46, a communicator 48 and at least one battery cell 50. Power is supplied to the power tool 10 via two battery terminals 52 to drive the electric motor M. As shown in FIGS. 1A and 1C, a shut-off switch 58 may be provided to disconnect the battery cell(s) 50 from the battery terminals 52 in the event that the remaining battery capacity has reached a lower limit, e.g., as determined by the controller 42, thereby preventing further use of the battery pack 40 until it has been recharged.

The adapter 70 according to this exemplary embodiment generally comprises at least one controller 72, one or more communication terminals (ports) 74, one or more power terminals 75, at least one memory 76 and at least one communicator 78. As will be further described in the additional embodiments below, which are incorporated by reference into the present embodiment, the adapter 70 may further optionally include a display.

The external device 100 generally comprises at least one controller 102, at least one display 104, at least one memory 106 and at least one communicator 108.

The controller(s) 12, 42, 72, 102 of each device preferably comprise(s) at least one processor, e.g., a microprocessor or microcontroller as is well known in the art. The at least one processor is configured to operate according to instructions or program code and data stored in the memory 16, 46, 76, 106, respectively.

The memory 16, 46, 76, 106 of each device preferably comprises non-volatile, read-only memory (ROM) and/or rewriteable memory, such as one or more EEPROMs and flash memory or mechanically addressable memory, such as a hard drive (e.g., in particular for the external device 100). The memory 16, 46, 76, 106 may also include volatile memory, such as RAM, DRAM and SRAM. The type and/or configuration of the memory 16, 46, 76, 106 of any of the devices is not particularly limited according to the present teachings.

The communicator(s) 18, 48, 78, 108 of each of the devices may comprise: (i) one or more wired input/output (I/O) ports (i.e. one or more connection terminals), (ii) a wireless communication device, such as a wireless local area network (WLAN) device, e.g., WiFi (i.e. operating according to the wireless communication protocol enumerated by IEEE 802.11), a Bluetooth device, a cordless telephony or cellular (mobile) network device, a radio (RF) communication device or any other type of known or future-developed wireless communication technology, or both (i) and (ii). Again, the configuration of the communicator(s) 18, 48, 78, 108 of any of the devices is not particularly limited according to the present teachings.

The adapter 70 is supplied with power via the power terminal(s) 25, 75.

The display (80—see FIG. 4A) of the adapter 70 and/or the display 104 of the external device 100 is also not particularly limited and may include any device capable of visually communicating information to a user, such as but not limited to a liquid crystal display (LCD), a light-emitting diode (LED) display, including an organic LED (OLED) display, or an organic electroluminescent (EL) display. Plasma or CRT are also possibilities for the display 104.

The discharge information detector 14 of the power tool 10 and the charge/discharge information detector 44 of the battery pack 40 may comprise any type of analog, digital or hybrid circuit configured to detect a current value, a voltage value, battery cell(s) temperature and/or a resistive (impedance) value, as is well known in the art.

For example, in one exemplary embodiment, the charge/discharge information detector 44 of the battery pack 40 may comprise a comparator configured to compare a measured voltage value V (which may be the voltage across the battery cells 50 or a voltage value indicative of the current flow I across the battery cells 50) to a reference voltage value. The comparator may output a signal to the controller 42 in case the voltage across the battery cells 50 falls below a predetermined threshold (as represented by the reference value), thereby providing information concerning the remaining battery capacity of the battery cells 50. In addition or in the alternative, the comparator may output another signal when the current across the battery cells 50 has exceeded a predetermined current limit (threshold), thereby indicating that the power tool system 1 is experiencing an overloaded condition. In addition or in the alternative, the comparator may output another signal when the temperature (Temp.), e.g., as measured by a temperature sensor in the battery pack 10 or power tool 10, has exceeded a predetermined a temperature limit (threshold), thereby also possibly indicating the battery pack 40 or power tool system 1 is experiencing an overloaded condition.

In addition or in the alternative, the discharge information detector 14 of the power tool 10 may comprise a comparator configured to compare a measured voltage value V, such as a voltage value indicative of the current flow I across the electric motor M, to a reference voltage value. The comparator may output a signal to the controller 12 in case the current across the motor M has exceeded a predetermined current limit (threshold), thereby indicating the power tool system 1 is experiencing an overloaded condition. In addition or in the alternative, the comparator may output another signal when the temperature (Temp.), e.g., as determined by a temperature sensor, has exceeded a predetermined temperature limit (threshold), thereby also possibly indicating the power tool 10 or power tool system 1 is experiencing an overloaded condition.

Each of these thresholds may be stored in the memory 46 of the battery pack 40, the memory 16 of the power tool 10 and/or the memory 76 of the adapter 70. As was discussed above, one aspect of the present teachings enables the user to change the various thresholds or operating parameters, in order to optimize the performance of the battery pack 40 and the power tool 10, by communicating a new threshold value via the adapter 70. In the alternative, the new value may be input directly into the adapter 70 if the adapter 70 includes an input device, such as a touch pad, push button(s), keyboard, toggle switch, etc.

Thus, in one aspect of the present teachings, an operator (e.g., the user, a tool administrator, a tool manager, etc.) may change one of the thresholds or operating parameters stored in the memory 16, 46 or 76 by inputting the new value into the external device 100 via an input device, such as a keyboard or a display 104 configured as a touch pad. The communicator 108 transmits the new value, either wirelessly or via a wired connection, to the communicator 78 of the adapter 70. As was mentioned above, the new value may be stored in the memory 76 of the adapter 70 and optionally may be accessed by the battery controller 42 via the power tool 10, or it may be accessed by the tool controller 12 via the communication terminals 24, 74. If necessary, the new value may be communicated to the battery pack 40 via communication terminals 26, 56 and optionally also stored in the memory 46.

FIG. 1B identifies some additional functions that optionally may be performed by, and additional features that optionally may be provided in, the respective devices or sub-units within each device. FIG. 1C shows the exterior appearance of the power tool system 1 with cutaway views to show some of the above-described interior circuit blocks.

Second Exemplary Embodiment

The second exemplary embodiment shares many overlapping features, functions, circuits and structures with the first exemplary embodiment. Therefore, circuits and structures that operate in the same or substantially the same way have been assigned the same reference numbers and a further description thereof is not necessary. Reference is made to the first exemplary embodiment for any features, functions, circuits or structures that are not expressly described in the second exemplary embodiment, which are incorporated by reference into the present embodiment.

Figure 2A:
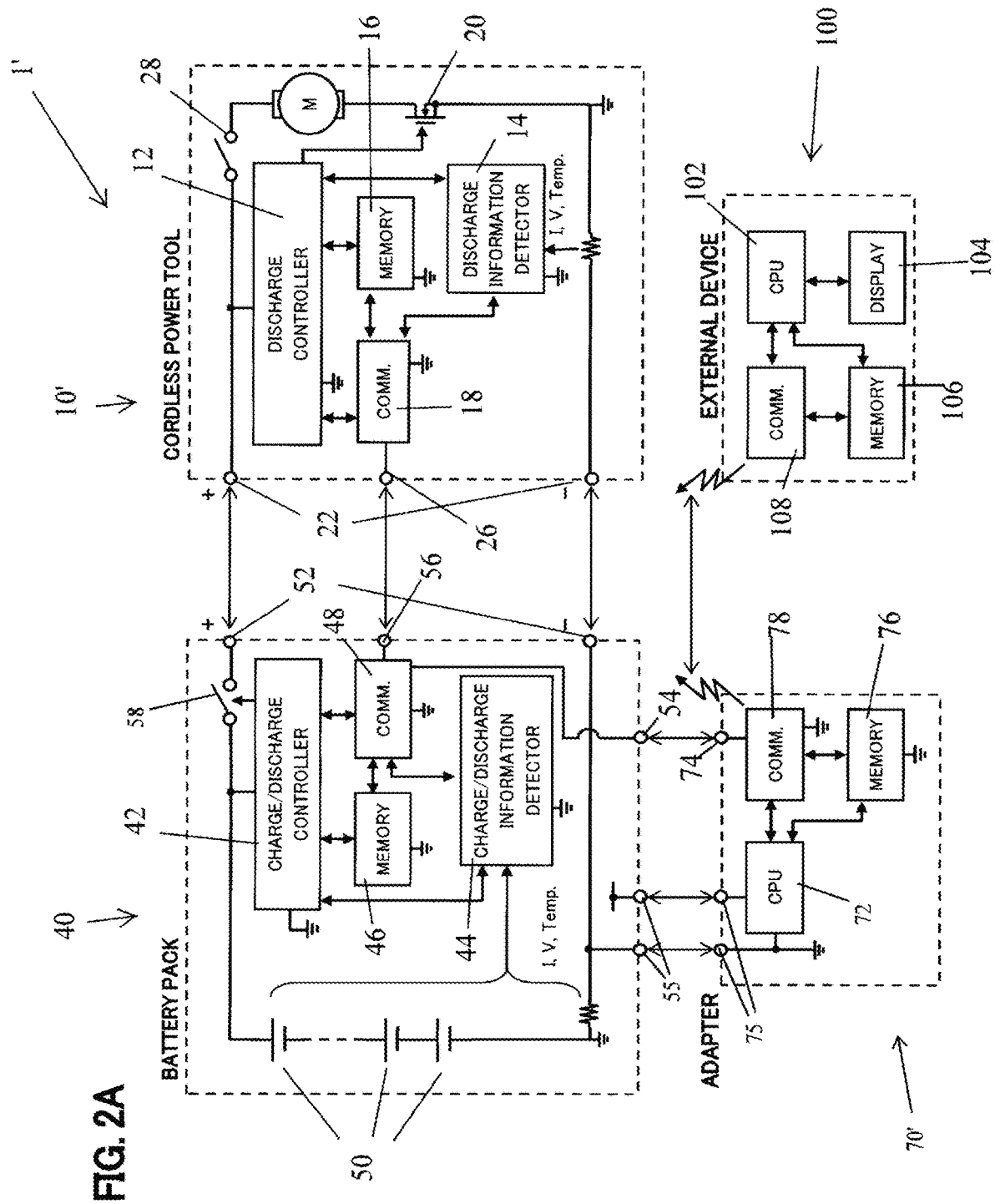
FIG. 2A shows a schematic diagram of a power tool system according to a second exemplary embodiment of the present teachings, in which an adapter directly connects only to the battery pack.

The power tool system 1' of the second exemplary embodiment shown in FIG. 2A primarily differs from the first exemplary embodiment in that the adapter 70' is configured to directly connect to the battery pack 40', instead of directly connecting to the power tool 10'. The external device 100 communicates with the adapter 70' and operates in the same way as the first embodiment.

Thus, in this exemplary embodiment, the communication path is as follows: external device 100 to adapter 70' to battery pack 40' to power tool 10'. In particular, the adapter 70' communicates information and/or data via its communication terminal(s) 74 to the communication terminal(s) 54 located on the battery pack 40', which then communicates directly with the controller 42 via the communicator 48.

However, in all other respects, the adapter 70' may be configured or adapted to perform any one or any arbitrary combination of the functions described above or below.

Figure 2B:
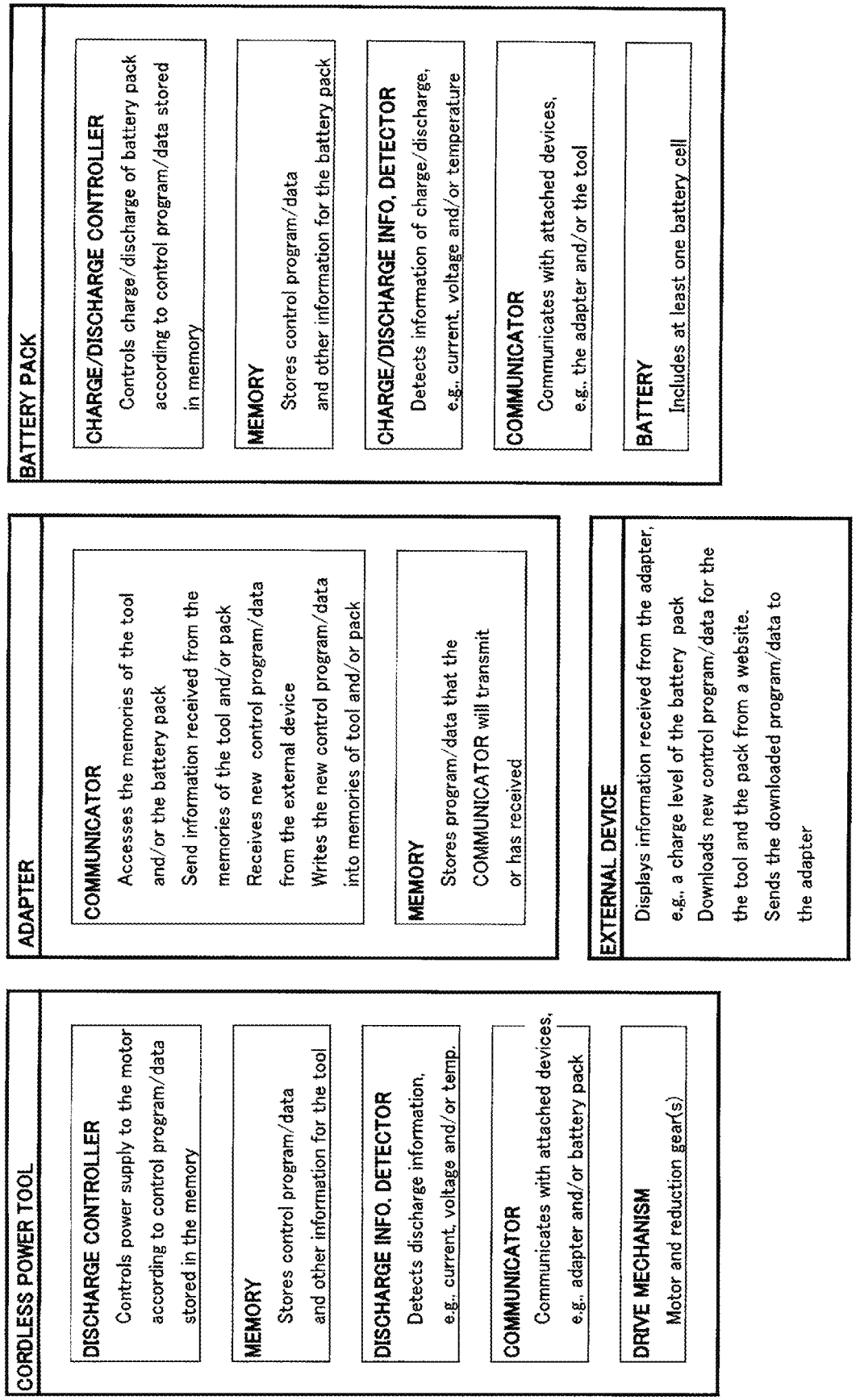
FIG. 2B shows the power tool system according to the second exemplary embodiment of the present teachings in a block diagram.
Figure 2C:
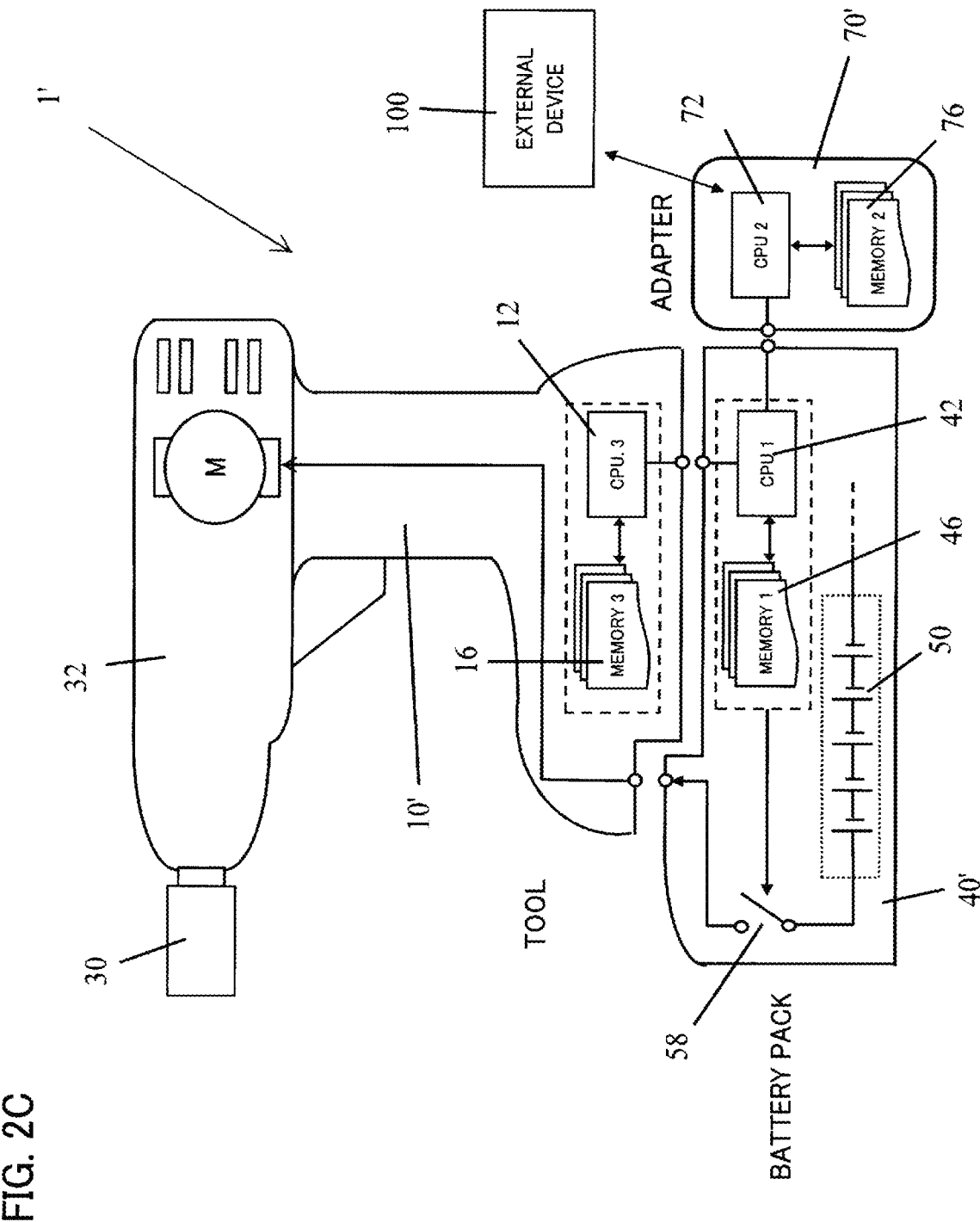
FIG. 2C shows a cutaway view of the power tool system according to the second exemplary embodiment of the present teachings.

FIG. 2B identifies some additional functions that optionally may be performed by, and additional features that optionally may be provided in, the respective devices or sub-units within each device. FIG. 2C shows the exterior appearance of the power tool system 1' with cutaway views to show some of the above-described interior circuit blocks.

The first and second exemplary embodiments provide the advantage that the adapter 70, 70' is not interposed between the power tool 10, 10' and the battery pack 40, 40'. Therefore, it is not necessary to conduct the motor driving current from the battery pack 40, 40' to the power tool 10, 10' via the adapter 70, 70', thereby eliminating the need for providing wiring capable of safely conducting large currents and other protections within the adapter 70, 70'.

However, in certain embodiments, it may be advantageous to interpose the adapter between the power tool and battery pack, as will be discussed in the following exemplary embodiment.

Third Exemplary Embodiment

The third exemplary embodiment also shares many overlapping features, functions, circuits and structures with the first and second exemplary embodiments. Therefore, circuits and structures that operate in the same or substantially the same way have been assigned the same reference numbers and a further description thereof is not necessary. Reference is made to the first or second exemplary embodiment for any features, functions, circuits or structures that are not expressly described in the third exemplary embodiment, which are incorporated by reference into the present embodiment.

Figure 3A:
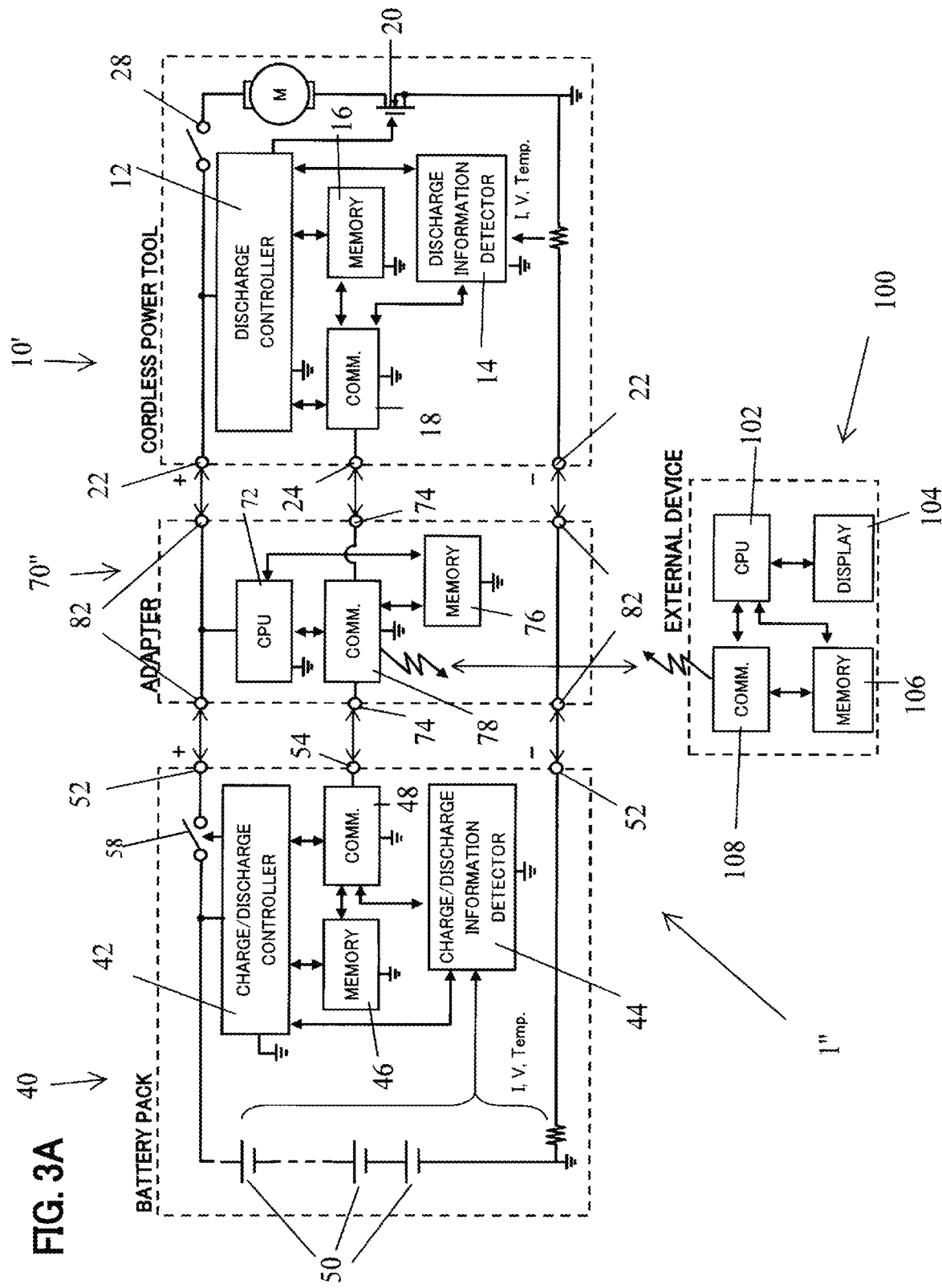
FIG. 3A shows a schematic diagram of a power tool system according to a third exemplary embodiment of the present teachings, in which an adapter is connected between the battery pack and the power tool.

The power tool system 1" of the third exemplary embodiment shown in FIG. 3A primarily differs from the first and second exemplary embodiments in that the adapter 70" is configured to directly connect to both the battery pack 40 and the power tool 10'. The external device 100 communicates with the adapter 70" and operates in the same way as the first and second exemplary embodiments.

Thus, in this exemplary embodiment, the external device 100 communicates with the adapter 70" and the adapter 70" may communicate with one or both of the battery pack 40 and the power tool 10'. In particular, the adapter 70" may communicate information, such as new program code, and/or data via its communication terminal(s) 74 to the communication terminal(s) 54 located on the battery pack 40 and/or via its communication terminal(s) 74 to the communication terminal(s) 24 located on the power tool 10'.

Furthermore, the current for driving the electronic motor M flows through the adapter 70" via its respective battery terminals 82 that connect with the battery terminals 52 of the battery pack 40 on one side and with the battery terminals 22 of the power tool 10' on the other side.

However, in all other respects, the adapter 70" may be configured or adapted to perform any one or any arbitrary combination of the functions described above or below.

Figure 3B:
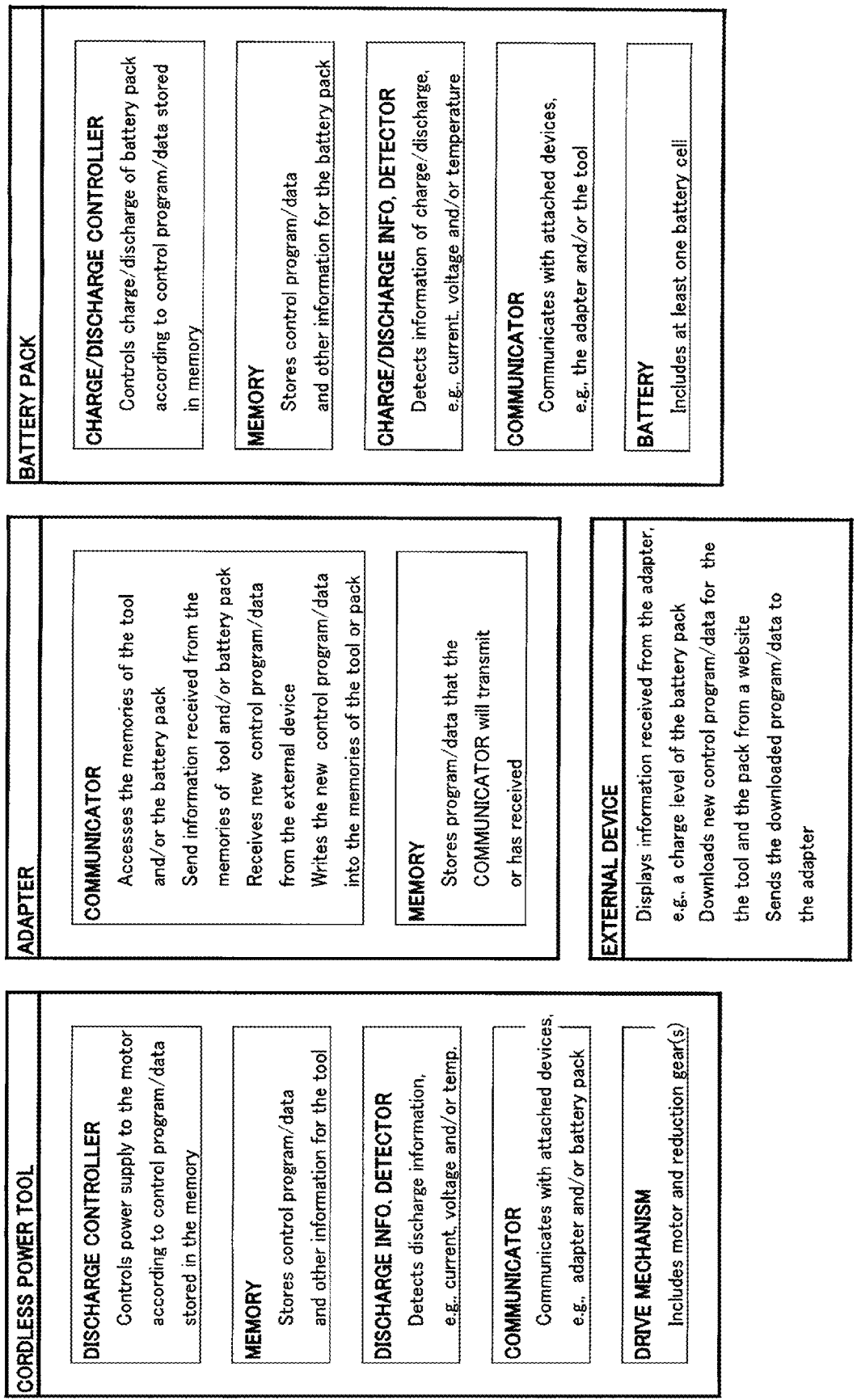
FIG. 3B shows the power tool system according to the third exemplary embodiment of the present teachings in a block diagram.
Figure 3C:
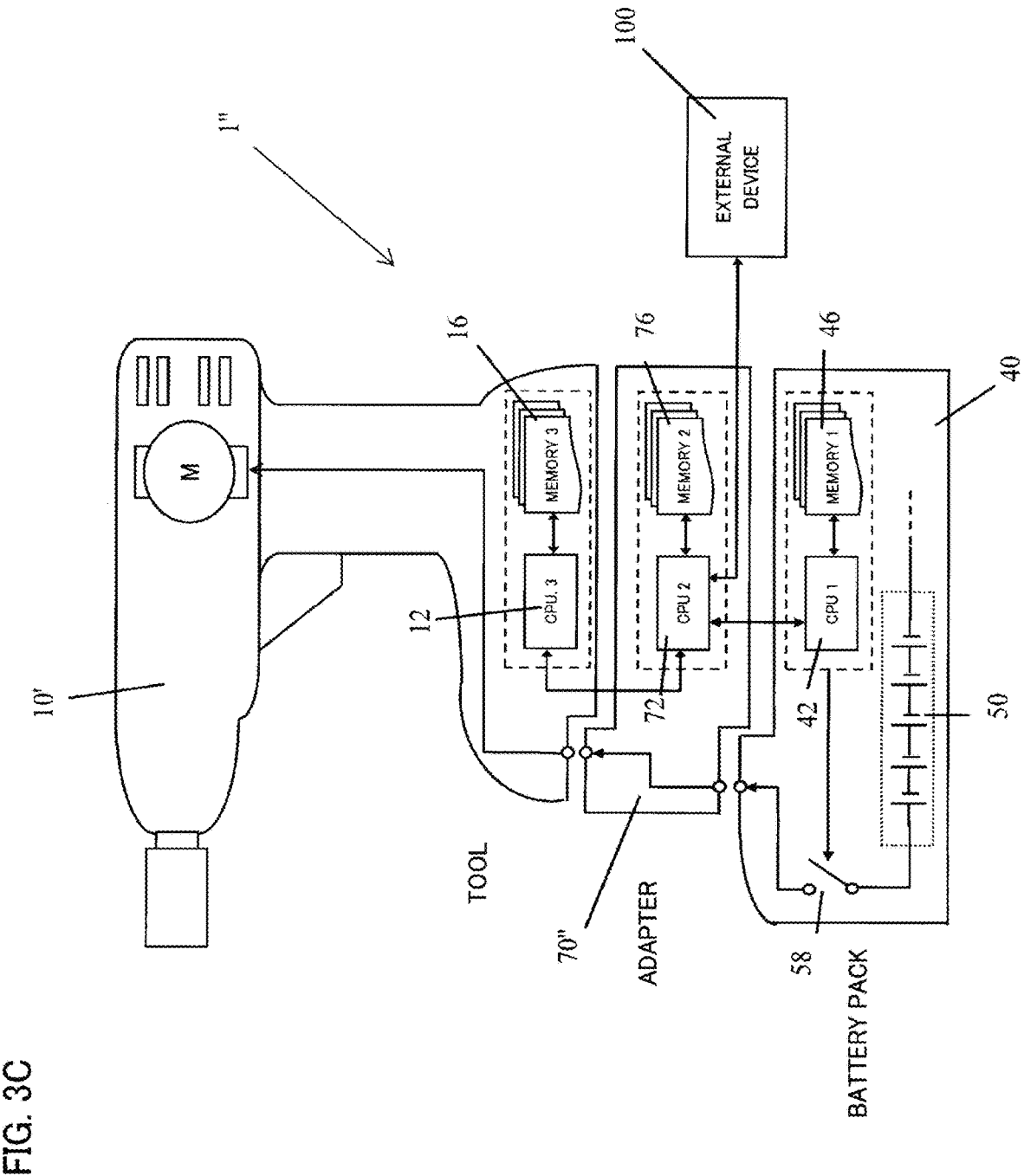
FIG. 3C shows a cutaway view of the power tool system according to the third exemplary embodiment of the present teachings.

FIG. 3B identifies some additional functions that optionally may be performed by, and additional features that optionally may be provided in, the respective devices or sub-units within each device. FIG. 3C shows the exterior appearance of the power tool system 1" with cutaway views to show some of the above-described interior circuit blocks.

Fourth Exemplary Embodiment

The fourth exemplary embodiment also shares many overlapping features, functions, circuits and structures with the first, second and third exemplary embodiments. Therefore, circuits and structures that operate in the same or substantially the same way have been assigned the same reference numbers and a further description thereof is not necessary. Reference is made to the first, second and third exemplary embodiments for any features, functions, circuits or structures that are not expressly described in the fourth exemplary embodiment, which are incorporated by reference into the present embodiment.

Figure 4A:
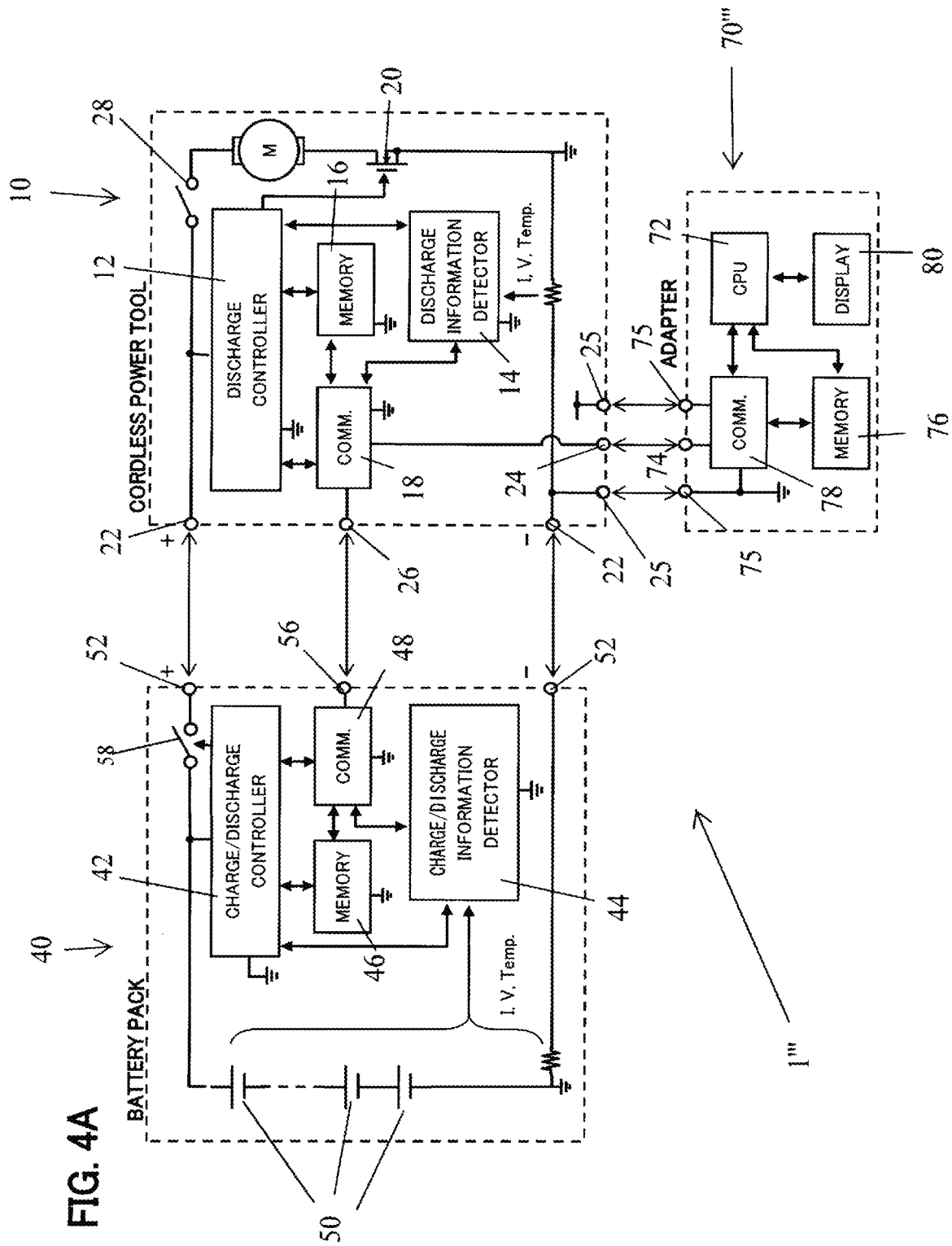
FIG. 4A shows a schematic diagram of a power tool system according to a fourth exemplary embodiment of the present teachings, in which the adapter connects to the power tool and includes a display.

The power tool system 1''' of the fourth exemplary embodiment shown in FIG. 4A primarily differs from the first exemplary embodiment in that the adapter 70''' includes a display 80, but does not include a communicator dedicated to communicating with an external device. The power tool 10 and the battery pack 40 operate in the same way as the first embodiment. As will be understood, this embodiment also may be modified to include communication means (e.g., wireless communication means) according to any of the preceding embodiments.

As was mentioned above, the display 80 of the adapter 70''' is not particularly limited and may include any device capable of visually communicating information to a user, such as but not limited to a liquid crystal display (LCD), a light-emitting diode (LED) display, including an organic LED (OLED) display, or an organic electroluminescent (EL) display. Preferably, the display 80 may be configured as a touch pad that enables the user to directly input instructions into the adapter 70'''. However, another type of input device (not shown), such as a keyboard, push button pad, toggle switch, etc., may optionally be provided for inputting information into the adapter 70''', if desired.

The display 80 preferably may be configured or adapted to display any of the information that was described above or below, such as but not limited to, remaining battery capacity, number of additional power tool operations that may be performed in view of the remaining battery capacity, current limit threshold, battery discharge threshold, etc.

Figure 4B:
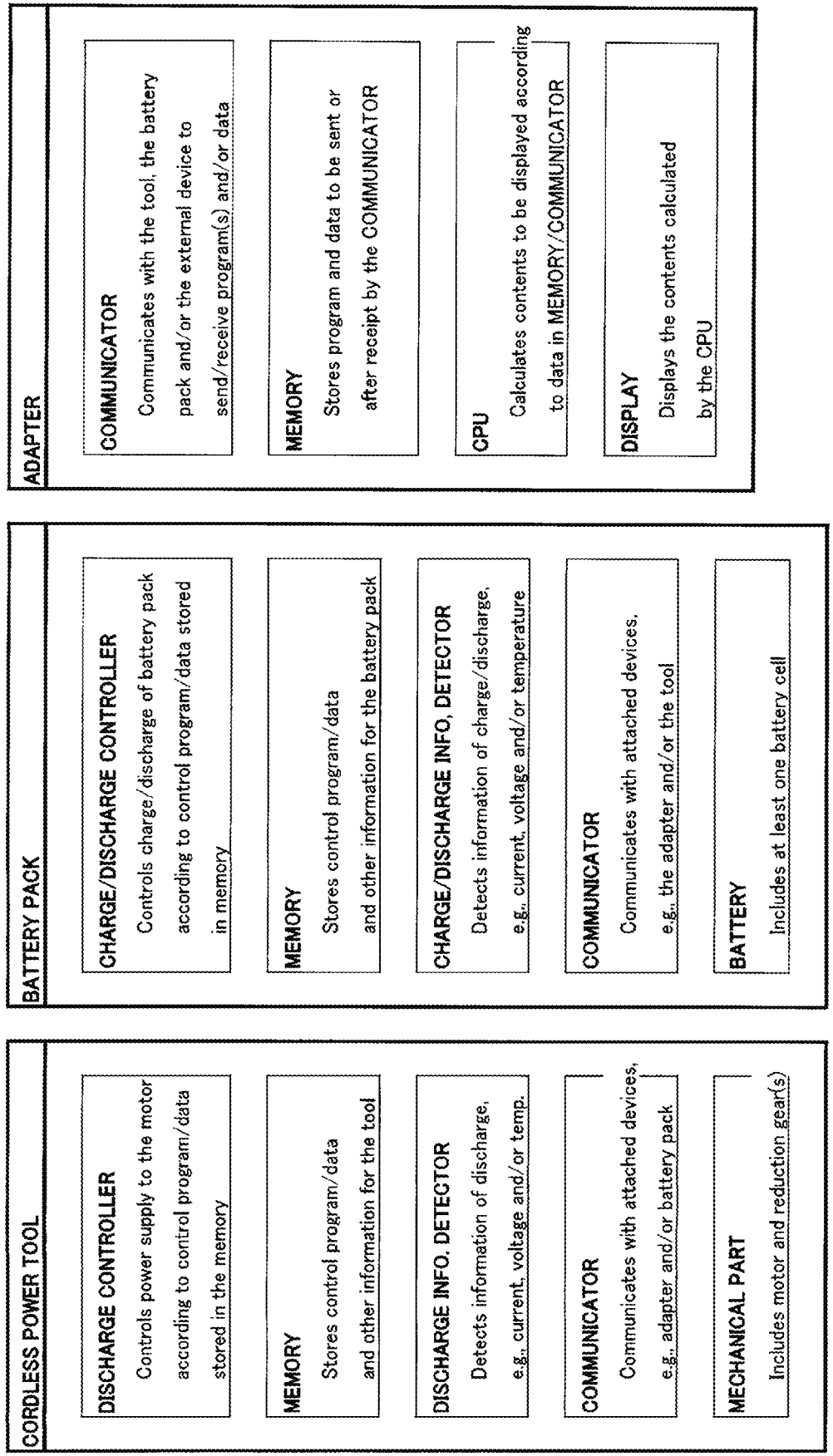
FIG. 4B shows the power tool system according to the fourth exemplary embodiment of the present teachings in a block diagram.
Figure 4C:
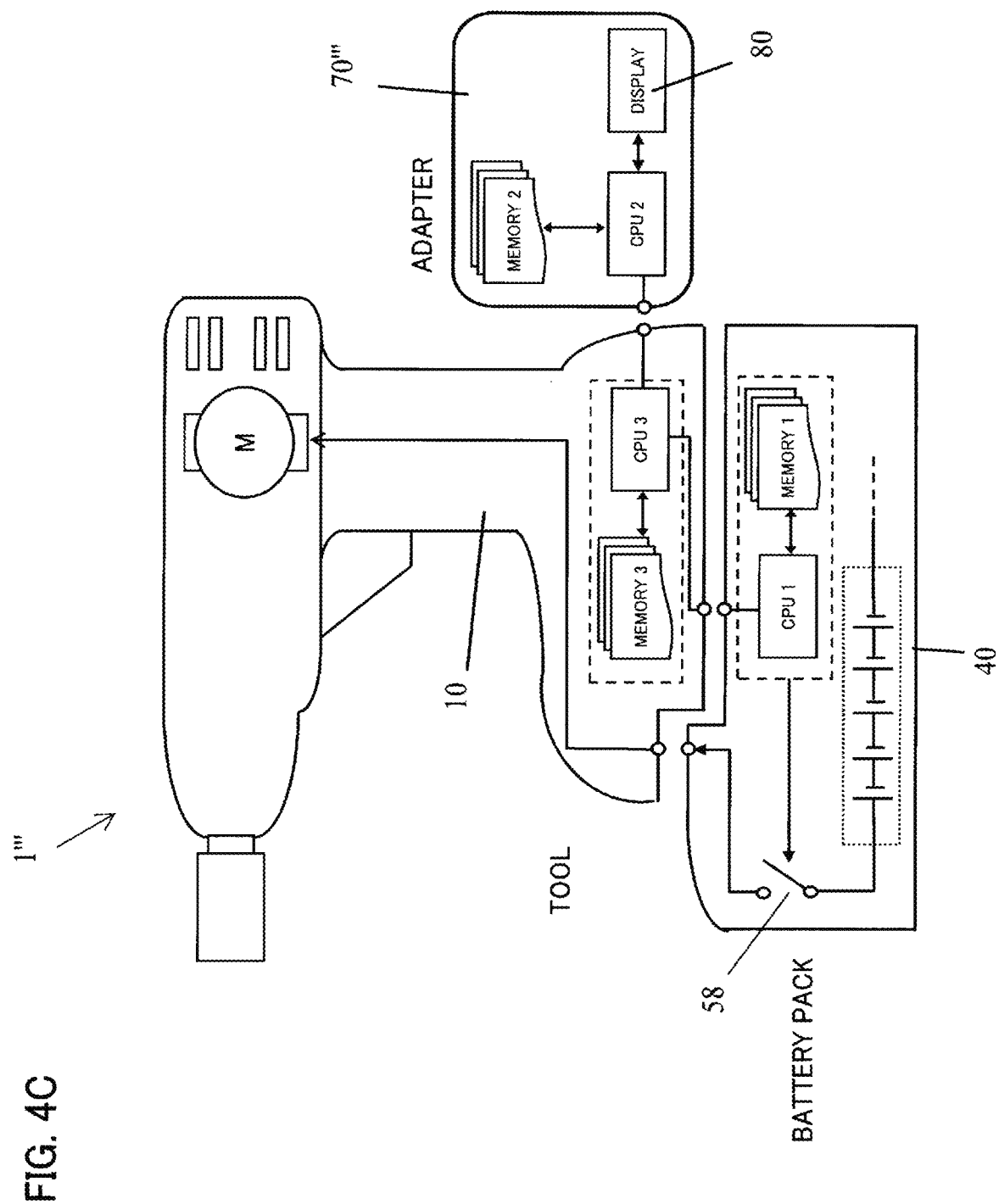
FIG. 4C shows a cutaway view of the power tool system according to the fourth exemplary embodiment of the present teachings.

FIG. 4B identifies some additional functions that optionally may be performed by, and additional features that optionally may be provided in, the respective devices or sub-units within each device. FIG. 4C shows the exterior appearance of the power tool system 1''' with cutaway views to show some of the above-described interior circuit blocks.

Fifth Exemplary Embodiment

The fifth exemplary embodiment also shares many overlapping features, functions, circuits and structures with the first, second, third and fourth exemplary embodiments. Therefore, circuits and structures that operate in the same or substantially the same way have been assigned the same reference numbers and a further description thereof is not necessary. Reference is made to the first, second, third and fourth exemplary embodiments for any features, functions, circuits or structures that are not expressly described in the fifth exemplary embodiment, which are incorporated by reference into the present embodiment.

Figure 5A:
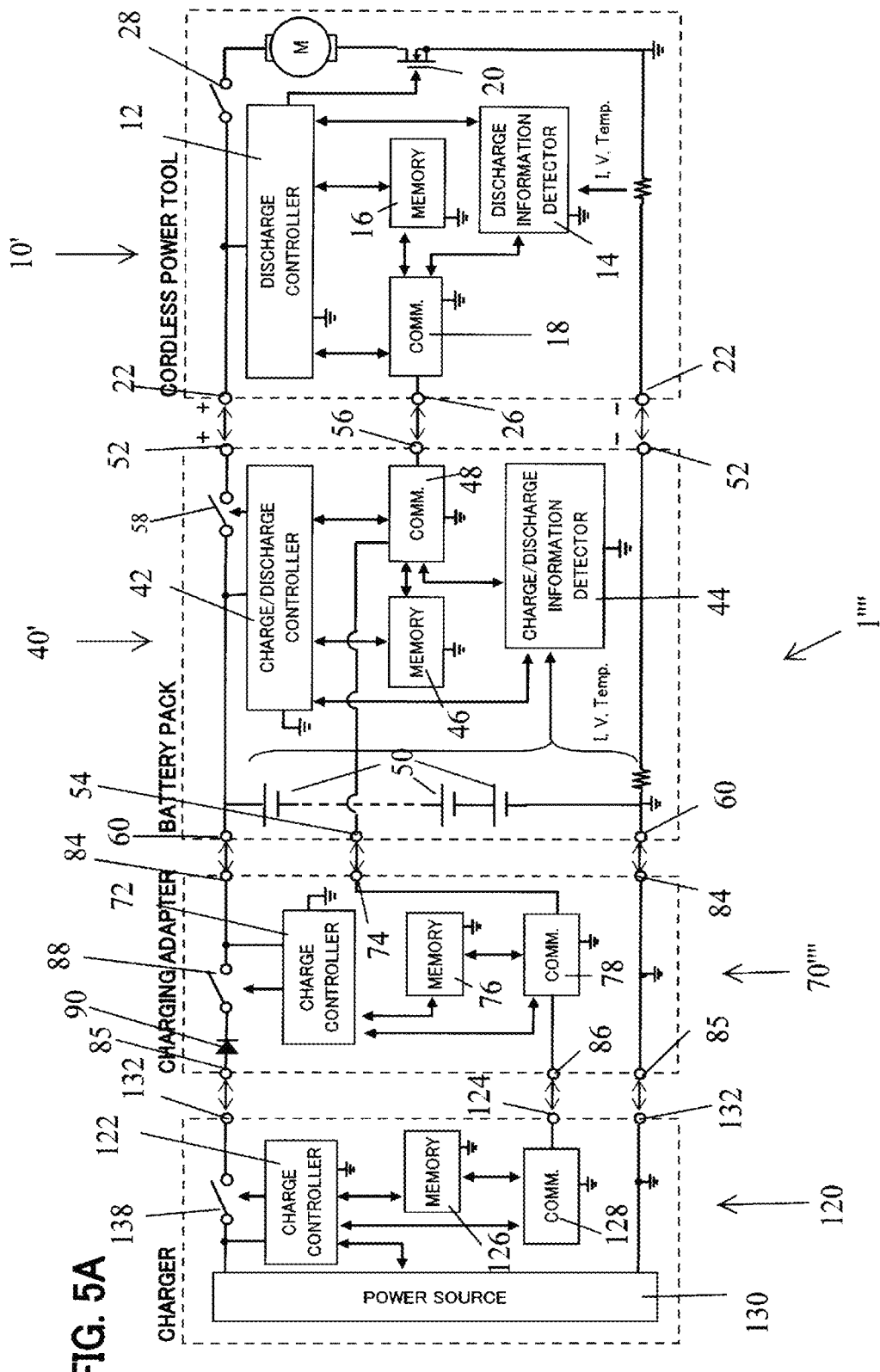
FIG. 5A shows a schematic diagram of a power tool system according to a fifth exemplary embodiment of the present teachings, in which an adapter connects between the battery pack and a charger.

The power tool system 1'''' of the fifth exemplary embodiment shown in FIG. 5A primarily differs from the second exemplary embodiment in that the adapter 70'''' includes charging circuitry and a charger 120 is also provided. The power tool 10' and the battery pack 40' generally operate in the same way as the second embodiment, except that the battery pack 40' is capable of receiving a charging current from the charger 120 via the adapter 70''''. This exemplary embodiment also may be modified to include the (wireless) communication means and/or the display of any of the preceding exemplary embodiments.

As was described above with respect to the various charging embodiments, the adapter 70'''' according to this exemplary embodiment may generally include at least one controller 72, at least one memory 76 and at least one communicator 78. The controller 72 is configured or adapted to execute at least a charging program or protocol stored in the memory 76 or stored in the memory 46 and communicated to the controller 72 via the communication terminals 54, 74. The charging program is not particularly limited according to the present teachings and any charging program suitable for recharging the battery cell(s) 50 located in the battery pack 40' may be utilized. Further, the controller 72 may be configured to execute any of the other functions that are described above or below.

The charger 120 according to this exemplary embodiment includes at least one controller 122, at least one memory 126, at least one communicator 128 and a power source 130. The controller 122 also may execute the charging program in case the charging program is stored in the memory 126, e.g., after being communicated via the communication terminals 86, 124 and the communicator 128, or based upon a charging program stored in the memory 126 at the time of manufacture, or as programmed by an external device post-manufacture.

The battery pack 40', adapter 70'''' and charger 120 each include a cut-off switch 58, 88, 138 (see also FIG. 5C) controlled by the respective controller 42, 72, 122. The cut-off switch 58 may be closed to initiate power tool operations by the power tool 10' and opened in order to protect the internal circuitry in the event an overload or other adverse condition is detected. The cut-off switches 88, 138 may be closed to initiate the charging operation and opened in order to protect the internal circuitry in the event an overload or other adverse condition is detected, or when the charging operation is completed. The adapter 70'''' may include a diode 90 to protect against reverse currents that may damage the internal circuitry.

Figure 31:
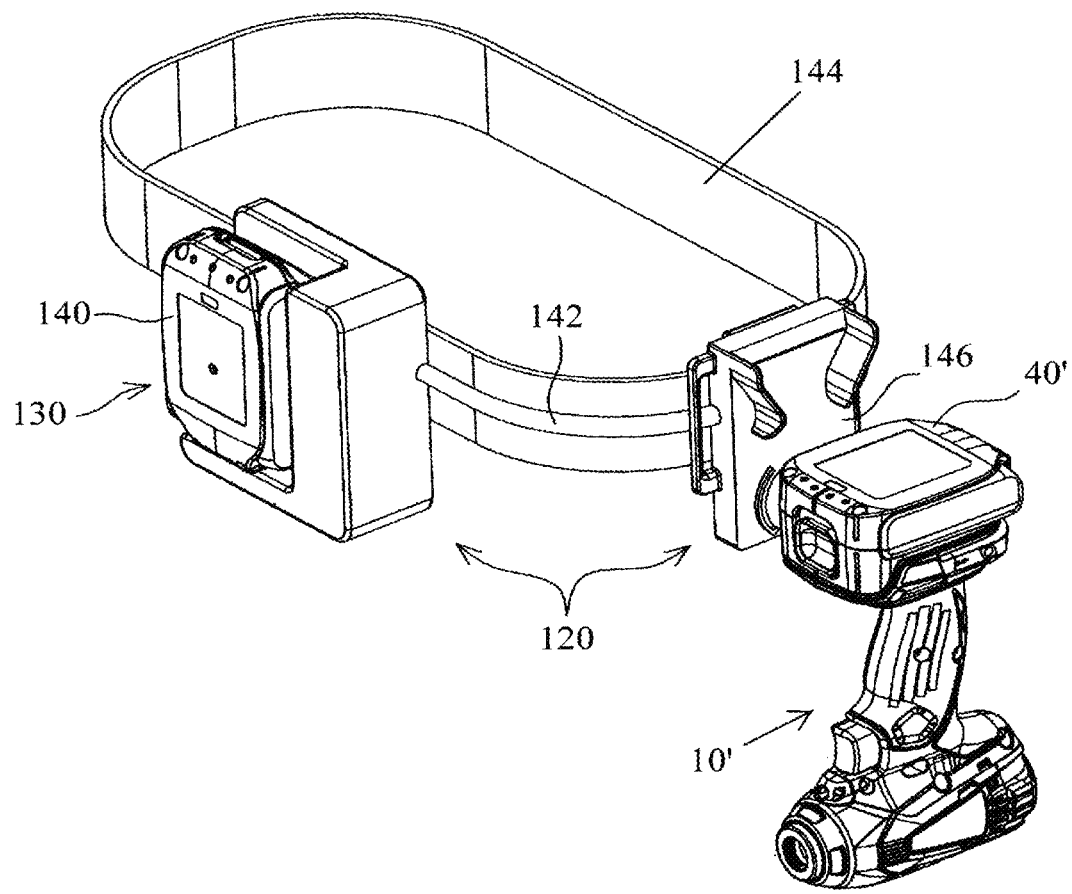
FIG. 31 shows a representative portable charging system using the embodiment of FIGS. 5A-C.

The power source 130 may be an AC power supply, e.g., a commercial AC power supply or an alternating current supplied by a generator, or an external DC power supply, such as a vehicle battery system. However, in preferred embodiments, the power source 130 is a DC power supply 140 that is contained within the charger 120 or is attached to the charger 120, e.g., either directly or via a flexible power cord 142, as shown in FIG. 31. The power source 130 preferably includes one or more rechargeable battery cells, such as lithium-based battery cells, that preferably have a relatively high charge storage capacity, e.g., higher than the charge storage capacity of the battery cells 50, as was described further above.

The power tool system 1'''' according to the present embodiment may be operated according to the "belt charging" embodiment that was described above. Referring further to FIG. 31, the charger 120 includes the DC power supply 140 that can be carried by the user while working. A means for attaching the charger 120 to the user, such as a belt 144, or alternatively a harness, strap, backpack, etc., may be utilized so that the user can easily and comfortably wear or carry the charger 120 on his/her body, e.g., a limb or on the torso or back. The charging terminals 132 (not shown in FIG. 31) are preferably provided on the belt 140 in or on a belt hook receiver 146 that will be described further below.

Referring again to FIG. 5A, the adapter 70'''' preferably includes a portion that directly connects to the battery pack 40' via the charging terminals 84. The charging terminal receivers 85 are configured to directly connect to the charging terminals 132 of the charger 120 and are preferably disposed in or on a belt hook, which will be further described and shown below with respect to the sixth exemplary embodiment. The belt hook and the belt hook receiver 146 are preferably configured in complementary shapes so as to engage in an interlocking, interference or form-fit when the user hangs the power tool 10' on his/her tool belt 144 by engaging the belt hook on the adapter 70'''' (or on the battery pack 40') with the belt hook receiver 146.

When the terminals 85, 132 are in contact and thus are capable of conducting charging current from the charger 120 to the battery pack 40' via the adapter 70'''', one or more of the controllers 42, 72, 122 may sense or detect the connection so as to initiate the supply of charging current. When the terminals 85, 132 are separated, e.g., because the user has removed the power tool 10' from his/her tool belt 144, one or more of the controllers 42, 72, 122 may sense or detect the dis-connection so as to terminate the supply of charging current, thereby saving power.

In addition, the charge detector 44 may continuously or intermittently sense the charge state of the battery cells 50 during the charging operation. When the battery cells 50 are determined to be fully recharged, the controller 42 of the battery pack 40' may transmit a signal to the adapter 70'''' and/or to the charger 120 to stop the supply of charging current, thereby avoiding power waste.

As was described above, the adapter 70'''' of this embodiment need not include the charger controller 72, memory 76 or communicator 78. Instead, the adapter 70'''' may be configured simply as the belt hook that is physically connected to the battery pack 40' and includes the charging terminal receivers 85 configured to directly connect to the charging terminals 132. The belt hook thus only serves to conduct the charging current from the charger 120 to the battery pack 40' and is not required to perform any other functions.

Furthermore, as was described above, it is not necessary to communicate the charging current (power) from the charger 120 to the adapter 70'''' via a wired or direct connection. Instead, the charging terminals 132 of the charger 120 may be replaced with a wireless power transmitting antenna, such as an induction coil, and the charging terminal receivers 85 of the adapter 70'''' (or belt hook) may be replaced with a wireless power receiving antenna, such as an induction coil. In this case, when the wireless power receiving antenna is brought into proximity with the wireless power transmitting antenna, e.g., as detected by a proximity sensor, such as a pressure sensor, a magnetic sensor, an RFID device (tag and interrogator), an electrical resistive or capacitive sensor, etc., the wireless power transmitting antenna of the charger 120 may begin to emit a varying or oscillating electromagnetic field, e.g., a magnetic flux, that causes a current to flow in the wireless power receiving antenna of the adapter 70''''. This current may then be converted into an appropriate charging current that is supplied to the battery cell(s) 50.

This embodiment is advantageous in that the wireless power transmitting antenna need only be brought into proximity with the wireless power receiving antenna in order to perform the charging operation, which may be more convenient for the user, because it eliminates the necessity of ensuring that the charging terminal receivers 85 on or in the belt hook are properly engaged with the charging terminals 132 on or in the belt hook receiver 146.

This wireless embodiment may also be implemented using the complementary belt hook and belt hook receiver 146 for housing the wireless power receiving antenna and the wireless power transmitting antenna, respectively. In this case, when the user places the power tool 10' on his/her tool belt 144, by placing the belt hook disposed on the adapter 70'''' or battery pack 40' in or on (i.e. at least adjacent to or in proximity with) the belt hook receiver 146, a proximity sensor may detect the presence of the belt hook and cause the charger 120 to begin wirelessly transmitting power, e.g., by applying an oscillating current to the wireless power transmitting antenna (e.g., an induction coil).

As was described above, the adapter 70'''' of this wireless embodiment also need not include the controller 72, memory 76 or communicator 78. Instead, the adapter 70'''' may be configured simply as the belt hook that is physically connected to the battery pack 40' and includes the wireless power receiving antenna (e.g. an induction coil) for absorbing or taking the power being wirelessly transmitted by the charger 120. The belt hook may also include basic circuitry for supplying a current to the battery pack 40'. The controller 42 of the battery pack 40 may execute a charging program stored in the memory 46 for recharging the battery cell(s) 50. The belt hook thus only serves to supply a current to the battery pack 40' and is not required to perform any other functions.

Further teachings concerning the wireless transmission of power for charging a power tool battery are provided in a U.S. provisional application No. 61/511,089, the contents of which are incorporated by reference as if fully set forth herein.

Figure 5B:
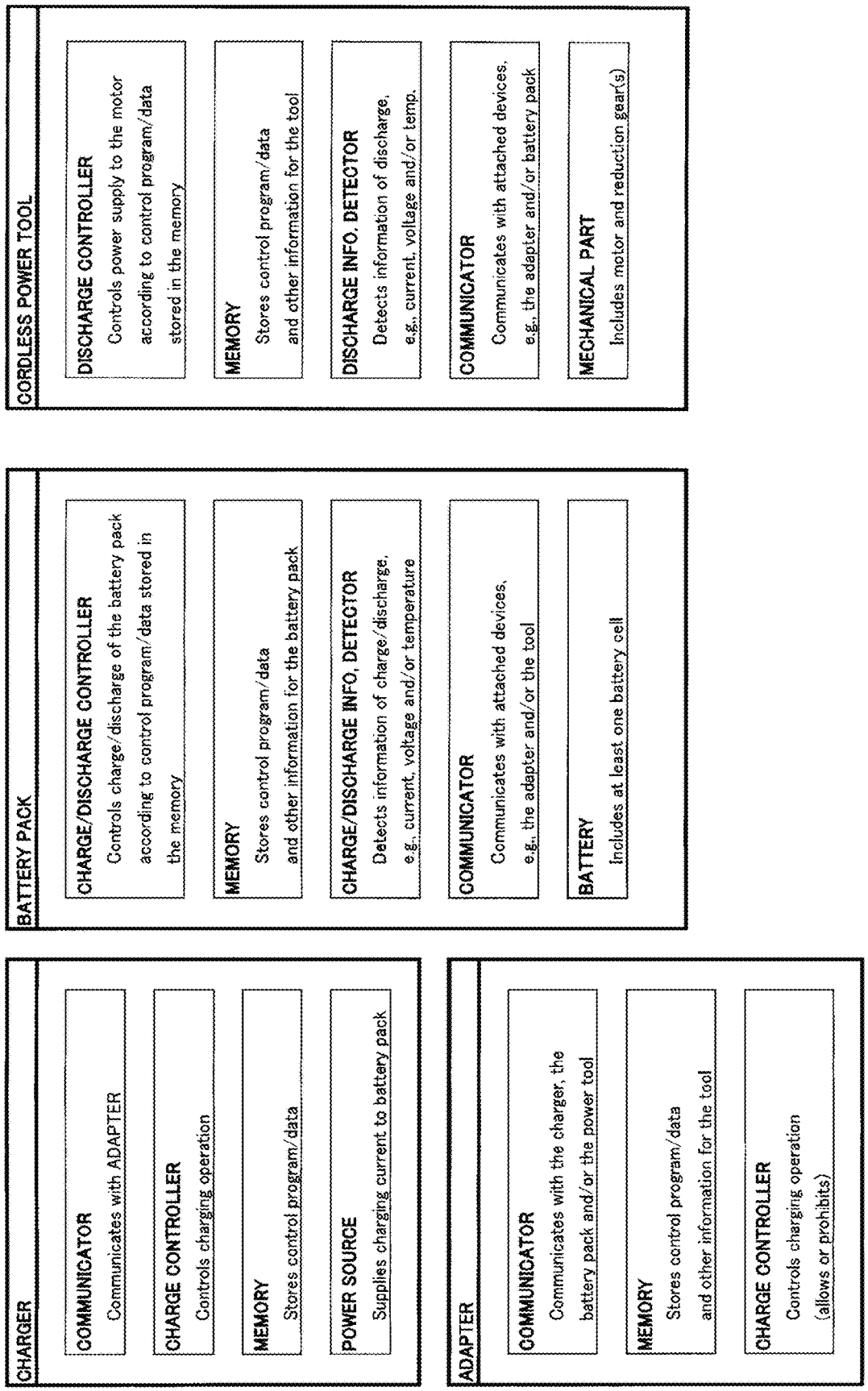
FIG. 5B shows the power tool system according to the fifth exemplary embodiment of the present teachings in a block diagram.
Figure 5C:
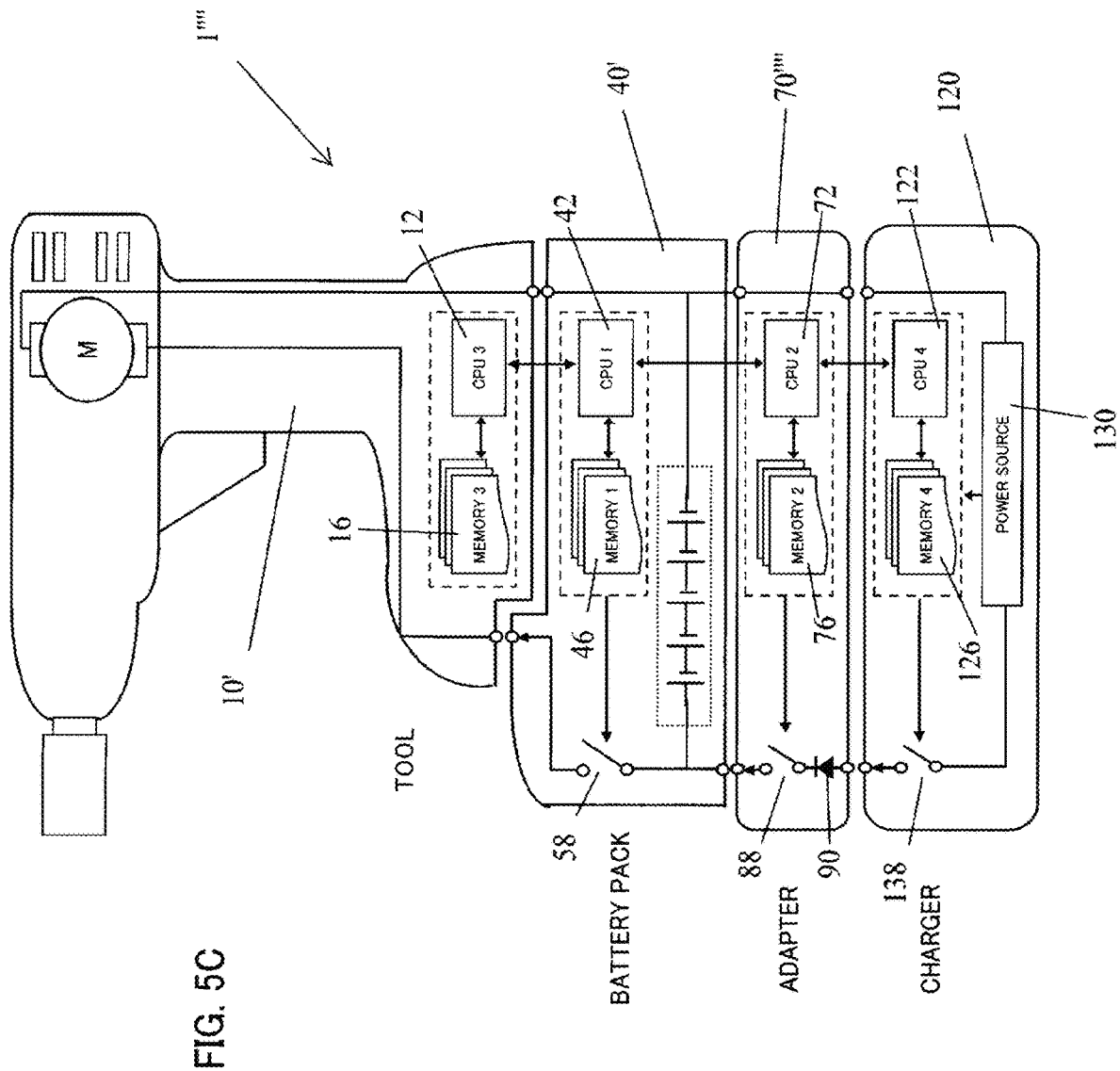
FIG. 5C shows a cutaway view of the power tool system according to the fifth exemplary embodiment of the present teachings.

FIG. 5B identifies some additional functions that optionally may be performed by, and additional features that optionally may be provided in, the respective devices or sub-units within each device. FIG. 5C shows the exterior appearance of the power tool system 1'''' with cutaway views to show some of the above-described interior circuit blocks.

Sixth Exemplary Embodiment

The sixth exemplary embodiment also shares many overlapping features, functions, circuits and structures with the first, second, third, fourth and fifth exemplary embodiments. Therefore, circuits and structures that operate in the same or substantially the same way have been assigned the same reference numbers and a further description thereof is not necessary. Reference is made to the first, second, third, fourth and fifth exemplary embodiments for any features, functions, circuits or structures that are not expressly described in the sixth exemplary embodiment, which are incorporated by reference into the present embodiment.

Figure 6A:
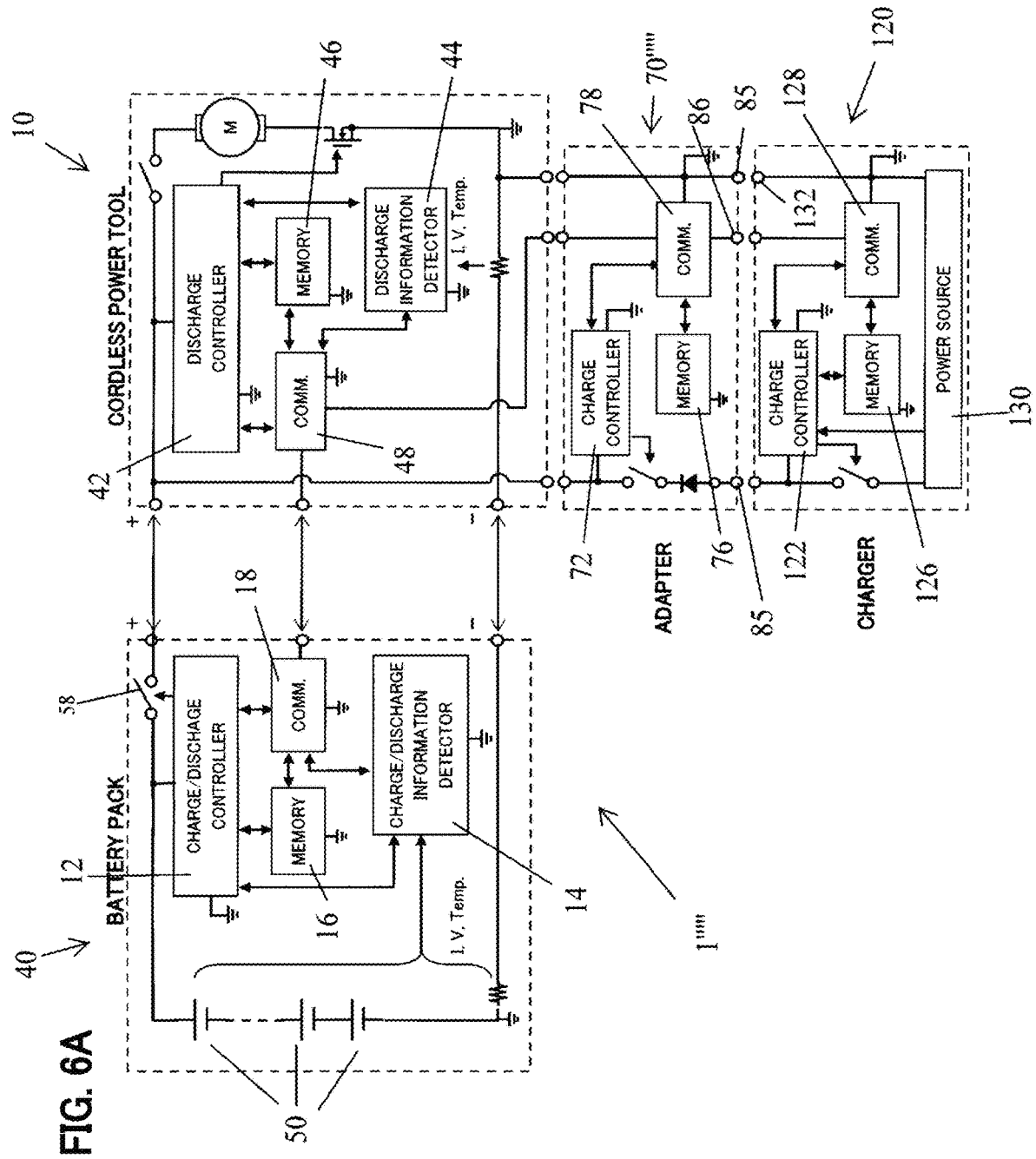
FIG. 6A shows a schematic diagram of a power tool system according to a sixth exemplary embodiment of the present teachings, in which an adapter connects between the power tool and a charger.

The power tool system 1''''' of the sixth exemplary embodiment shown in FIG. 6A primarily differs from the fifth exemplary embodiment in that the adapter 70''''' is configured to connect to the power tool 10, similar to the first exemplary embodiment described above. The power tool 10 and the battery pack 40 generally operate in the same way as the first exemplary embodiment, except that the battery pack 40 is capable of receiving a charging current from a charger 120 via the adapter 70''''' and the power tool 10. Again, this exemplary embodiment also may be modified to include the (wireless) communication means and/or the display of any of the preceding exemplary embodiments.

Furthermore, the charger 120 and adapter 70''''' may operate in the same manner as described above with respect to the fifth exemplary embodiment, such that it is not necessary to repeat the entire description of the charger 120 and adapter 70''''' in the present embodiment. Rather, the teachings of the fifth exemplary embodiment are incorporated entirely into the present embodiment.

Figures 32A, 32B, 32C:
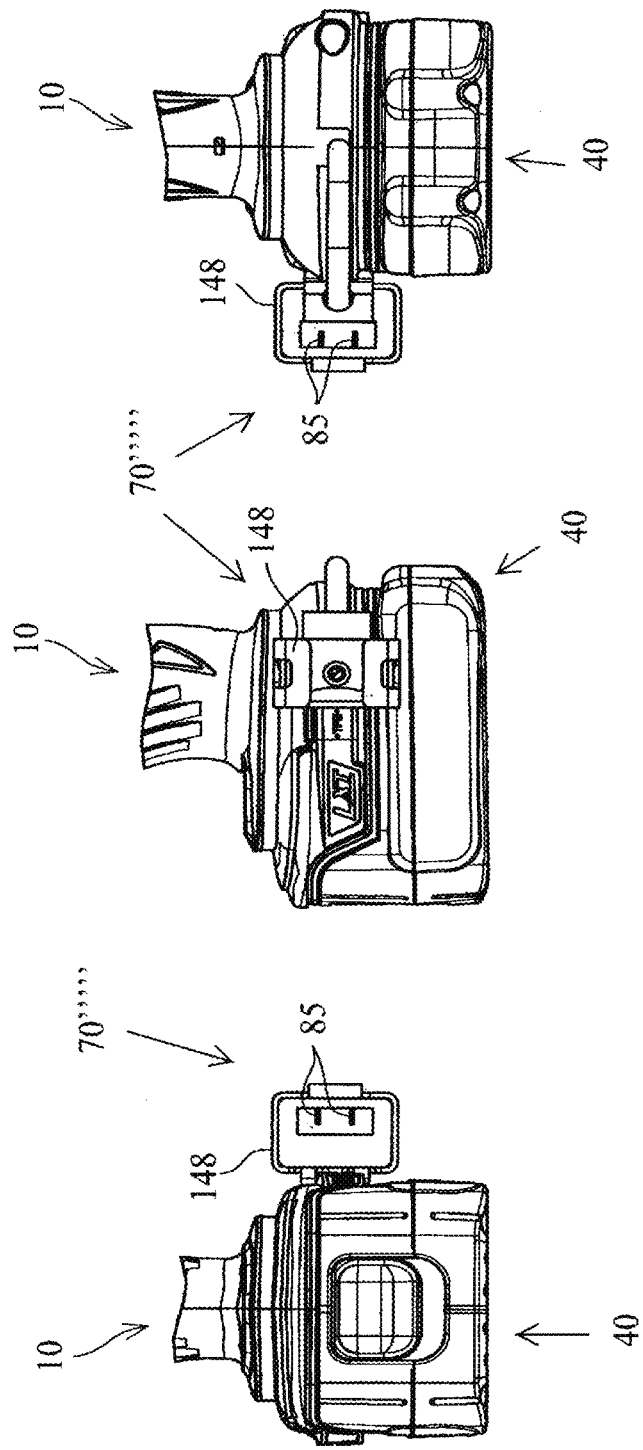
FIGS. 32A-C show front, side and rear views of a power tool system including the adapter of FIGS. 6A-C.

Referring to FIGS. 32A-C, the charging terminal receivers 85 of the adapter 70''''' are configured to directly connect to the charging terminals 132 of the charger 120 (disposed on the belt hook receiver 146 shown in FIG. 31) and are preferably disposed in or on a belt hook 148. As was described above, the belt hook 148 and the belt hook receiver 146 are preferably configured in complementary shapes so as to engage in an interlocking, interference or form-fit when the user hangs the power tool 10' on his/her tool belt 144 by engaging the belt hook 148 on the adapter 70''''' (or on the battery pack 40') with the belt hook receiver 146.

Figure 6B:
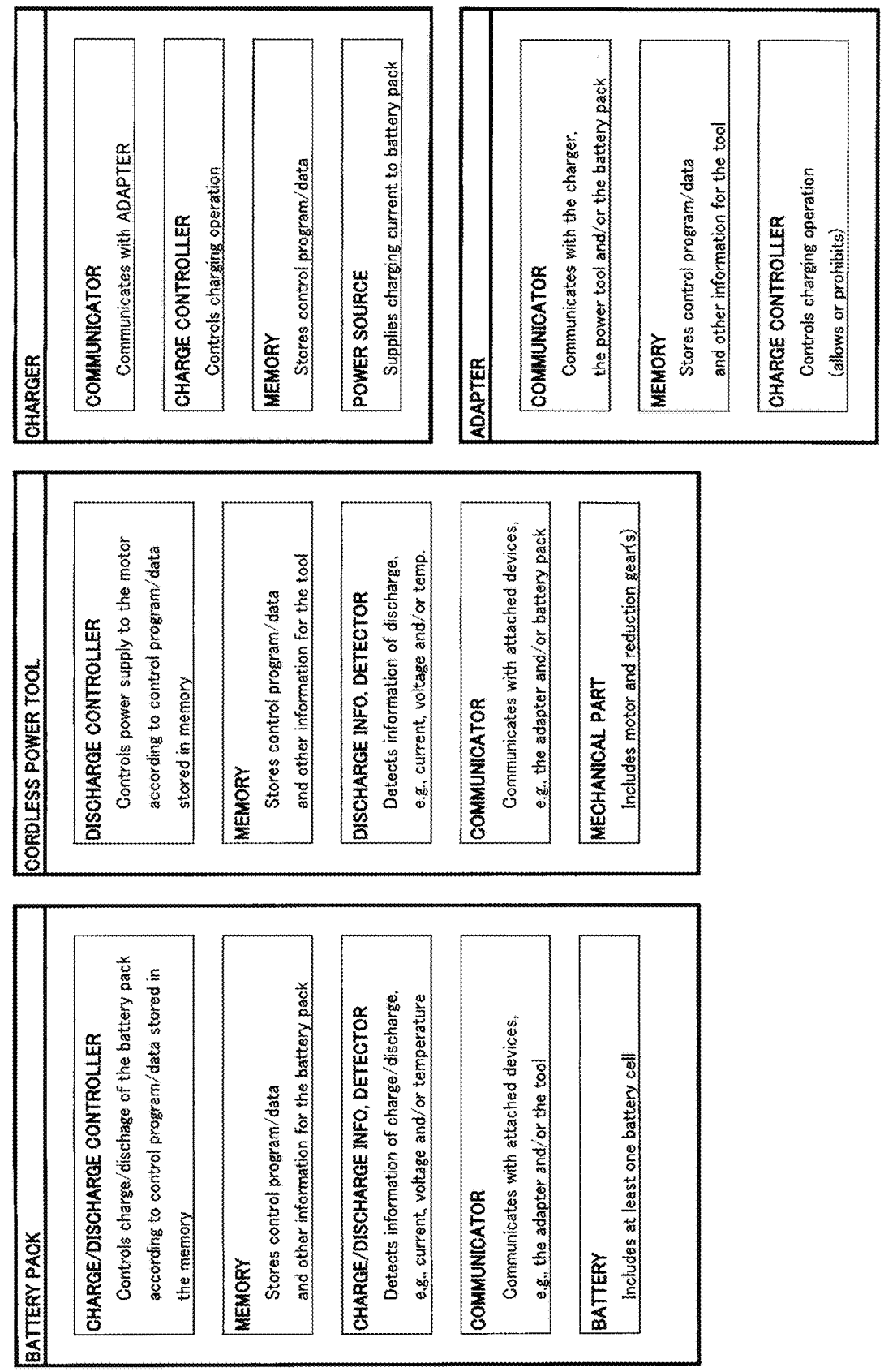
FIG. 6B shows the power tool system according to the sixth exemplary embodiment of the present teachings in a block diagram.
Figure 6C:
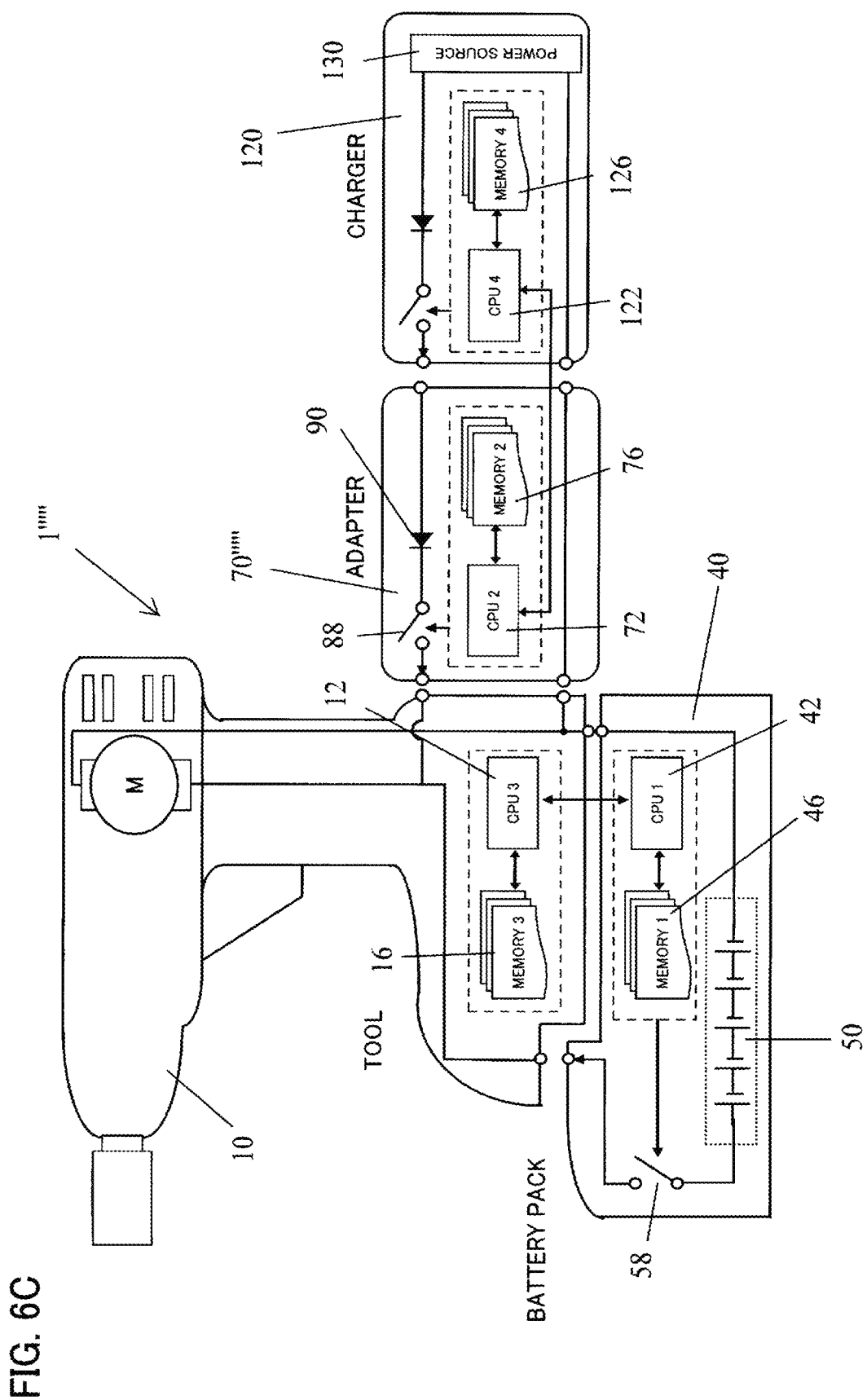
FIG. 6C shows a cutaway view of the power tool system according to the sixth exemplary embodiment of the present teachings.

FIG. 6B identifies some additional functions that optionally may be performed by, and additional features that optionally may be provided in, the respective devices or sub-units within each device. FIG. 6C shows the exterior appearance of the power tool system 1''''' with cutaway views to show some of the above-described interior circuit blocks.

While the fifth and sixth exemplary embodiments illustrate the charging function being performed by connecting the adapter to only one of the power tool or the battery pack, of course, the charging function may also be implemented in an adapter that connects to both the power tool and the battery pack, similar to the fourth exemplary embodiment. Therefore, an embodiment is expressly understood as falling within the scope of the present teachings, in which an adapter is interposed between the power tool and the battery pack and contains the charging functionality described in the fifth and sixth exemplary embodiments.

Seventh Exemplary Embodiment

Figure 7:
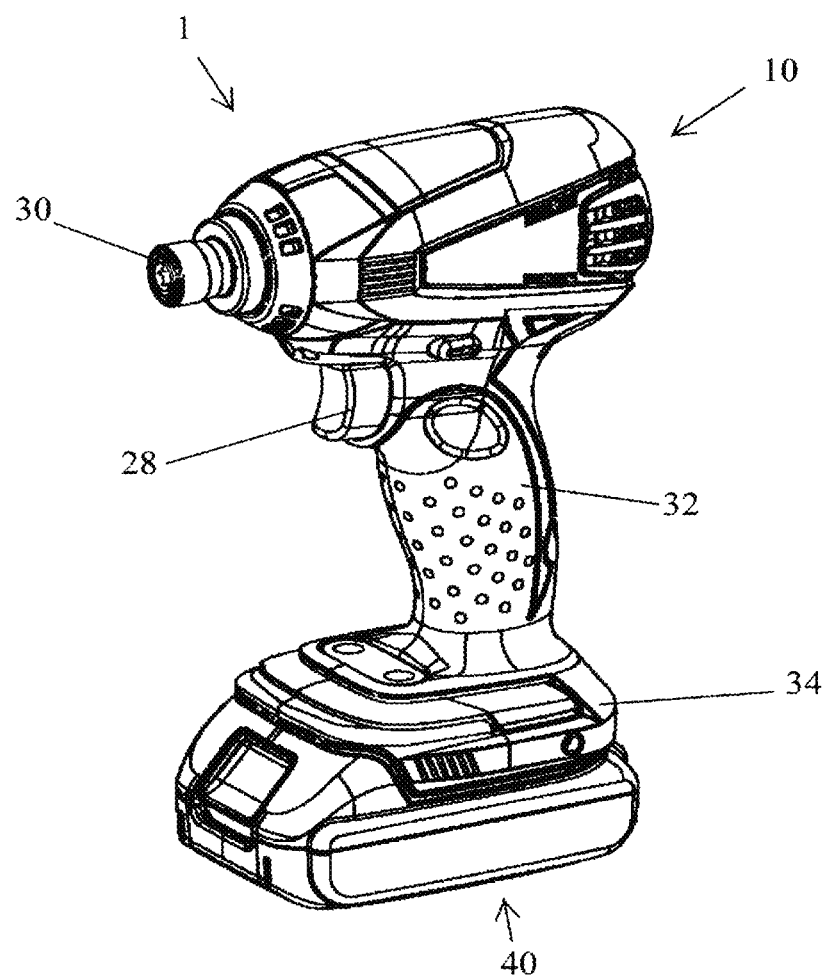
FIG. 7 shows the outer appearance of a power tool system according to a seventh exemplary embodiment of the present teachings, which is a further development of the first exemplary embodiment of the present teachings.

FIG. 7 shows the outer appearance of a representative power tool system according to a seventh exemplary embodiment of the present teachings, which is a further development of the above-described first exemplary embodiment. Therefore, where appropriate, the same reference numbers for the same elements as in the first exemplary embodiment will be used in the seventh exemplary embodiment and the description thereof is incorporated by reference into the seventh exemplary embodiment.

The power tool system 1 shown in FIG. 7 comprises a hand-held power tool 10 and a battery pack 40. The battery pack 40 is configured to be detachably attached to a battery pack interface 34 provided on the power tool housing 32. The attached battery pack 40 supplies current to the power tool 10, e.g., to an electric motor M contained therein, which serves as an electrically-driven device, although other electrically-driven devices are possible with the present teachings, such as e.g., lights, radios, etc.

Figure 8:
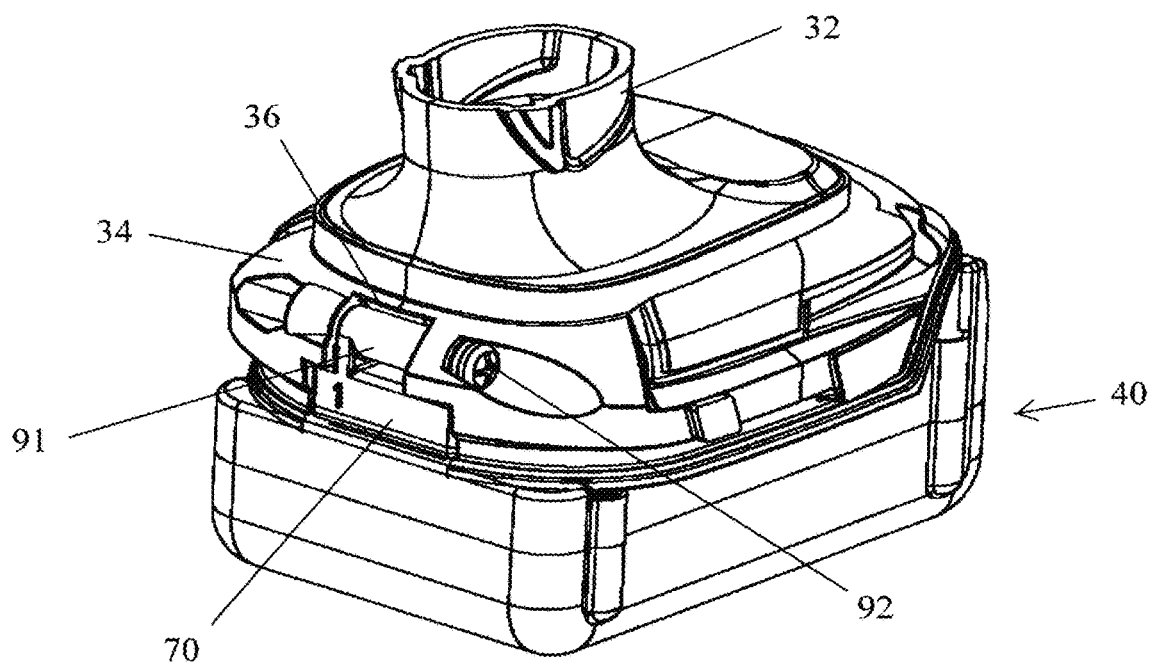
FIG. 8 shows a rear view of a battery pack interface and an adapter provided for the power tool system of the seventh exemplary embodiment of the present teachings.

FIG. 8 shows a rear view of the battery pack interface 34 with an adapter 70 provided for this power tool system 1. The adapter 70 is located between the power tool housing 32 and the battery pack 40. The adapter 70 shown in FIG. 8 is a wireless communication adapter (as was described in more detail above), which is an example of a relatively small-sized adapter. In this embodiment, the entire adapter 70 is located between the power tool housing 32 and the battery pack 40, such that none (no part) of the adapter 70 projects or protrudes beyond the outer surface or contour of the power tool housing 32 and battery pack 40.

Further, the power tool 10 and the battery pack 40 are configured such that an opening 36 visibly exposes at least a portion of the adapter 70 so that the power tool user can visually examine in a convenient manner which kind of the adapter (i.e. which functionality it provides) is presently attached to the power tool 10. A specific indication such as a name, a letter or code, e.g. "1", may be provided on the outer surface of the communication adapter 70 to indicate the kind of the adapter.

Figure 9:
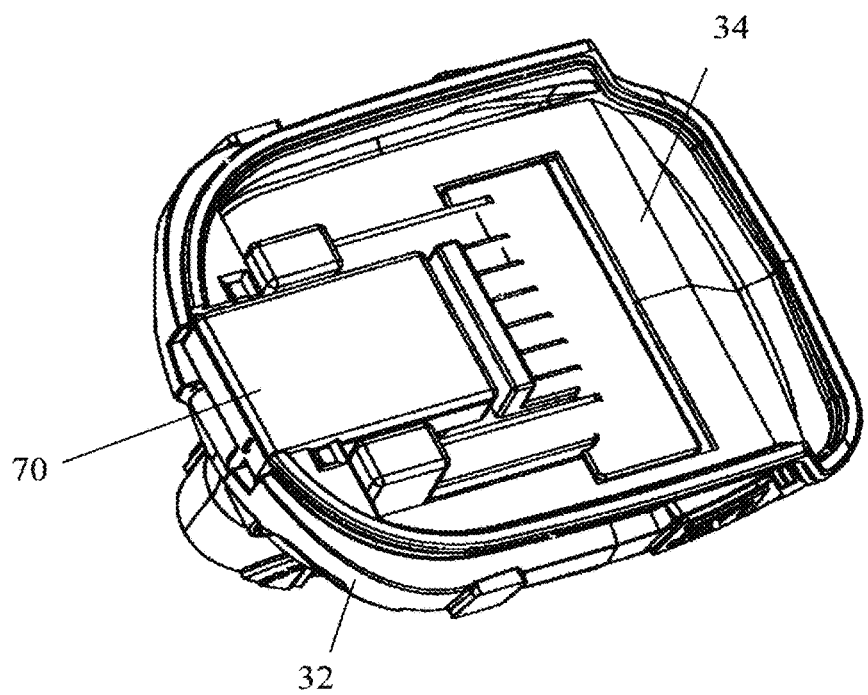
FIG. 9 shows a bottom view of the battery pack interface defined or provided on the power tool housing of the seventh exemplary embodiment of the present teachings without the battery pack attached thereto.

FIG. 9 shows a bottom view of the battery pack interface 34 defined or provided on the power tool housing 32 without the battery pack 40 attached thereto. The adapter 70 is configured to be detachably attached to the power tool housing 32. In this embodiment, both the battery pack 40 and the adapter 70 may be attached to the power tool housing 32 such that the adapter 70 is not directly connected to the battery pack 40. Furthermore, the battery pack 40 can be attached to the power tool housing 32 (i.e. to the battery pack interface 34 thereof), and thus to supply current to the power tool 10, regardless of whether the adapter 70 is present (connected) or not.

Figure 10:
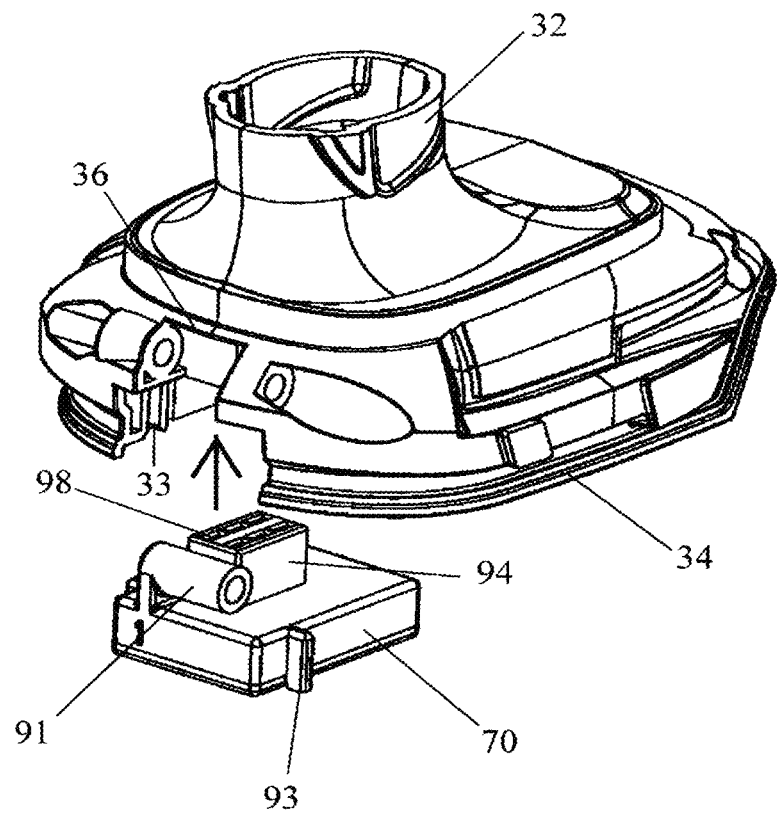
FIG. 10 shows the adapter detached from the power tool housing of the seventh exemplary embodiment of the present teachings.

FIG. 10 shows the adapter 70 detached from the power tool housing 32. In this embodiment, the adapter 70 is attached to and detached from the battery pack interface 34 via the lower or bottom side thereof. Therefore, in this embodiment, it is possible to attach and detach the adapter 70 only when the battery pack 40 is detached (separated) from the power tool 10. Accordingly, users can safely attach the adapter 70 to (and detach it from) the power tool housing 32, because the battery pack 40 is detached and thus no power is being supplied to the power tool 10 and the adapter 70.

Further, the lower side of adapter 70 is supported by the battery pack 40. Therefore, the adapter 70 is prevented from being unexpectedly or unintentionally detached from the power tool housing 32. As shown in FIGS. 8 and 10, the adapter 70 optionally may be affixed to the housing 32 with a threaded fastener 92, e.g., a screw or a bolt. In the alternative, a rod-shaped latching device may be inserted through a hollow cylinder portion 91 (described further below) and may be coupled to the power tool housing 32 by an interference-fit or a connection other than a threaded connection.

Figure 11:
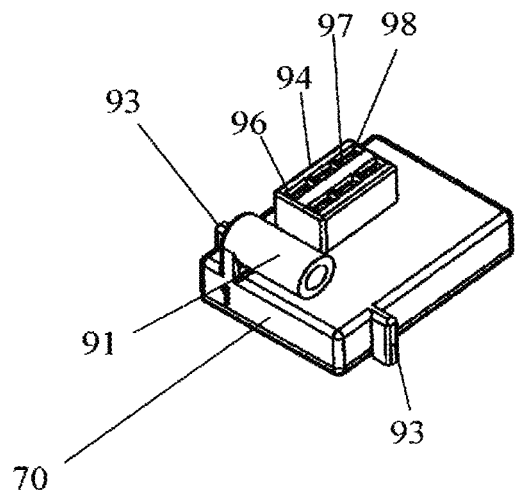
FIG. 11 shows a representative example of a wireless communication adapter that may be utilized with the seventh exemplary embodiment of the present teachings.

FIG. 11 shows the representative example of the wireless communication adapter 70 in isolation. This adapter 70 includes a male connector 94 configured to connect with the power tool 10. The male connector 94 of the adapter 70 has holes 96 (an example of "at least one hole") and contact terminals 97 are disposed on respective projecting bodies 98 in the hole(s) 96. The adapter 70 further includes the hollow cylindrical portion 91, which receives the threaded fastener 92 therethrough for fastening or affixing the adapter 70 to the power tool housing 32. As will be further described below, the cylindrical portion 91 also serves as a strut or bracket for attaching a strap 150.

Furthermore, as shown in FIGS. 10 and 11, the adapter 70 may include ribs 93 disposed on opposite lateral sides thereof. The ribs 93 may be slid into corresponding slots 33 defined in the power tool housing 32 in order to provide more structural support for the adapter 70 when it is attached to the power tool 10.

Figure 12:
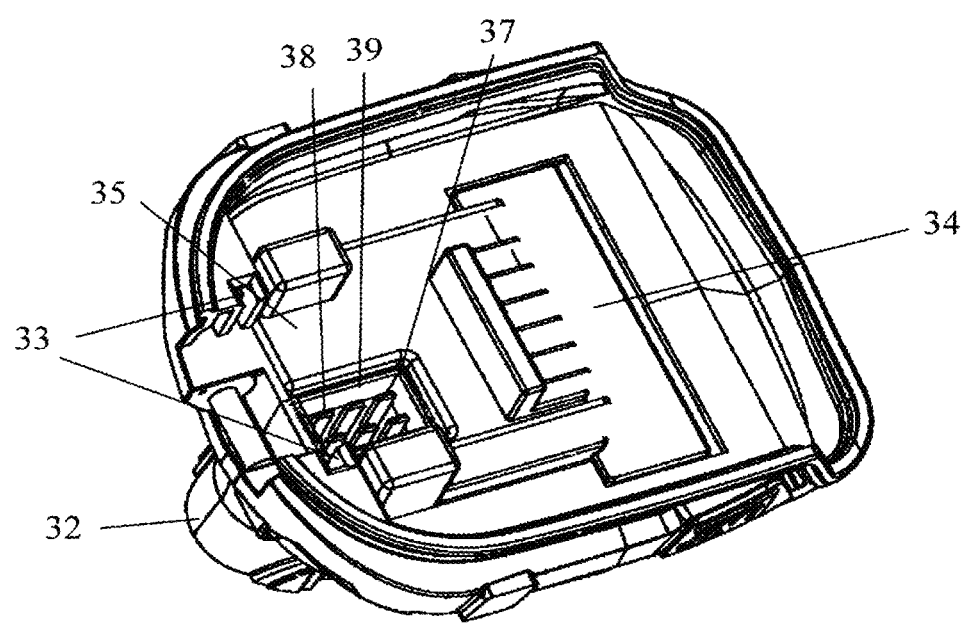
FIG. 12 shows the battery pack interface of the seventh exemplary embodiment of the present teachings without the adapter attached thereto.

FIG. 12 shows the battery pack interface 34 without the adapter 70, such that a space 35 between the power tool housing 35 and the battery pack 40 for receiving at least a portion of the adapter 70 can be seen. A female connector 37 is provided within the battery pack interface 34 and is configured to receive (engage) the male connector 94 of the adapter 70. The female connector 37 includes contact pins 38 disposed inside a concave portion defined by a peripheral wall 39. When the female connector 37 receives the male connector 94 of the adapter 70, the contact pins 38 of the female connector 37 enter into the holes 96 of the male connector 94, thereby physically and electrically contacting with the contact terminals 97 of the male connector 94. The peripheral wall 39 of the female connector 37 surrounds the contact pins 38 to prevent the contact pins 38 from contacting the user's fingers or other objects.

Figure 13:
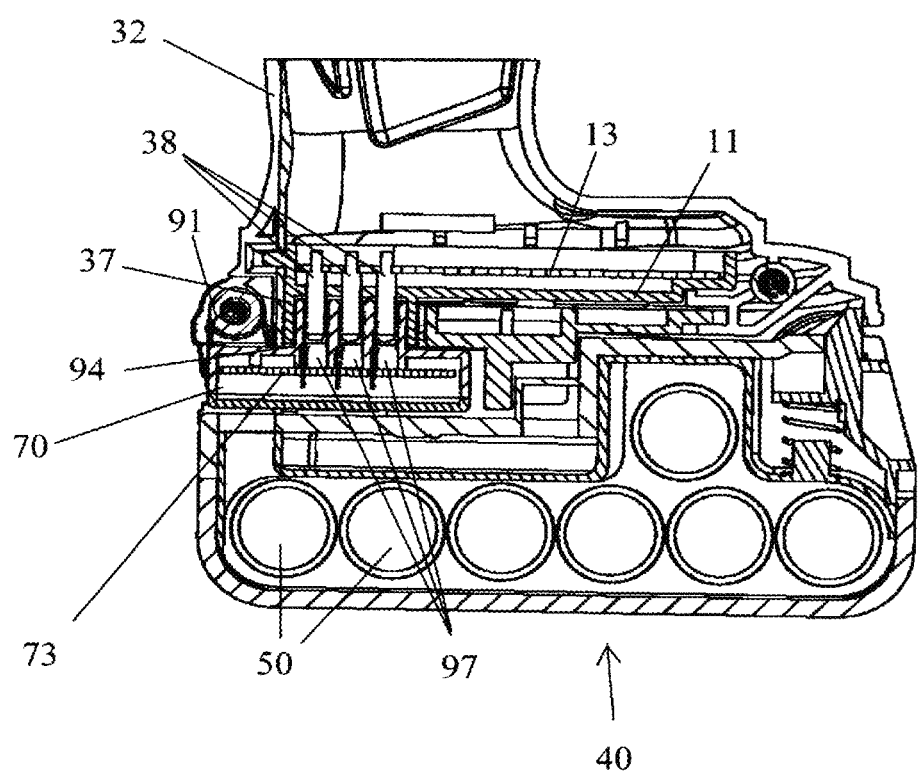
FIG. 13 shows a longitudinal cross-sectional view through the power tool system of the seventh exemplary embodiment of the present teachings comprising the power tool housing, the adapter and the battery pack.
Figure 14:
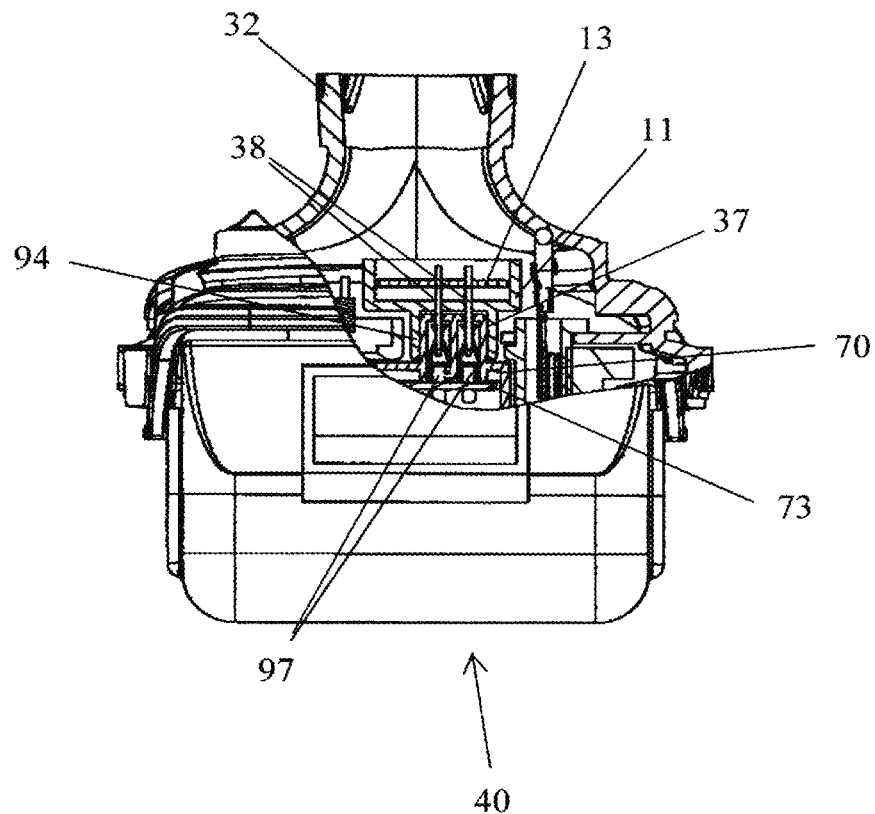
FIG. 14 shows a rear, partially cut-away view of the power tool system of FIG. 13.
Figure 15:
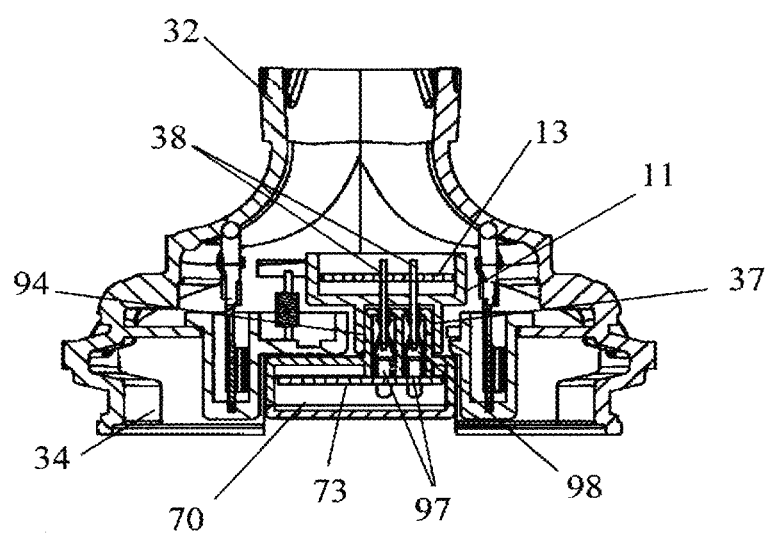
FIG. 15 shows a rear cross-sectional view of the power tool and adapter of FIGS. 13 and 14 without the battery pack attached thereto.

FIGS. 13-15 show cross-sectional and cutaway views through the representative power tool system comprising the power tool housing 32, the adapter 70 and the battery pack 40. FIGS. 13-15 thus show how the adapter 70 can be disposed entirely within the shell of the power tool system, so that no portion of the adapter 70 extends beyond an outer contour of the power tool housing 32 and/or an outer contour of the battery pack 40. However, it will be understood that the adapter 70 may be modified so that it partially or even substantially extends beyond the outer contour of the power tool housing 32 and/or the outer contour of the battery pack 40.

Figure 16:
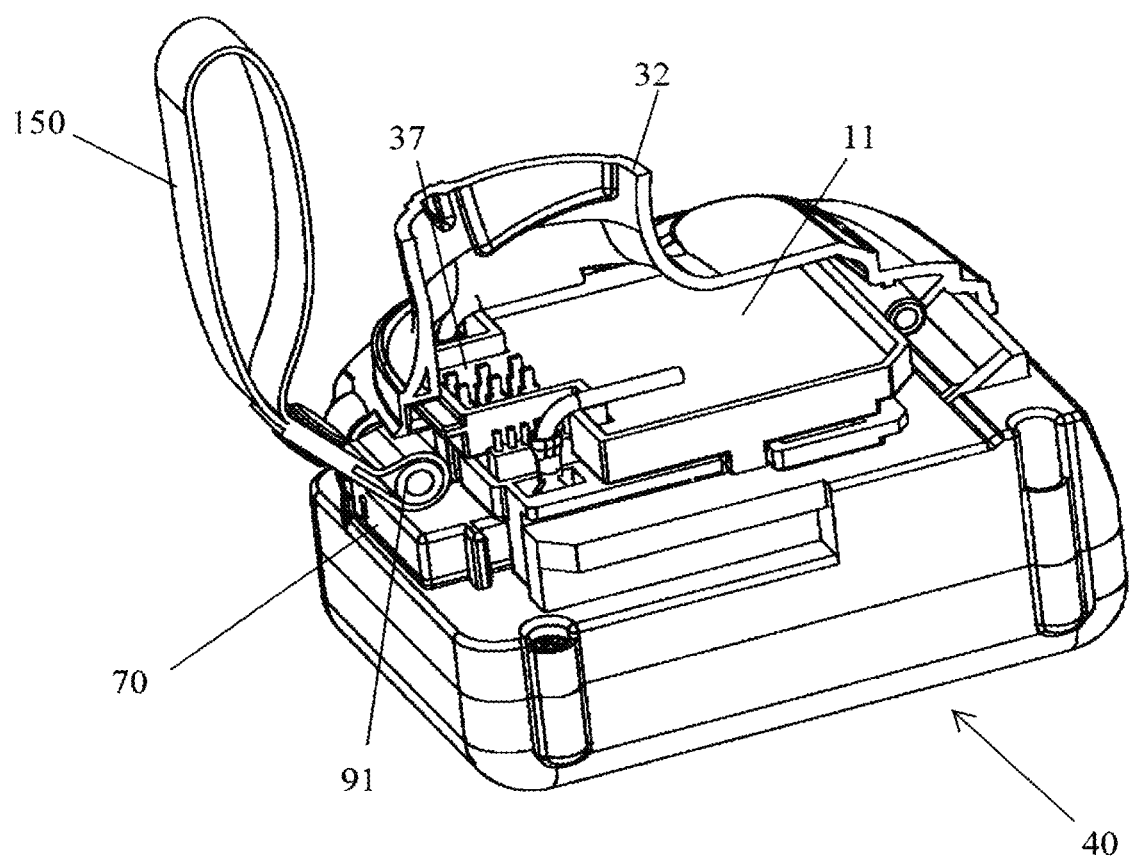
FIG. 16 shows a cutaway view of the battery pack interface with the adapter and battery pack attached thereto.

FIG. 16 shows a cutaway view of the battery pack interface 34 with certain elements of the power tool 10 omitted for clarity purposes.

As shown in FIGS. 13-16, the power tool 10 includes an electronic unit 11 with a circuit board 13. The female connector 37 may be formed integrally with the electronic unit 11 and the contact pins 38 extend from the circuit board 13. Similarly, the adapter 70 is also provided with a circuit board 73 and its contact terminals 97 are disposed on the circuit board 73.

In the lateral cross-section shown in FIG. 13, the connection of the male connector 94 and the female connector 37 can be seen in greater detail. In particular, the vertically-extending contact pins 38 are shown in contact with the contact terminals 97, thereby establishing a communication path between the power tool 10 (in particular a controller 12 disposed therein) and the adapter 70 (in particular, a controller 72 disposed therein), as were previously described above with the assistance of FIGS. 1A-1C and will be further described below with the assistance of FIG. 28.

The electronic unit 11 of the power tool 10 preferably includes the controller 12, memory 16, communicator 18, etc., which execute the electronic functions of the power tool 10. One or more of these electronic circuits is preferably mounted on the circuit board 13.

FIGS. 14 and 15 show lateral cross-sections through the adapter 70 as viewed from the front of the power tool housing 32. The electrical connections between the contact terminals 97 and the contact pins 38 can be easily seen.

In FIG. 16, the electronic unit 11 of the power tool 10 can be seen disposed above the battery pack 40 and the adapter 70. The contact pins 38 are exposed. As will be discussed further below, a strap 150 optionally may be attached to the adapter 70 via the cylindrical portion 91.

Figure 17:
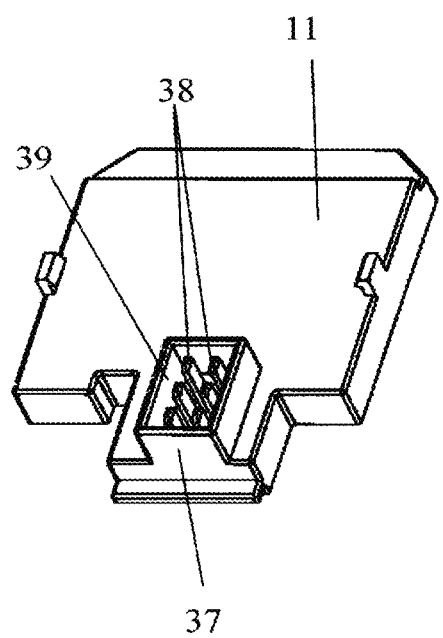
FIG. 17 shows the bottom side of the electric unit of the power tool removed from the power tool.

FIG. 17 shows the electronic unit 11 removed from the power tool 10 for clarity purposes. The female connector 37 may be integrally formed with the electronic unit 11. The peripheral wall 39 surrounds the contact pins 38.

Eighth Exemplary Embodiment

Figure 18:
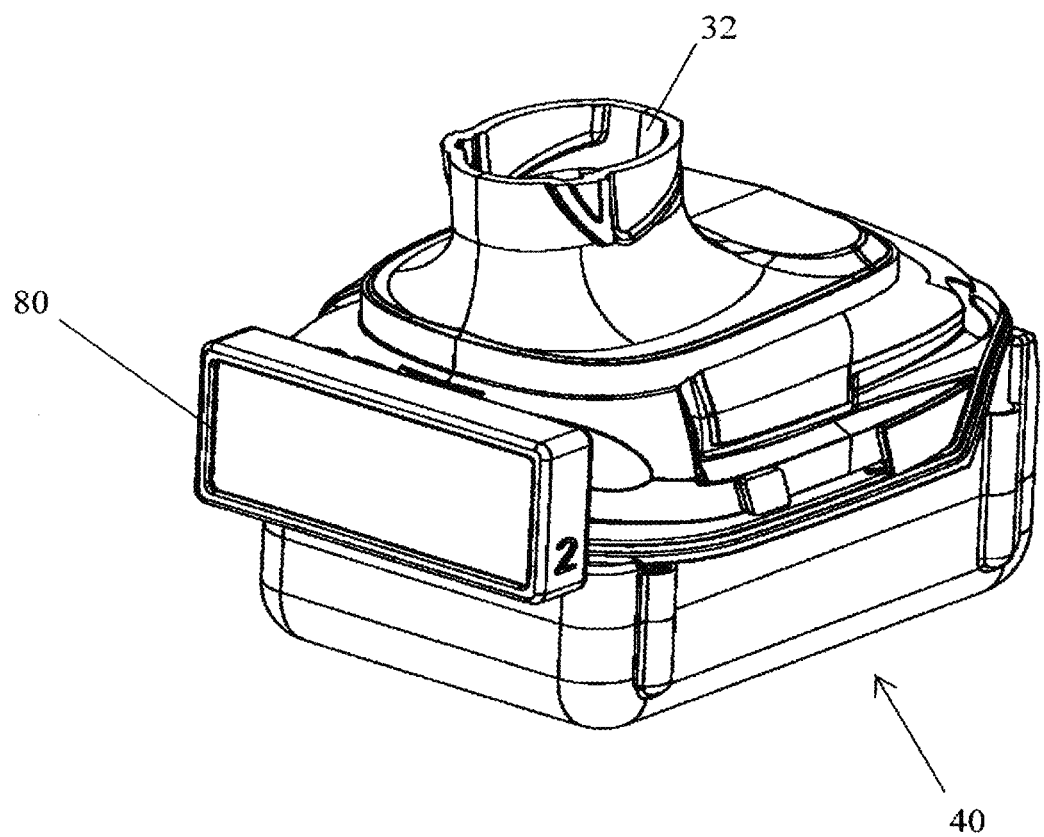
FIG. 18 shows the outer appearance of a power tool system according to an eighth exemplary embodiment of the present teachings, which is a further development of the fourth exemplary embodiment of the present teachings.
Figure 19:
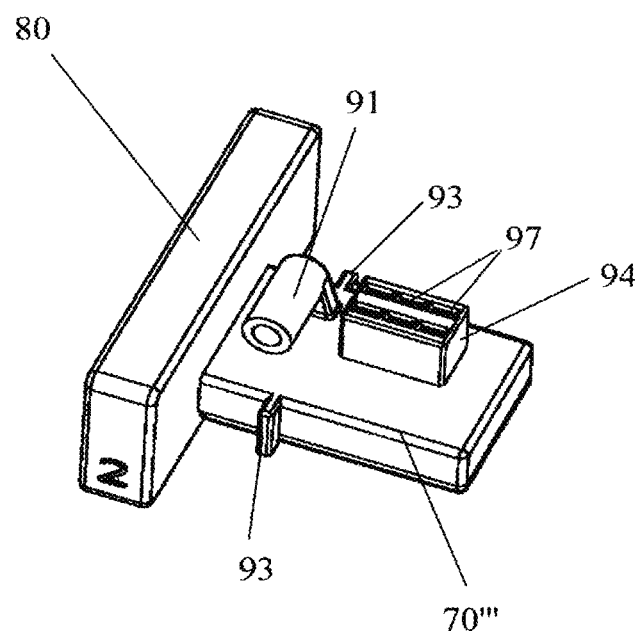
FIG. 19 shows a top perspective view of the adapter of the eighth exemplary embodiment of the present teachings detached from the power tool.
Figure 20:
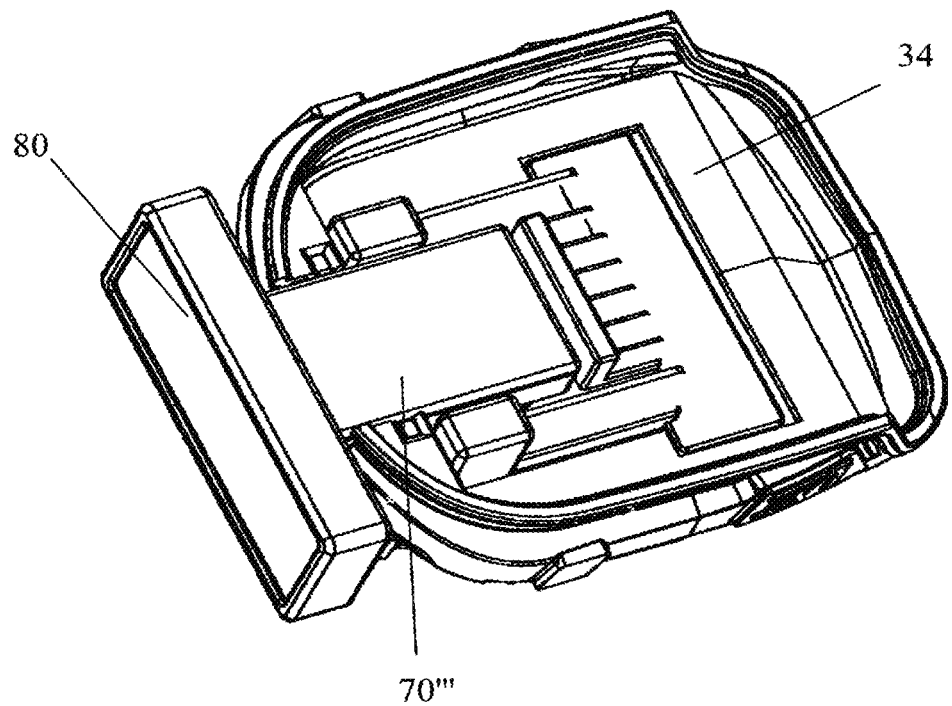
FIG. 20 shows a bottom perspective view of the adapter of the eighth exemplary embodiment of the present teachings attached to the battery pack interface of the power tool without the battery pack attached thereto.

FIGS. 18-20 show another representative embodiment of an adapter 70''' according to the present teachings, which is a further development of the above-described fourth exemplary embodiment. Therefore, where appropriate, the same reference numbers for the same elements as in the fourth exemplary embodiment will be used in the eighth exemplary embodiment and the description thereof is incorporated by reference into the eighth exemplary embodiment.

This adapter 70''' is a display adapter that includes a display 80, which is an example of a medium-sized adapter. Such an adapter 70''' is partially located or disposed outside of the power tool housing 32 (i.e. a part of the adapter 70''' projects from the outer wall or outer contour of the power tool housing 32 and/or the battery pack 40).

The display adapter 70''' also may comprise the male connector 94, the cylindrical portion 91 and the ribs 93 according to the preceding embodiment. That is, the attachment structure may be identical to the attachment structure provided on the wireless communication adapter 70. Moreover, a specific indication such as a name, a letter or a code, e.g. "2", also may be provided on the outer surface of the display adapter 70''' to indicate the kind of the adapter.

While the display 80 is preferably an LCD (liquid crystal display), the present teachings are not particularly limited in this regard and other types of display technologies may be advantageously utilized with the present teachings as is described above and claimed below.

The electronic functions of the adapter 70''' may be executed by the circuits shown in FIGS. 4A-4C above, or as will be described with the assistance of FIG. 29 below.

Ninth Exemplary Embodiment

Figure 21:
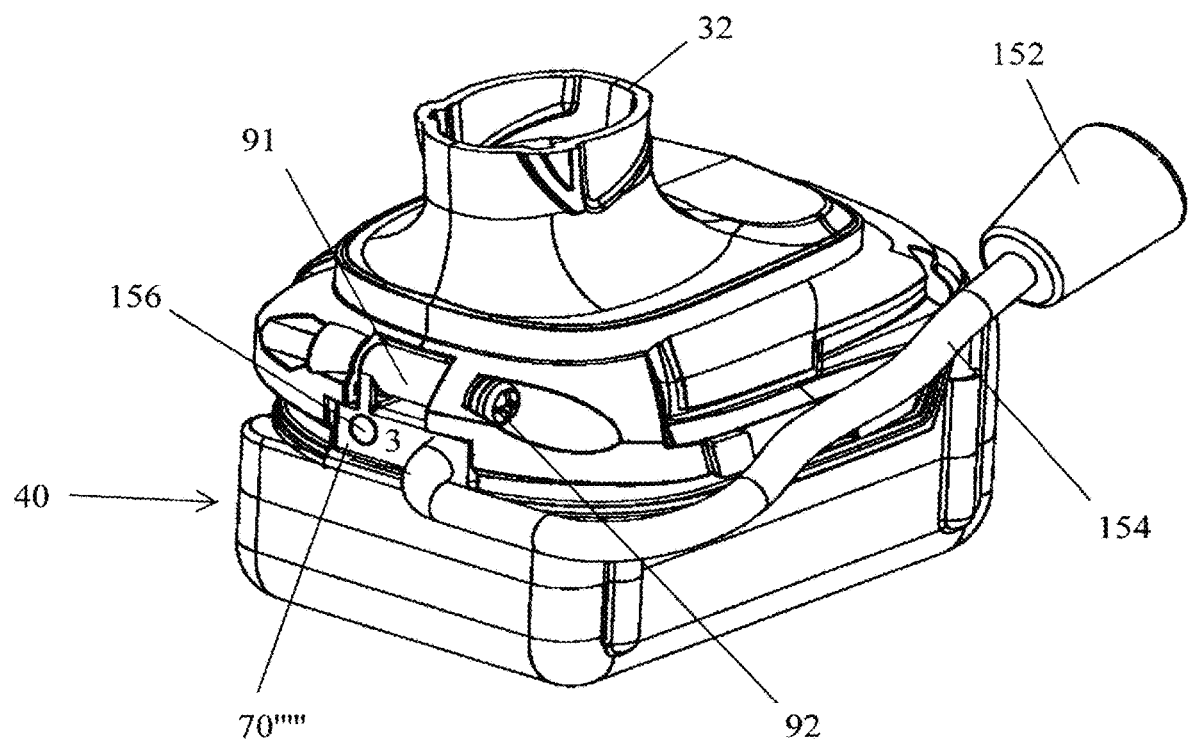
FIG. 21 shows the outer appearance of a power tool system according to a ninth exemplary embodiment of the present teachings.
Figure 22:
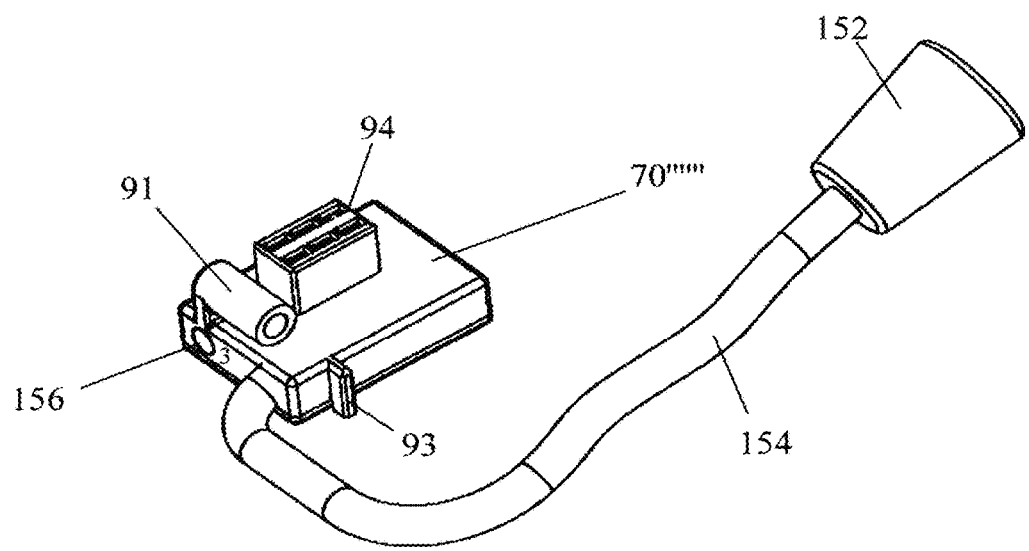
FIG. 22 shows a top perspective view of the adapter of the ninth exemplary embodiment of the present teachings detached from the power tool.

FIGS. 21 and 22 show another representative embodiment of an adapter 70'''' according to the present teachings. This adapter 70'''' is a lighting adapter having a light 152 supported by a flexible arm 154, which is an example of a large-sized adapter. Such an adapter 70""' is also partially located outside of the power tool 10, similar to the preceding embodiment. The lighting adapter 70""' may include the common attachment structure, i.e. the male connector 94, the cylindrical portion 91 and the ribs 93, according to the preceding embodiments. A specific indication such as name, a letter or a code, e.g. "3", is also provided on the outer surface of the lighting adapter 70""' to indicate the kind of the adapter.

The flexible arm 154 is preferably flexible to permit the illumination direction of the light 152 to be changed by the user, but is also rigid so as to maintain the light 152 in the desired direction after it has been set by the user A manual ON/OFF switch 156 may be provided on the exterior of the adapter 70""' to permit the user to selectively illuminate the light 152.

The electronic functions of the adapter 70""' may be executed by the circuits that will be described with the assistance of FIG. 30 below.

Although the light 152 is preferably embodied as one or more LEDs, other illumination technologies may be used interchangeably with this aspect of the present teachings, such as incandescent and fluorescent lights.

Tenth Exemplary Embodiment

Figure 23:
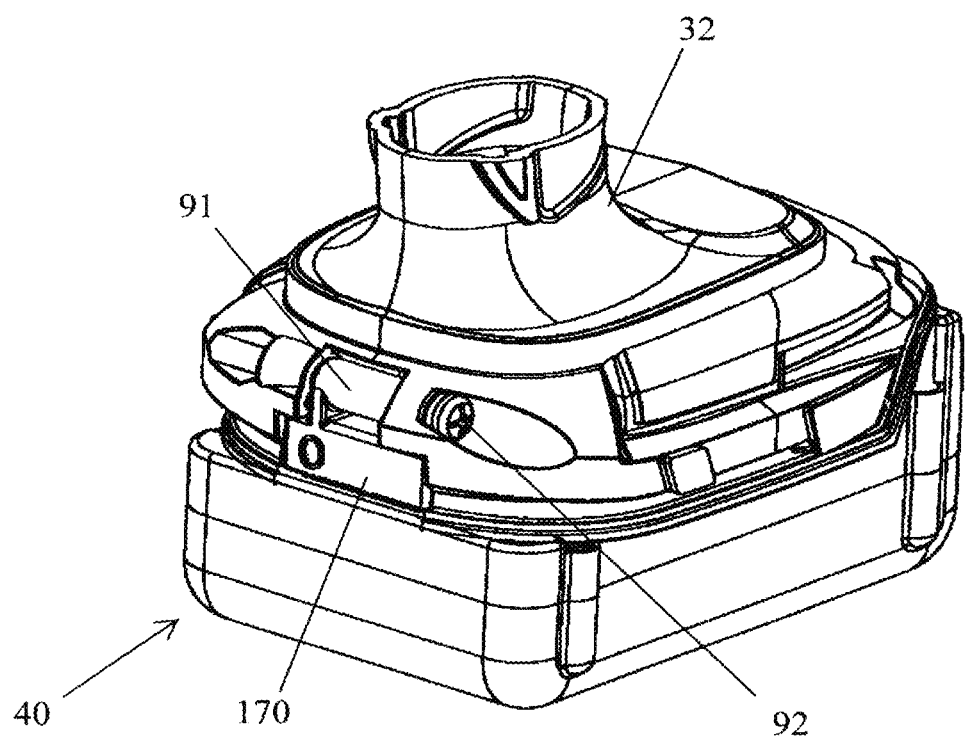
FIG. 23 shows the outer appearance of a power tool system according to a tenth exemplary embodiment of the present teachings.
Figure 24A:
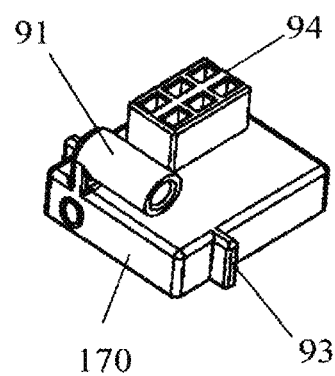
FIG. 24A shows a top perspective view of the adapter of the tenth exemplary embodiment of the present teachings detached from the power tool.
Figure 24B:
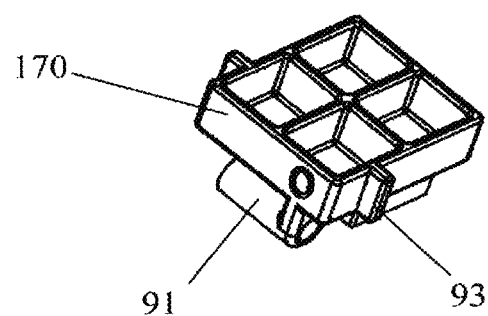
FIG. 24B shows a bottom perspective view of the adapter of the tenth exemplary embodiment of the present teachings detached from the power tool.
Figure 25:
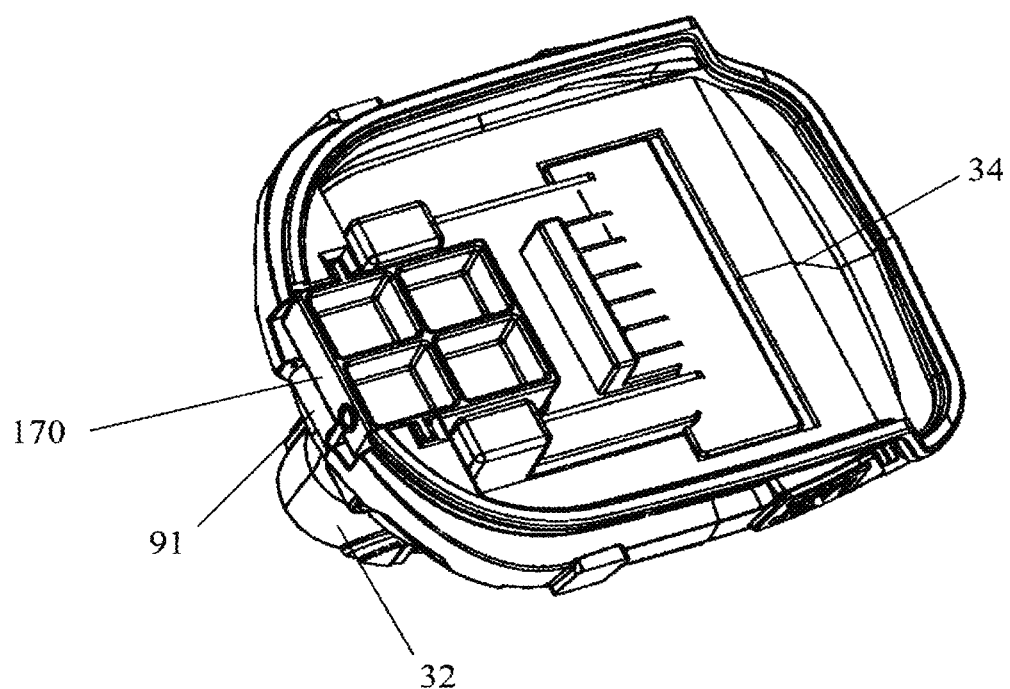
FIG. 25 shows a bottom perspective view of the adapter of the tenth exemplary embodiment of the present teachings attached to the battery pack interface of the power tool without the battery pack attached thereto.

FIGS. 23-25 show a dummy adapter 170. The dummy adapter is a plastic part that has a similar outer shape or contour as the preceding adapters (all of which are capable of performing at least one electrical function). On the other hand, the dummy adapter 170 may be attached to the power tool housing 32 to replace the functional adapter. Thus, when the user does not require any functional adapter to be inserted in the slot for the adapter, the dummy adapter 170 can be attached to the power tool 10. The dummy adapter 170 fits into the opening 36 formed on the outer surface of the power tool 10 to prevent the ingress of dust and moisture. Further, the dummy adapter 170 may include a dummy male connector 94 that can be coupled with the female connector 37 of the power tool 10 to protect it and the contact pins 38. The dummy adapter 170 also may include the cylindrical portion 91 for affixing the dummy adapter 170 to the power tool housing 32 via the threaded fastener 92.

Eleventh Exemplary Embodiment

Figure 26:
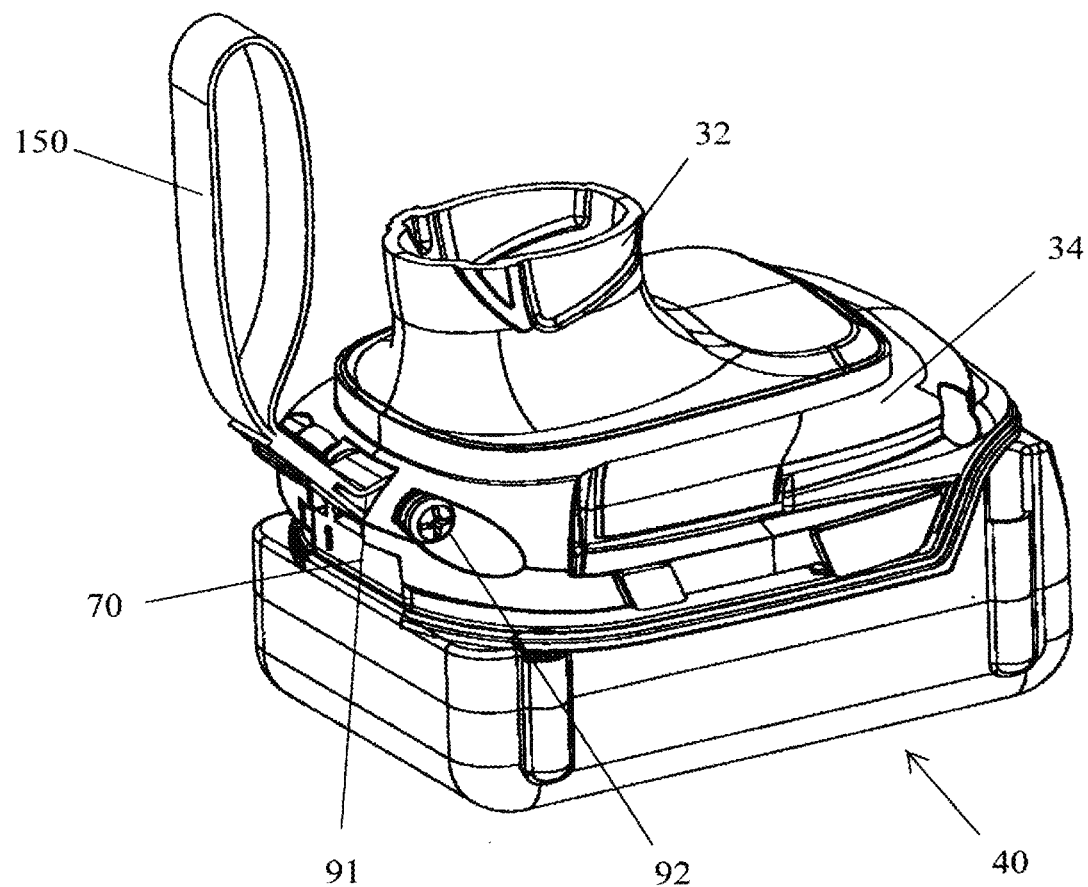
FIG. 26 shows lateral perspective view of a strap attached to the cylindrical portion of an adapter according to any of the seventh to tenth exemplary embodiments.
Figure 27:
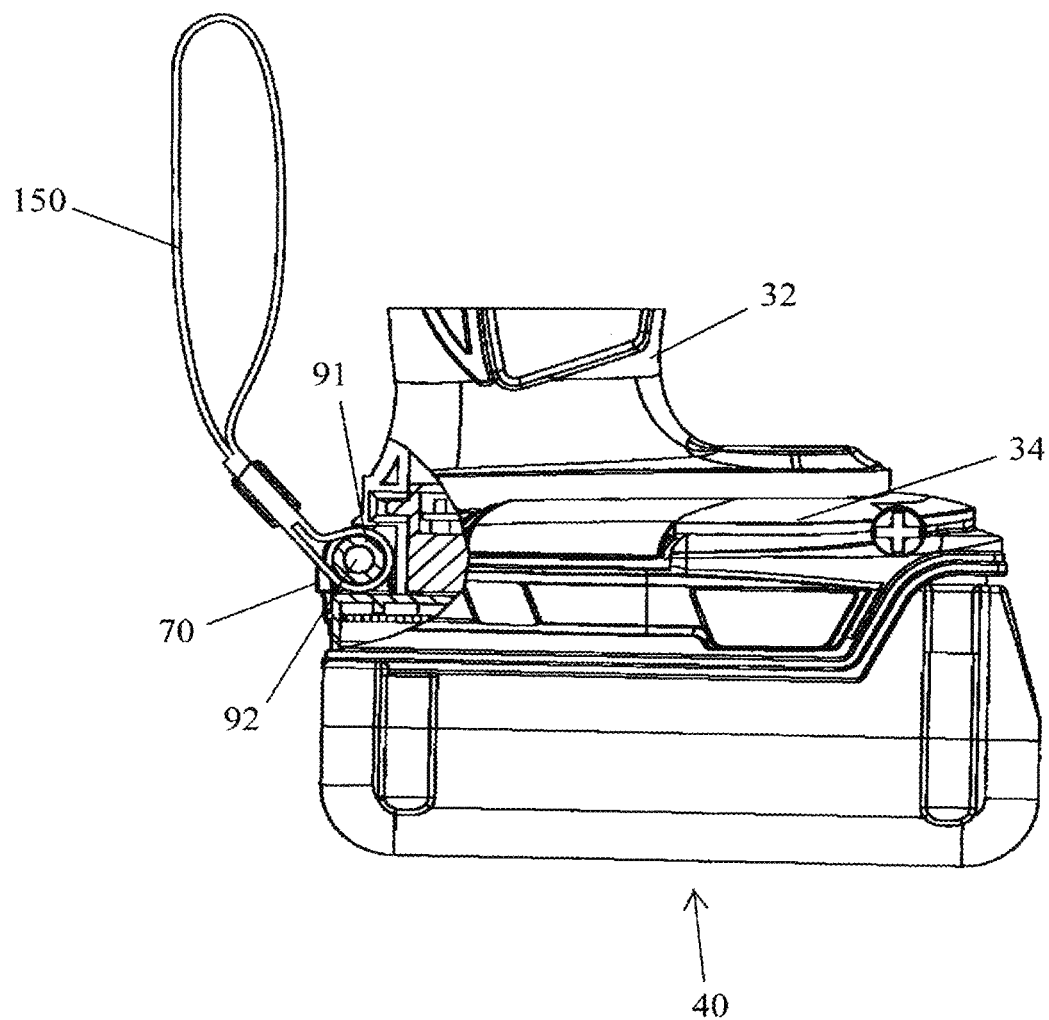
FIG. 27 shows lateral, partially cut-away view of the strap attached to the cylindrical portion of the adapter of FIG. 26.

FIGS. 26 and 27 shows a strap 150 attached to the cylindrical portion 91 of any one of the adapters 70, etc. according to any preceding embodiment. The user can attach the strap 150 to the cylindrical portion 91 and easily replace it by detaching the adapter 70, etc. In order to flexibly or pivotably support the strap 150, a space is formed between the cylindrical portion 91 and the power tool housing 32. Because the threaded fastener 92 extends through the hollow cylindrical portion 91, the cylindrical portion 91 is reinforced against breakage.

Figure 28:
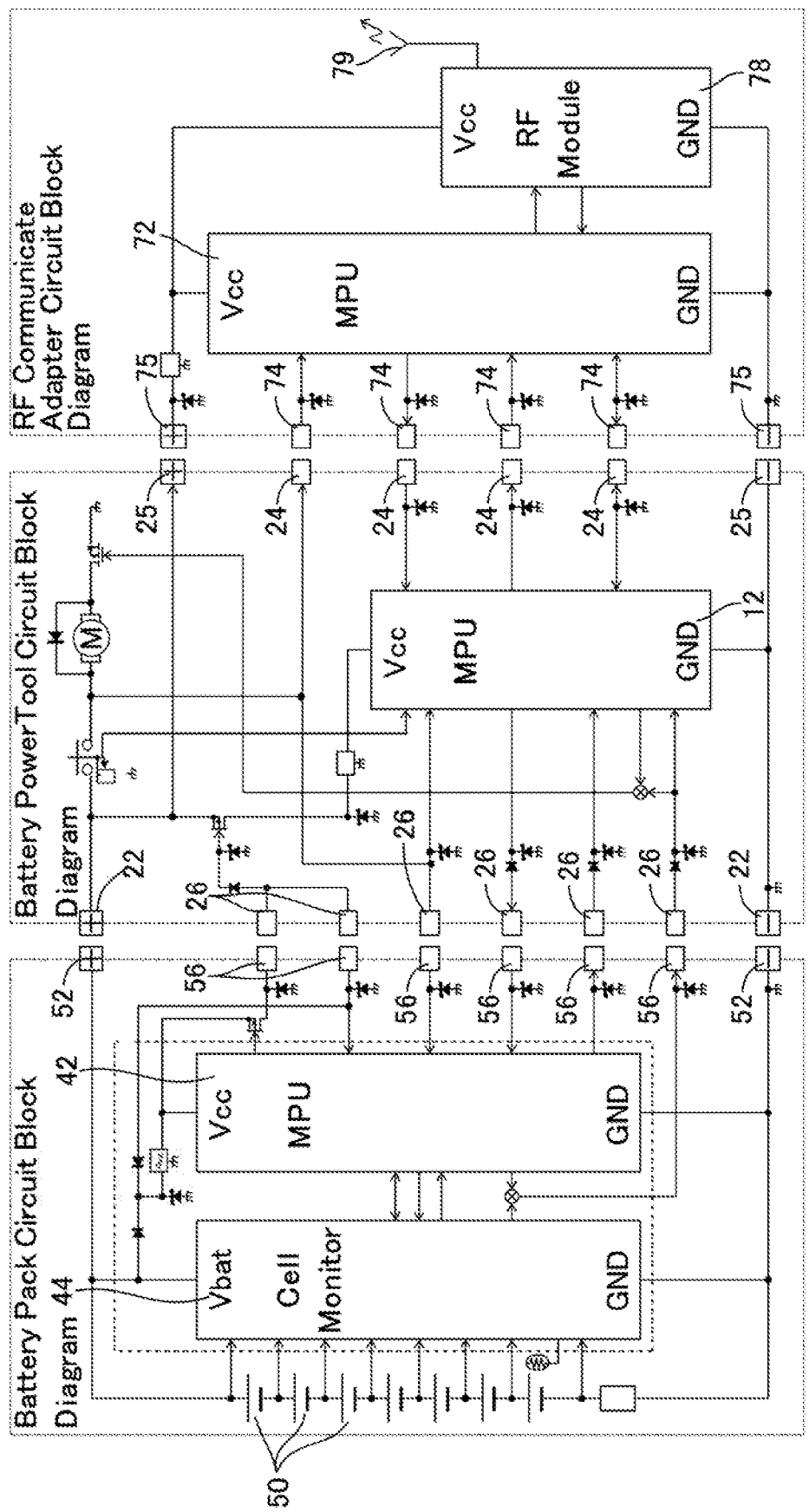
FIG. 28 shows a representative circuit diagram of the battery pack, the power tool and the wireless communication adapter according to the seventh exemplary embodiment of the present teachings, which is a further development of the circuits and functions shown in FIGS. 1A-1C.

FIG. 28 shows a representative circuit diagram of the battery pack 40, the power tool 10 and the wireless communication adapter 70 according to the seventh exemplary embodiment. This circuit provides the same basic electronic functions as the circuits and diagrams shown in FIGS. 1A-1C. Therefore, the same elements in FIGS. 1A-1C have been provided with the same reference numerals in FIG. 28 and the description thereof is incorporated into the present embodiment by reference. Reference is made to the description associated with FIGS. 1A-1C above for description of any elements shown in FIG. 28, but not explicitly described in the following.

The adapter 70 comprises an MPU (microprocessor unit) or CPU 72 and an RF (radio frequency) module 78 that are in electronic communication. The communication terminals 74 of the adapter 70, i.e. the "+", "SW", "Tx", "Rx", "BS" and "−" terminals, correspond to or are comprised of the contact terminals 97 provided on the male connector 94. Correspondingly, the communication terminals 24 of the power tool 10, i.e. the "+", "SW", "Rx", "Tx", "BS" and "−" terminals, correspond to or are comprised of the contact pins 38 provided on the female connector 37. The communication adapter 70 is electrically connected to the battery pack 40 via the power tool 10. The MPU 72 of the adapter 70 communicates with an MPU 42 of the battery pack 40 via an MPU 12 of the power tool 10. RF signals generated by the RF module (communicator) 78 are wirelessly transmitted to an external device (in accordance with the above-described embodiments) via an antenna 79.

It should be understood that, although wireless communication adapters have been disclosed above, it is also possible to provide wired communication adapters. In this case, the RF module 78 is replaced with a wired connector, such as any kind of plug and socket connector known in the art that can provide serial or parallel communications between a processor in the power tool and/or battery pack and a processor in an external device (e.g., a computing bus), including but not limited to a USB connector.

Figure 29:
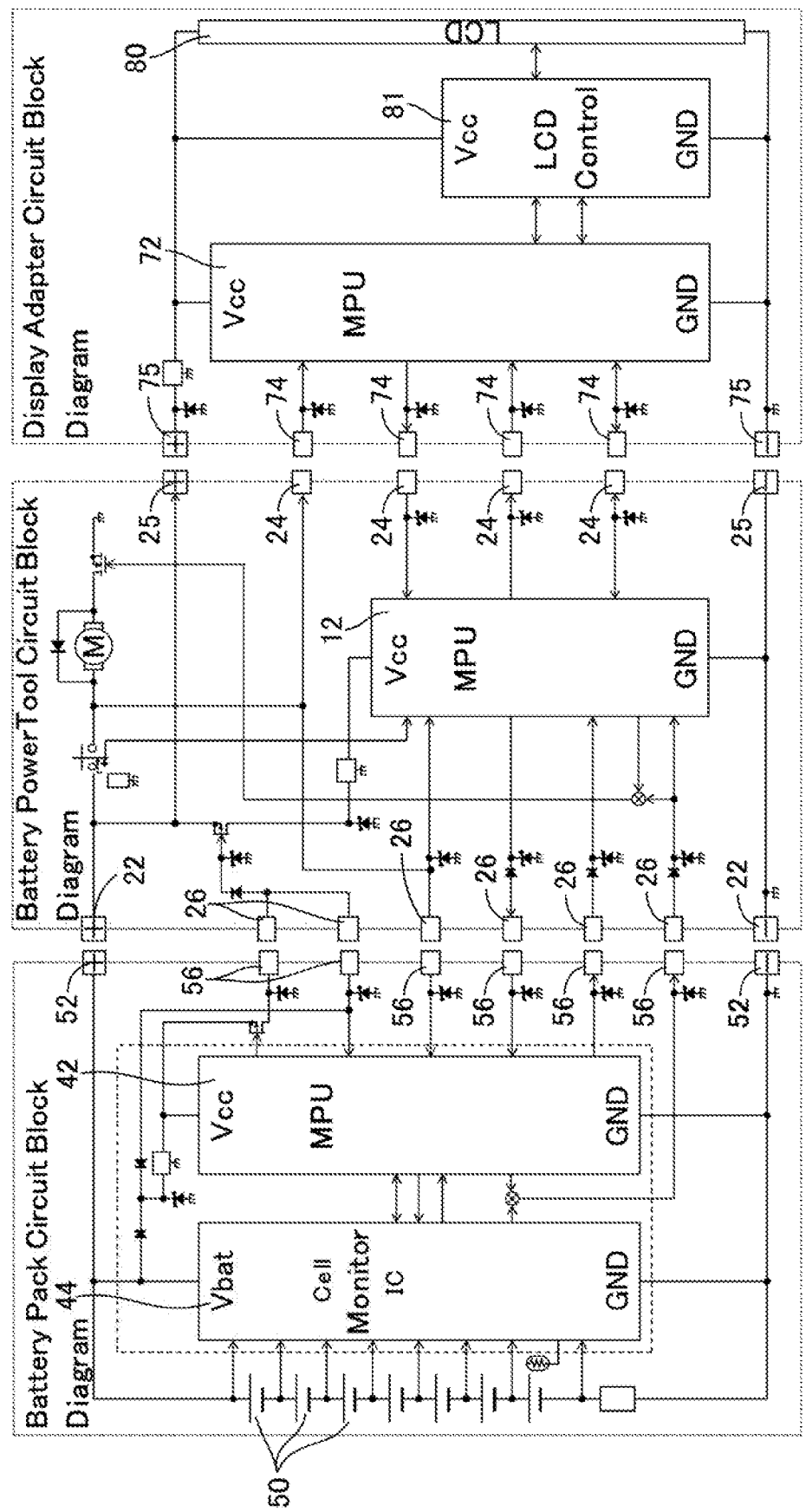
FIG. 29 shows a representative circuit diagram of the battery pack, the power tool and the display adapter according to the eighth exemplary embodiment of the present teachings, which is a further development of the circuits and functions shown in FIGS. 4A-4C.

FIG. 29 shows a representative circuit diagram of the battery pack 40, the power tool 10 and the display adapter 70''' according to the eighth exemplary embodiment. This circuit provides the same basic electronic functions as the circuits and diagrams shown in FIGS. 4A-4C. Therefore, the same elements in FIGS. 4A-4C have been provided with the same reference numerals in FIG. 29 and the description thereof is incorporated into the present embodiment by reference. Reference is made to the description associated with FIGS. 4A-4C above for description of any elements shown in FIG. 29, but not explicitly described in the following.

The display adapter 70''' comprises an MPU (or CPU) 72, an LCD Control IC (integrated circuit) or LCD driver 81 and an LCD panel 80. The LCD panel 80 may be driven by the LCD driver 81 based upon video signals generated by the MPU 72 in a manner well known in the art.

Figure 30:
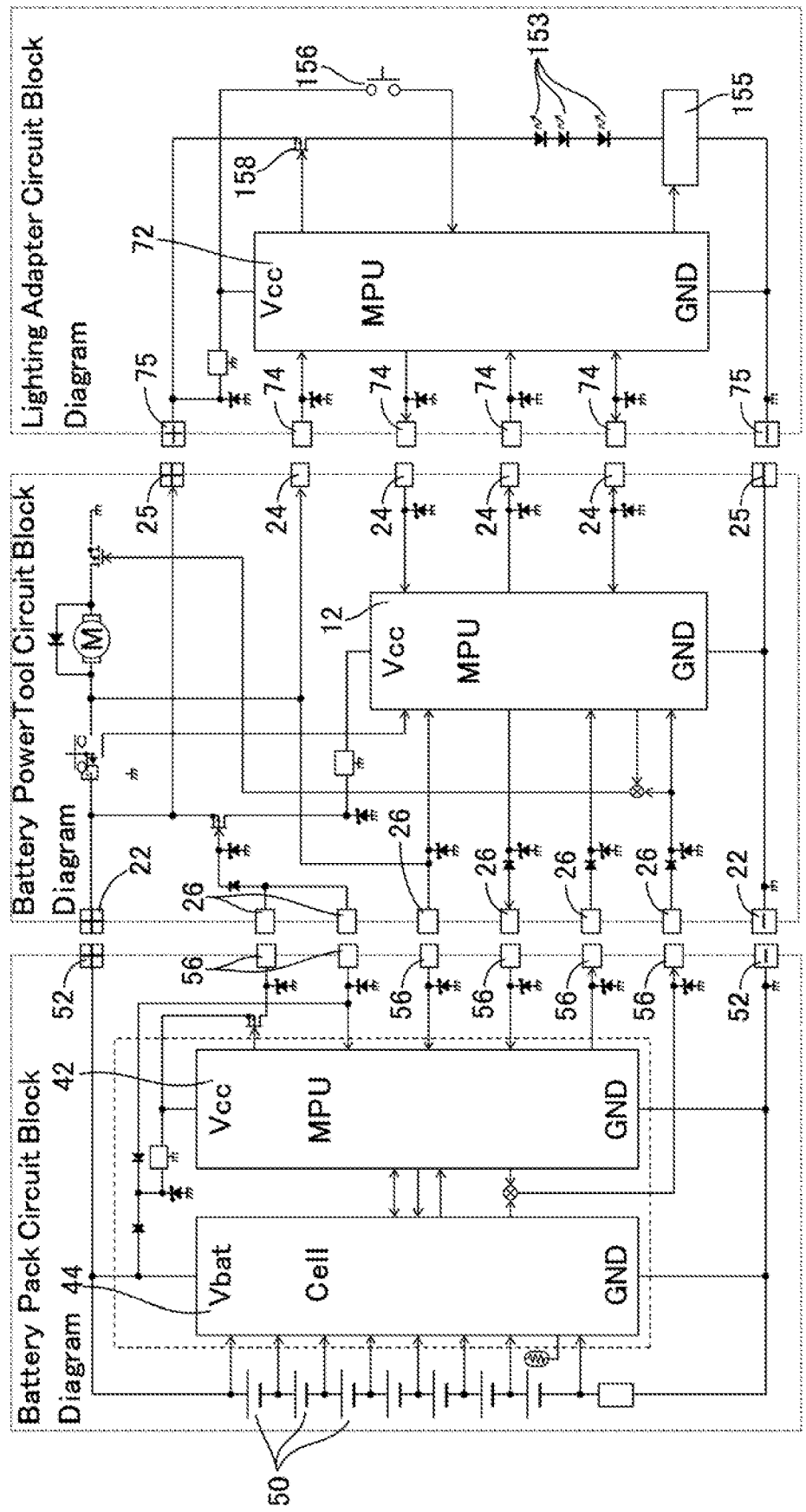
FIG. 30 shows a representative circuit diagram of the battery pack, the power tool and the lighting adapter according to the ninth exemplary embodiment of the present teachings.

FIG. 30 shows a representative circuit diagram of the battery pack 40, the power tool 10 and the lighting adapter 70""' according to the ninth exemplary embodiment. The lighting adapter 70""' comprises an MPU or CPU 72, a plurality of LEDs 153, a constant current circuit (e.g., a current regulator) 155 and a manual ON/OFF switch 156. When the manual switch 156 is activated, the MPU 72 turns on an FET 158 in order to illuminate the LEDs 153. The constant current circuit 155 adjusts the brightness of the LEDs 153 by changing the amount of current that flows through the LEDs 153 according to instructions from the MPU 72 in a manner well known in the art.

The remaining circuits and elements of FIG. 30 operate in the same manner as the above-described FIGS. 28 and 29 and therefore need not be repeated again.

Although lithium-based battery cells are presently preferred for use in the adapters and chargers of the present teachings, in particular lithium ion battery cells, the present teachings are not particularly limited in this regard and any other suitable battery chemistry may be utilized, such as, e.g., lithium metal oxide, lithium polymer, lithium metal phosphate, lithium sulfur, lithium sulfide and lithium sulfate.

Furthermore, although elements 91-94 have been described has one suitable means for engaging the adapter 70, 70''', 70'''', 70''''' with the power tool 10, the present teachings are not particularly limited in this regard. For example, various other interlocking, form-fit, press-fit or fastener connections may be interchangeably utilized with the present teachings to physically engage the adapters with the power tool and/or with the battery pack, such as one or more slide rails, a plug-and-socket arrangement, other types of threaded connections (e.g., screw or bolt fastening the adapter to an outer or inner portion of the power tool housing and/or to the battery pack), one or more clamps, one or more clasps, etc. In short, any type of element or set of elements capable of detachably connecting the adapter to the power tool housing and/or to the battery pack should be understood as falling within the expression "means for detachably connecting" to the battery pack and/or the power tool.

Further embodiments disclosed herein include, but are not limited to:

1. An adapter for a power tool powered by a detachable battery pack, comprising:
   means for detachably connecting to only the power tool,
   a controller, such as at least one microprocessor,
   at least one memory or storage device in communication with the controller, and
   at least one communication port configured to electrically communicate with a controller, such as at least one microprocessor, located in the power tool.
2. The adapter according to embodiment 1, wherein when a battery pack is connected to the power tool, which battery pack includes a controller, such as at least one microprocessor, a communication path is established such that the battery pack controller communicates with the adapter controller via the power tool controller.
3. An adapter for a power tool powered by a detachable battery pack, comprising:
   means for detachably connecting to only the battery pack,
   a controller, such as at least one microprocessor,
   at least one memory or storage device in communication with the controller, and
   at least one communication port configured to electrically communicate with a controller, such as at least one microprocessor, located in the battery pack.
4. The adapter according to embodiment 3, wherein when a battery pack is connected to the power tool, which power tool includes a controller, such as at least one microprocessor, a communication path is established such that the power tool controller communicates with the adapter controller via the battery pack controller.
5. An adapter for a power tool powered by a detachable battery pack, comprising:
   first means for detachably connecting to the battery pack,
   second means for detachably connecting to the power tool,
   a controller, such as at least one microprocessor,
   at least one memory or storage device in communication with the controller,
   at least one first communication port configured to electrically communicate with a controller, such as at least one microprocessor, located in the battery pack, and
   at least one second communication port configured to electrically communicate with a controller, such as at least one microprocessor, located in the power tool.
6. The adapter according to embodiment 5, wherein when the adapter is connected to the battery pack and to the power tool, a communication path is established such that the battery pack controller communicates with the adapter controller and the adapter controller communicates with the power tool controller.
7. The adapter according to any preceding embodiment, wherein the adapter is configured or adapted to measure the remaining battery capacity of the battery pack.
8. The adapter according to any preceding embodiment, wherein the adapter is configured or adapted to measure a discharge voltage of battery cells located in the battery pack.
9. The adapter according to embodiment 7 or 8, wherein the adapter is further configured or adapted to estimate a number of additional power tool operations that can be performed based upon the measured remaining battery capacity and/or the measured discharge voltage of the battery cells.
10. The adapter according to embodiment 9, wherein the at least one memory stores a set of energy values corresponding to a plurality of power tool operations and the controller is configured or adapted to calculate the number of additional power tool operations that can be performed based upon the measured remaining battery capacity and/or the measured discharge voltage of the battery cells by dividing the measured remaining battery capacity by the stored energy value corresponding to the currently performed power tool operation.
11. The adapter according to embodiment 9 and 10, wherein:
    at least one of the adapter, power tool or battery pack is further configured or adapted to dynamically measure the amount of energy consumed during the performance of a power tool operation and
    the adapter controller is configured to calculate the number of additional power tool operations of the same type that can be performed based upon the measured remaining battery capacity and/or the measured discharge voltage of the battery cells by dividing the measured remaining battery capacity by the measured amount of energy consumed during the power tool operation.
12. The adapter according to embodiment 11, wherein the adapter controller is configured to:
    store in the memory the measured amount of consumed energy for a plurality of power tool operations and
    calculate the number of additional power tool operations by dividing the measured remaining battery capacity by an average or a mean of the measured amount of consumed energy for the plurality of power tool operations.
13. The adapter according to any preceding embodiment, wherein the adapter is configured or adapted to change one or more operating parameters stored in a memory of the battery pack and/or the power tool, such as a value for a maximum current limit.
14. The adapter according to embodiment 13, wherein the adapter is configured or adapted to receive instructions concerning the changed operating parameter(s) from an external device.
15. The adapter according to any preceding embodiment, wherein the adapter is configured or adapted to store, display and/or transmit, e.g., to an external device, maintenance information concerning the power tool and/or the battery pack.
16. The adapter according to embodiment 15, wherein the maintenance information is one or any arbitrary combination of:
   (i) a date of a last maintenance check/inspection,
   (ii) the result of the last maintenance check/inspection,
   (iii) the accumulated or total usage (operation) time of the power tool and/or the battery pack,
   (iv) the available charge or charge status (remaining battery capacity) of the battery pack,
   (v) the number of charging cycles experienced by the battery pack,
   (vi) the condition of one or more battery cells in the battery pack, e.g., as calculated from an internal impedance measurement of the battery cell(s),
   (vii) the expected remaining service life of one or more replaceable parts in the power tool and/or the battery pack,
   (viii) a maintenance schedule for the power tool and/or the adapter and/or the battery pack,
   (ix) a usage history of the power tool and/or the adapter and/or the battery pack,
   (x) the name(s) of an administrator or responsible person for the tool,
   (xi) a serial number of the battery pack and/or the power tool,
   (xii) the voltage of one or more (e.g., either individually or a summation of two or more) battery cell(s),
   (xiii) the discharge current of one or more (e.g., either individually or a summation of two or more) battery cell(s),
   (xiv) the temperature of one or more (e.g., either individually or a summation of two or more) battery cell(s),
   (xv) the number of times that the battery pack and/or the power tool has been switched ON and/or OFF, and/or
   (xvi) the amount of charging or discharging that has occurred within a predetermined time period (e.g., the amount of discharged power during the previous 2 hours).
17. The adapter according to embodiment 15 or 16, wherein the adapter is configured or adapted to enable the external device to access the maintenance information stored in the adapter.
18. The adapter according to any preceding embodiment, wherein the adapter is configured or adapted to dynamically detect a discharge current supplied to an electronic motor of the power tool during operation and to store the detected discharge current.
19. The adapter according to embodiment 18, wherein the adapter is further configured or adapted to compare the detected discharge current to an upper discharge current limit and/or to a lower discharge current limit, and to optionally use the comparison result to recommend a different power tool for performing a power tool operation.
20. The adapter according to embodiment 18 or 19, wherein the adapter is further configured or adapted to transmit the detected discharge current and/or the power tool recommendation to an external device.
21. The adapter according to any preceding embodiment, wherein the adapter is configured or adapted to change a maximum charged level of the battery pack.
22. The adapter according to any preceding embodiment, wherein the adapter is configured or adapted to perform an anti-theft function.
23. The adapter according to embodiment 22, wherein the anti-theft function includes communicating a key transmitted from an external device to an electronic lock located in the battery pack and/or in the power tool.
24. The adapter according to any preceding embodiment, wherein the adapter memory is configured or adapted to store information concerning a person responsible for administering or managing the adapter, battery pack and/or power tool.
25. The adapter according to any preceding embodiment, wherein the adapter is configured or adapted to change a charging speed of the battery pack, e.g., based upon an instruction manually input into the adapter or based upon an instruction transmitted by an external device.
26. The adapter according to embodiment 25, wherein the instruction includes increasing the charging current and/or increasing a battery pack temperature threshold.
27. The adapter according to any preceding embodiment, wherein the adapter is configured or adapted to measure one or more values indicative of the operational state of the battery pack and/or the power tool, such as a temperature, current and/or voltage.
28. The adapter according to embodiment 27, wherein the adapter is further configured or adapted to display the value(s) indicative of the operational state of the battery pack and/or the power tool.
29. The adapter according to embodiment 27 or 28, wherein the adapter is further configured or adapted to transmit the value(s) indicative of the operational state of the battery pack and/or the power tool to an external device.
30. The adapter according to any preceding embodiment, further comprising:
   means for wirelessly communicating information concerning the power tool and/or the battery pack to an external device.
31. The adapter according to embodiment 30, wherein the means for wirelessly communicating information comprises one or more of:
   a wireless communication device, such as a wireless local area network (WLAN) device, e.g., WiFi (i.e. operating according to the wireless communication protocol enumerated by IEEE 802.11),
   a Bluetooth device,
   a radio frequency (RF) communication device, or
   a cellular or mobile telephone device.
32. The adapter according to embodiment 30 or 31, wherein the communicated information is one or any arbitrary combination of:
   the measured remaining battery capacity and/or the estimated number of additional power tool operations of the same type that can be performed with the remaining battery capacity according to any one of embodiments 7-12,
   the value(s) for one or more operating parameters, e.g., a maximum current limit, stored in a memory of the battery pack and/or the power tool according to embodiment 13,
   the maintenance information according to embodiment 15 or 16,
   the detected discharge current and/or power tool recommendation according to embodiments 18-20,
   the anti-theft function or key according to embodiments 22 or 23, the person responsible for administering or managing the adapter, battery pack and/or power tool according to embodiment 24, the information to change the charging speed of the battery pack according to embodiment 25 or 26 the value(s) indicative of the operational state of the battery pack and/or the power tool according to embodiment 27 or 28.

33. The adapter according to embodiment 30, 31 or 32, wherein the communicated information is a new value representative of a maximum charged level of the battery pack.

34. The adapter according to embodiment 33, wherein the maximum charged level determines a stopping point for a charging operation of the battery pack.

35. The adapter according to any one of embodiments 25-34, wherein the external device is a smart phone.

36. The adapter according to any one of embodiments 25-34, wherein the external device comprises a portable computing device, such as a PDA, tablet computer or laptop computer.

37. The adapter according to any one of embodiments 25-34, wherein the external device comprises a desktop computer, server or a mainframe computer.

38. The adapter according to any preceding embodiment, further comprising an input device configured or adapted to directly input instructions, data, information, operating parameters and/or user preferences into the adapter.

39. The adapter according to embodiment 38, wherein the input device comprises a touch pad, touch screen, up/down button(s), push button(s) and/or toggle switch.

40. The adapter according to any preceding embodiment, further comprising a display.

41. The adapter according to embodiment 40, wherein the display comprises a liquid crystal display (LCD), a light-emitting diode (LED) display, such as an organic light-emitting diode (OLED) display, or an organic electroluminescent (EL) display.

42. The adapter according to embodiment 40 or 41, wherein the display is touch pad or touch panel.

43. The adapter according to embodiment 40, 41 or 42, wherein the display is configured to visually indicate any of the information, values or functions described in the preceding or following embodiments, such as the charge level (remaining battery capacity) of the battery pack, an alarm indicating overheating, the predicted number of additional power tool operations of the same type that may be performed based upon the remaining battery capacity of the battery pack, the name of the administrator of the power tool and the battery pack, maintenance information, a charging speed value, a detected discharge current value, an operating parameter or any value indicative of the operational state of the battery pack and/or the power tool.

44. The adapter according to any one of embodiments 40-43, wherein the display is configured to visually indicate a maximum charged level of the battery pack.

45. The adapter according to any preceding embodiment, further comprising means for obtaining power from a charger, the adapter being configured to supply a current to the battery pack in order to recharge one or more battery cells located in the battery pack.

46. The adapter according to embodiment 45, wherein the means for obtaining power from a charger comprises at least one charging terminal receiver configured to connect to at least one charging terminal of the charger and to conduct current from the charger to the adapter.

47. The adapter according to embodiment 45, wherein the means for obtaining power from a charger comprises at least one wireless power receiving antenna, such as an induction coil, configured to generate a current when brought into proximity with at least one wireless power transmitting antenna, such as an induction coil, of the charger.

48. The adapter according to embodiment 45, 46 or 47, further comprising a belt hook configured to hang on a tool belt worn by a user, wherein the means for obtaining power from the charger is disposed in or on the belt hook.

49. The adapter according to any one of embodiments 45-48, further comprising a proximity sensor configured to output a signal, e.g., a charging initiation signal, when the charger is proximal to the adapter, such as a mechanical contact, a pressure sensor or switch, a radio frequency identification (RFID) device, a magnet or magnetic field sensor, such as a reed switch or a Hall sensor, and/or an electrical resistance or capacitive sensor.

50. A portable battery pack charging system comprising:
    the adapter according to any one of embodiments 45-49, and
    a charger.

51. The portable battery pack charging system according to embodiment 50, wherein the charger comprises at least one charging terminal configured to electrically connect to at least one charging terminal receiver of the adapter.

52. The portable battery pack charging system according to embodiment 50, wherein the charger comprises a wireless power transmitting antenna, such as an induction coil, configured to wirelessly transmit power to a wireless power receiving antenna, such as an induction coil, of the adapter.

53. The portable battery pack charging system according to any one of embodiments 50-52, wherein the charger comprises or is attached to a self-contained power supply.

54. The portable battery pack charging system according to embodiment 53, wherein the self-contained power supply comprises a plurality of rechargeable battery cells.

55. The portable battery pack charging system according to embodiment 54, wherein the rechargeable battery cells of the charger have a higher charge storage capacity than battery cells of the battery pack and output a lower nominal current than the battery cells of the battery pack.

56. The portable battery pack charging system according to any one of embodiments 50-55, further comprising means for attaching the charger to a user.

57. The portable battery pack charging system according to embodiment 56, wherein the attaching means comprises a harness configured to detachably attach the charger to a limb or to the torso or back of the user, such as a strap having a detachable hook and loop fastener, e.g., Velcro (R), a strap having a detachable clasp or fastener, a belt or a backpack.

58. The portable battery pack charging system according to embodiment 56 or 57, wherein the attaching means further comprises one of:

(i) a belt hook receiver comprising the at least one charging terminal configured to connect with the at least one charging terminal receiver of the adapter or
(ii) the wireless power transmitting antenna configured to wirelessly transmit power to the wireless power receiving antenna of the adapter.
59. The portable battery pack charging system according to embodiment 58, wherein the belt hook receiver or the wireless power transmitting antenna is configured to be attached to a tool belt worn by the user or is integral with the tool belt.
60. The portable battery pack charging system according to any one of embodiments 50-59, further comprising charge control circuitry configured to determine the charging current supplied to the battery pack.
61. The portable battery pack charging system according to embodiment 60, wherein the charge control circuitry is located in the adapter and/or in the battery pack.
62. The portable battery pack charging system according to embodiment 60, wherein the charge control circuitry is located in the charger.
63. The portable battery pack charging system according to any one of embodiments 50-62, wherein the charger stores energy sufficient to fully recharge the battery pack at least one time, more preferably at least five times and even more preferably at least ten times.
64. The portable battery pack charging system according to any one of embodiments 50-63, wherein the charger further comprises a proximity sensor configured to output a signal, e.g., a charging initiation signal, when the charger, or at least a charging terminal or wireless power transmitting antenna thereof, is proximal to the adapter, such as a mechanical contact, a pressure sensor or switch, a radio frequency identification (RFID) device, a magnet or magnetic field sensor, such as a reed switch or a Hall sensor, an electrical resistance or capacitive sensor.
65. The portable battery pack charging system according to embodiment 64, wherein the proximity sensor is disposed in or on a belt hook receiver of the charger.
66. The portable battery pack charging system according to embodiment 64 or 65, wherein the proximity sensor comprises a magnetic field sensor coupled to a controller of the charger and wherein the adapter comprises a magnet.
67. The portable battery pack charging system according to embodiment 64 or 65, wherein the proximity sensor comprises a RFID interrogator coupled to a controller of the charger and wherein the adapter comprises a RFID tag.
70. A portable system for recharging a battery pack of a power tool, e.g., a hand-held power tool, comprising:
a charger configured or adapted to supply power for recharging at least one battery cell in the battery pack, and
means for attaching the charger to a user.
71. The portable system according to embodiment 70, wherein the charger comprises or is attached to a self-contained power supply.
72. The portable system according to embodiment 71, wherein the self-contained power supply comprises a plurality of rechargeable battery cells.
73. The portable system according to embodiment 72, wherein the rechargeable battery cells of the charger have a higher charge storage capacity than battery cells of the battery pack and output a lower nominal current than the battery cells of the battery pack.
74. The portable system according to any one of embodiments 70-73, wherein the attaching means comprises a harness configured to detachably attach the charger to a limb or to the torso or back of the user, such as a strap having a detachable hook and loop fastener, e.g., Velcro (R), a strap having a detachable clasp or fastener, a belt or a backpack.
75. The portable system according to any one of embodiments 70-74, wherein the attaching means further comprises one of:
(i) a belt hook receiver comprising the at least one charging terminal configured to communicate charging current via a wired connection or
(ii) a wireless power transmitting antenna configured to wirelessly transmit power for use in generating a charging current.
76. The portable system according to embodiment 75, wherein the wireless power transmitting antenna comprises an induction coil.
77. The portable system according to embodiment 75 or 76, wherein the belt hook receiver or the wireless power transmitting antenna is configured to be attached to a tool belt worn by the user or is integral with the tool belt.
78. The portable system according to any one of embodiments 75-77, wherein the belt hook receiver is configured or adapted to engage a belt hook attached to the battery pack.
79. The portable system according to embodiment 78, wherein the belt hook receiver further comprises a proximity sensor configured to output a signal, e.g., a charging initiation signal, when the charging terminal or the wireless power transmitting antenna is proximal to the belt hook attached to the battery pack, the proximity sensor including, but not being limited to, a mechanical contact, a pressure sensor or switch, a radio frequency identification (RFID) device, a magnet or magnetic field sensor, such as a reed switch or a Hall sensor, and/or an electrical resistance or capacitive sensor.
80. The portable system according to any one of embodiments 70-79, further comprising:
a battery pack connected to a belt hook that includes one of a charging terminal receiver or a wireless power receiving antenna.
81. The portable system according to embodiment 80, wherein the wireless power receiving antenna comprises an induction coil.
82. The portable system according to embodiment 80 or 81, wherein the belt hook is attached to an adapter that is electrically connected to at least one battery cell of the battery pack.
83. The portable system according to embodiment 82, wherein the adapter comprises wires configured or adapted to conduct a charging current from the charger to the battery pack.
84. The portable system according to embodiment 83, wherein the adapter further comprises a controller and a memory configured or adapted to control the battery charging operation.
85. The portable system according to any one of embodiments 70-84, further comprising charge control circuitry configured to determine the charging current supplied to the battery pack.
86. The portable system according to embodiment 85, wherein the charge control circuitry is located in the charger.

87. The portable system according to embodiment 85, wherein the charge control circuitry is located in the battery pack or in the adapter electronically connected to the battery pack.
88. The portable system according to any one of embodiments 80-87, wherein the charger stores sufficient energy to fully recharge the battery pack at least one time, more preferably at least five times and even more preferably at least ten times.
90. A method for recharging a battery pack comprising:
    attaching a portable charger to a user, the portable charger comprising or being attached to a self-contained power supply and a first charging port of the portable charger is disposed on a belt worn by the user,
    hanging the battery pack on the belt while the battery pack is physically engaged and in electrical communication with a power tool, and
    initiating a transfer of power from the charger to the battery pack when the first charging port is proximal to a second charging port that is in electrical communication with at least one battery cell of the battery pack.
91. The method according to embodiment 90, wherein the first and second charging ports comprise complementary terminals configured or adapted to conduct a current from the charger to the at least one battery cell of the battery pack, more preferably a charging current.
92. The method according to embodiment 90, wherein the first charging port comprises a wireless power transmitting antenna and the second charging port comprises a wireless power receiving antenna.
93. The method according to embodiment 92, wherein the wireless power transmitting antenna and the wireless power receiving antenna each comprise an induction coil.
94. The method according to embodiment 92 or 93, wherein the transfer of power is performed by induction coupling, more preferably resonant induction coupling.
95. The method according to any one of embodiments 90-94, further comprising detecting the proximity of the first charging port to the second charging port and initiating the transfer of power upon detection of the proximity.
96. The method according to embodiment 95, further comprising terminating the transfer of power upon detecting that the first charging port is no longer proximal to the second charging port.
97. The method according to embodiment 95 or 96, wherein proximity is detected based upon a magnetic field, pressure, a radio signal, an electrical resistance or capacitance, or a mechanical movement.
98. The method according to any one of embodiments 90-97, wherein the second charging port is disposed on or in a belt hook attached to the battery pack.
99. The method according to embodiment 98, wherein the belt hook is attached to an adapter that is physically engaged with the battery pack or the power tool.
100. The method according to embodiment 98, wherein the adapter controls the charging operation.
101. The method according to embodiment 98, wherein the belt hook is directly attached to the battery pack.
102. The method according to embodiment 101, wherein the charger controls the charging operation.
103. The method according to embodiment 101, wherein a controller of the battery pack controls the charging operation.
105. A method for recharging a battery pack comprising:
    transferring power from the charger to a battery pack attached to a power tool when a first charging port of the charger is proximal to a second charging port electrical communicating with at least one battery cell of the battery pack.
106. The method according to embodiment 105, wherein the first and second charging ports are disposed on or adjacent a belt worn by the user.
107. The method according to embodiment 105 or 106, wherein the charger is attached to the user while the user performs power tool operations and comprises or is attached to a self-contained DC power supply.
110. An adapter for a power tool powered by a detachable battery pack, comprising:
    at least one communication port configured to electrically communicate with a controller, such as at least one microprocessor, located in the power tool and/or in the battery pack, and
    means for wirelessly communicating information concerning the power tool and/or the battery pack to an external device.
111. The adapter according to embodiment 110, wherein the means for wirelessly communicating information comprises one or more of:
    a wireless communication device, such as a wireless local area network (WLAN) device, e.g., WiFi (i.e. operating according to the wireless communication protocol enumerated by IEEE 802.11),
    a Bluetooth device,
    a radio frequency (RF) communication device, or
    a cellular or mobile telephone device.
112. The adapter according to embodiment 100 or 101, wherein the communicated information is one or any arbitrary combination of:
    the measured remaining battery capacity and/or the estimated number of additional power tool operations of the same type that can be performed with the remaining battery capacity according to any one of embodiments 7-12,
    the value(s) for one or more operating parameters, e.g., a maximum current limit, stored in a memory of the battery pack and/or the power tool according to embodiment 13,
    the maintenance information according to embodiment 15 or 16,
    the detected discharge current and/or power tool recommendation according to embodiments 18-20,
    the anti-theft function or key according to embodiments 22 or 23,
    the person responsible for administering or managing the adapter, battery pack and/or power tool according to embodiment 24,
    the information to change the charging speed of the battery pack according to embodiment 25 or 26
    the value(s) indicative of the operational state of the battery pack and/or the power tool according to embodiment 27 or 28.
113. The adapter according to any one of embodiments 110-112, wherein the external device is a smart phone.
114. The adapter according to any one of embodiments 110-112, wherein the external device comprises a portable computing device, such as a PDA, tablet computer or laptop computer.

115. The adapter according to any one of embodiments 110-112, wherein the external device comprises a desktop computer, server or a mainframe computer.
116. The adapter according to any one of embodiments 110-115, further comprising an input device, such as a touch pad, touch screen, push button(s) and/or toggle switch, the input device being configured or adapted to enable a user to input instructions directly into the adapter.
117. The adapter according to any one of embodiments 110-116, further comprising a display.
118. The adapter according to embodiment 117, wherein the display comprises a liquid crystal display (LCD), a light-emitting diode (LED) display, such as an organic light-emitting diode (OLED) display, or an organic electroluminescent (EL) display.
119. The adapter according to embodiment 117 or 118, wherein the display is touch pad or touch panel.
120. The adapter according to any one of embodiments 117-119, wherein the display is configured to visually indicate any of the information, values or functions described in the preceding or following embodiments, such as the charge level (remaining battery capacity) of the battery pack, an alarm indicating overheating, the predicted number of additional power tool operations that may be performed based upon the remaining battery capacity of the battery pack, the name of the administrator of the power tool and the battery pack, maintenance information, a charging speed value, a maximum charged value of the battery pack, a detected discharge current value, an operating parameter or any value(s) indicative of the operational state of the battery pack and/or the power tool.
121. The adapter according to any one of embodiments 110-120, further comprising means for obtaining power from a charger, the adapter being configured to supply a current to the battery pack in order to recharge one or more battery cells located in the battery pack.
122. The adapter according to embodiment 121, wherein the means for obtaining power from a charger comprises at least one charging terminal receiver configured to connect to at least one charging terminal of the charger and to conduct current from the charger to the adapter.
123. The adapter according to embodiment 121, wherein the means for obtaining power from a charger comprises at least one wireless power receiving antenna, such as an induction coil, configured to generate a current when brought into proximity with at least one wireless power transmitting antenna, such as an induction coil, of the charger.
124. The adapter according to any one of embodiments 121-123, further comprising a belt hook configured to hang on a tool belt worn by a user, wherein the means for obtaining power from the charger is disposed in or on the belt hook.
125. The adapter according to any one of embodiments 121-124, further comprising a proximity sensor configured to output a signal, e.g., a charging initiation signal, when the charger is proximal to the adapter, such as a mechanical contact, a pressure sensor or switch, a radio frequency identification (RFID) device, a magnet or magnetic field sensor, such as a reed switch or a Hall sensor, an electrical resistance or capacitive sensor.
126. The adapter according to any one of embodiments 110-125, wherein the adapter is configured to be at least partially disposed in a space between a power tool housing and the battery pack when the power tool housing and battery pack are attached to each other.
127. The adapter according to any one of embodiments 110-126, wherein the adapter is configured to be attachable to and detachable from the power tool housing only when the battery pack is detached from the housing.
128. The adapter according to any one of embodiments 110-127, wherein:
the adapter is configured to be attached to and detached from the power tool housing in a first direction, preferably a longitudinal direction relative to a handle of the power tool,
the battery pack is configured to be attached to and detached from the power tool housing in a second direction, preferably a lateral direction relative to the handle of the power tool, and
the first direction is substantially perpendicular to the second direction.
129. The adapter according to any one of embodiments 110-128, wherein the adapter is affixable to the housing via a threaded fastener, e.g. a screw or a bolt and wherein the adapter optionally comprises a cylindrical portion, through which the threaded fastener is insertable in order to tighten the adapter onto the power tool housing.
130. A method comprising:
wirelessly communicating information between an external device and one of a power tool and a battery pack.
131. The method according to embodiment 130, wherein the information is communicated via an adapter physically and electronically connected to the power tool and/or to the battery pack.
132. The method according to embodiment 131, wherein the adapter receives a wireless signal from the external device and communicates an electronic signal to the power tool and/or to the battery pack.
133. The method according to any one of embodiments 130-132, wherein the external device is a smart phone.
134. The method according to any one of embodiments 130-132, wherein the external device comprises a portable computing device, such as a PDA, tablet computer or laptop computer.
135. The method according to any one of embodiments 130-132, wherein the external device comprises a desktop computer, server or a mainframe computer.
136. The method according to any one of embodiments 130-135, wherein the communicated information comprises a measured remaining battery capacity and/or an estimated number of additional power tool operations of the same type that can be performed with the remaining battery capacity.
137. The method according to any one of embodiments 130-136, wherein the communicated information comprises one or more values corresponding to one or more operating parameters, e.g., a maximum current limit, stored in a memory of the battery pack and/or the power tool.
138. The method according to any one of embodiments 130-137, wherein the communicated information comprises maintenance information for the power tool and/or the battery pack.
139. The method according to embodiment 138, wherein the maintenance information includes the date and/or the result of the last maintenance check/inspection.

140. The method according to embodiment 138 or 139, wherein the maintenance information includes:
the accumulated or total usage (operation) time of the power tool and/or the battery pack (40),
the available charge or charge status (e.g., remaining battery capacity) of the battery pack
the number of charging cycles experienced by the battery pack, and/or
the condition of one or more battery cells in the battery pack, e.g., as calculated from an internal impedance measurement of the battery cell(s).

141. The method according to any one of embodiments 138-140, wherein the maintenance information includes:
the expected remaining service life of one or more replaceable parts in the power tool and/or the battery pack,
a maintenance schedule for the power tool and/or the adapter and/or the battery pack,
a usage history of the power tool and/or the adapter and/or the battery pack,
the name of a person responsible for administering or managing the adapter, battery pack and/or power tool, and/or
a serial number of the battery pack and/or the power tool.

142. The method according to any one of embodiments 138-141, wherein the maintenance information includes:
the voltage of one or more (e.g., either individually or a summation of two or more) battery cell(s),
the discharge current of one or more (e.g., either individually or a summation of two or more) battery cell(s), and/or
the temperature of one or more (e.g., either individually or a summation of two or more) battery cell(s).

143. The method according to any one of embodiments 138-142, wherein the maintenance information includes the number of times that the battery pack and/or the power tool has been switched ON and/or switched OFF.

144. The method according to any one of embodiments 138-143, wherein the maintenance information includes the amount of charging or discharging that has occurred within a predetermined time period, e.g., the amount of discharged power during the previous 2 hours.

145. The method according to any one of embodiments 130-144, wherein the communicated information comprises a detected discharge current and/or a power tool recommendation generated based upon the detected discharge current.

146. The method according to any one of embodiments 130-145, wherein the communicated information comprises an anti-theft function or key.

147. The method according to any one of embodiments 130-146, wherein the communicated information comprises a person responsible for administering or managing the adapter, battery pack and/or power tool.

148. The method according to any one of embodiments 130-147, wherein the communicated information comprises an instruction to change a charging speed of the battery pack, e.g., by increasing a charging current and/or a battery pack temperature threshold.

149. The method according to any one of embodiments 130-148, wherein the communicated information comprises one or more values indicative of the operational state of the battery pack and/or the power tool.

150. The method according to any one of embodiments 130-149, wherein the communicated information comprises one or more values indicative of a maximum charged level of the battery pack.

151. A power tool system comprising:
a hand-held power tool comprising a housing having a battery pack interface, an electrically-driven device and a first connector,
a battery pack is adapted or configured to be detachably attached, e.g., directly, to the battery pack interface and to supply current to the electrically-driven device, and
an adapter comprising a second connector configured to be physically and electrically connected with the first connector in a detachable manner, the adapter being configured to:
receive power from the battery pack via the hand-held power tool and
provide at least one additional electrical function to the hand-held power tool or to perform at least one additional electrical function that the hand-held power tool is not otherwise capable of performing,
wherein the adapter is at least partially disposed in a space between the housing and the battery pack when the housing and battery pack are attached to each other.

152. The power tool system as in embodiment 151, wherein the battery pack is configured to be attached to and detached from the housing regardless of whether the adapter is attached to or detached from the housing.

153. The power tool system as in embodiment 151 or 152, wherein the adapter is configured to be attachable to and detachable from the housing only when the battery pack is detached from the housing.

154. The power tool system as in any one of embodiments 151-153, wherein:
the adapter is configured to be slidably attached to and detached from the housing in a first direction, preferably a longitudinal direction relative to a handle of the power tool,
the battery pack is configured to be slidably attached to and detached from the housing in a second direction, preferably a lateral direction relative to the handle of the power tool, and
the first direction is substantially perpendicular to the second direction.

155. The power tool system as in any one of embodiments 151-154, wherein the housing and the battery pack together define an opening therebetween that visibly exposes at least a portion of the adapter while the adapter is attached to the housing (e.g., the opening is defined through an outer surface of the hand-held power tool and/or the battery pack).

156. The power tool system as in embodiment 155, wherein the adapter is configured to fit in the opening with no significant clearance (e.g. with the minimum amount of clearance necessary for manufacturing tolerance purposes) when the adapter and the battery pack are attached to the housing.

157. The power tool system as in embodiment 155 or 156, further comprising:
a dummy adapter configured to be detachably attached to the housing instead of the adapter, the dummy adapter fitting in the opening with no substantial clearance when the dummy adapter and the battery pack are attached to the housing.
158. The power tool system as in embodiment 157, wherein the dummy adapter is configured to cover the first connector when the dummy adapter is attached to the housing.
159. The power tool system as in any one of embodiments 151-158, wherein:
    the first connecter is a female connector that comprises at least one contact pin and a peripheral wall that surrounds the at least one contact pin, and
    the second connector is a male connector that comprises at least one hole configured to receive the at least one contact pin and at least one contact plate (contact terminal) located within the at least one hole configured to physically and electrically contact the at least one contact pin.
160. The power tool system as in any one of embodiments 151-159, wherein the adapter is affixable to the housing via a threaded fastener, e.g. a screw or a bolt.
161. The power tool system as in embodiment 160, wherein the adapter is primarily positioned with respect to the housing by the coupling of the first and second connectors and is secondarily positioned with respect to the housing by the tightened threaded fastener.
162. The power tool system as in embodiment 160 or 161, wherein the adapter comprises a cylindrical portion, through which the threaded fastener is insertable in order to tighten the adapter onto the power tool housing.
163. The power tool system as in embodiment 162, wherein the cylindrical portion is exposed through an outer surface of the power tool and is configured to be attached to a strap.
164. The power tool system as in any one of embodiments 151-163, wherein
    the power tool system comprises a plurality of adapters, and
    each adapter is configured to attach to the housing and to provide at least one different electrical function to the hand-held power tool or to perform at least one different electrical function.
165. The power tool system according to any one of embodiments 151-164, wherein the adapter is configured or adapted to:
    wirelessly communicate information to and/or from the power tool, such as any of the information identified above or below, including wirelessly communicating with an external device, such as a base station, a workstation, a computer, a personal data assistant, a smart phone, etc.
166. The power tool system according to any one of embodiments 151-165, wherein the adapter is configured or adapted to:
    display information concerning the power tool on a display, such as any of the information identified above or below.
167. The power tool system according to any one of embodiments 151-166, wherein the adapter is configured or adapted to:
    measure and/or display and/or communicate remaining battery capacity of the battery pack and/or the estimated number of additional power tool operations of the same type that can be performed with the remaining battery capacity.
168. The power tool system according to any one of embodiments 151-167, wherein the adapter is configured or adapted to:
    measure and/or display and/or communicate the value(s) for one or more operating parameters, e.g., a maximum current limit, stored in a memory of the battery pack and/or the power tool.
169. The power tool system according to any one of embodiments 151-168, wherein the adapter is configured or adapted to:
    measure and/or display and/or communicate maintenance information, such as one or more of (i) a date of a last maintenance check/inspection, (ii) the result of the last maintenance check/inspection, (iii) the accumulated or total usage (operation) time of the power tool and/or the battery pack, (iv) the available charge or charge status (remaining battery capacity) of the battery pack, (v) the number of charging cycles experienced by the battery pack, (vi) the condition of one or more battery cells in the battery pack, e.g., as calculated from an internal impedance measurement of the battery cell(s), (vii) the expected remaining service life of one or more replaceable parts in the power tool and/or the battery pack and/or (viii) a maintenance schedule for the power tool and/or the battery pack.
170. The power tool system according to any one of embodiments 151-169, wherein the adapter is configured or adapted to:
    measure and/or display and/or communicate a detected discharge current and/or power tool recommendation.
171. The power tool system according to any one of embodiments 151-170, wherein the adapter is configured or adapted to:
    provide an anti-theft function or key.
172. The power tool system according to any one of embodiments 151-171, wherein the adapter is configured or adapted to:
    identify or communicate the person responsible for administering or managing the adapter, battery pack and/or power tool.
173. The power tool system according to any one of embodiments 151-172, wherein the adapter is configured or adapted to:
    input and/or display and/or communicate information concerning a change of the charging speed of the battery pack.
174. The power tool system according to any one of embodiments 151-173, wherein the adapter is configured or adapted to:
    measure and/or display and/or communicate value(s) indicative of the operational state of the battery pack and/or the power tool.
175. The power tool system according to any one of embodiments 151-174, further comprising a light coupled to a body of the adapter via a flexible atm.
176. The power tool system according to any one of embodiments 151-164, wherein the adapter is configured or adapted to:
    wirelessly communicate information to and/or from the power tool, such as any of the information identified above or below, including wirelessly communicating with an external device, such as a base station, a workstation, a computer, a personal data assistant, a smart phone, etc., display information concerning the power tool on a display, such as any of the information identified above or below, measure and/or display and/or communicate remaining battery capacity of the battery pack and/or the estimated number of additional power tool operations of the same type that can be performed with the remaining battery capacity, measure and/or display and/or communicate the value(s) for one or more operating parameters, e.g., a maximum current limit, stored in a memory of the battery pack and/or the power tool, measure and/or display and/or communicate maintenance information, such as one or more of (i) a date of a last maintenance check/inspection, (ii) the result of the last maintenance check/inspection, (iii) the accumulated or total usage (operation) time of the power tool and/or the battery pack, (iv) the available charge or charge status (remaining battery capacity) of the battery pack, (v) the number of charging cycles experienced by the battery pack, (vi) the condition of one or more battery cells in the battery pack, e.g., as calculated from an internal impedance measurement of the battery cell(s), (vii) the expected remaining service life of one or more replaceable parts in the power tool and/or the battery pack and/or (viii) a maintenance schedule for the power tool and/or the battery pack, measure and/or display and/or communicate a detected discharge current and/or power tool recommendation, provide an anti-theft function or key, identify or communicate the person responsible for administering or managing the adapter, battery pack and/or power tool, input and/or display and/or communicate information concerning a change of the charging speed of the battery pack, and/or measure and/or display and/or communicate value(s) indicative of the operational state of the battery pack and/or the power tool, and/or perform or execute any other function described in the specification above.

177. The power tool system any one of embodiments 151-176, wherein:
the power tool system comprises a plurality of hand-held power tools, and
each adapter is configured to attach to the housing of any one of the hand-held power tools and provide a different function to the hand-held power tool.

178. An adapter according to any one of embodiments 151-177 without the power tool and battery pack.

181. An adapter for a hand-held power tool powered by a battery pack, the adapter comprising:
a connector configured to be physically and electrically connected in a detachable manner with a corresponding connector disposed on the hand-held power tool,
means for receiving power from the battery pack via the hand-held power tool and the connector,
means for performing at least one additional electrical function that the hand-held power tool is not otherwise capable of performing,
wherein the adapter is configured to be at least partially disposed in a space between a housing of the hand-held power tool and the battery pack when the housing and battery pack are attached to each other.

182. The adapter as in embodiment 181, wherein the adapter is configured to be attachable to and detachable from the housing only when the battery pack is detached from the housing.

183. The adapter as in embodiment 181 or 182, wherein:
the adapter is configured to be slidably attached to and detached from the housing in a first direction, preferably a longitudinal direction relative to a handle of the power tool,
the battery pack is configured to be slidably attached to and detached from the housing in a second direction, preferably a lateral direction relative to the handle of the power tool, and
the first direction is substantially perpendicular to the second direction.

184. The adapter as in any one of embodiments 181-183, wherein at least a portion of the adapter is configured to be visibly exposed through an opening defined by the housing and the battery pack while the adapter is attached to the housing (e.g., the opening is defined through an outer surface of the hand-held power tool and/or the battery pack).

185. The adapter as in embodiment 184, wherein the adapter is configured to fit in the opening with no significant clearance (e.g. with the minimum amount of clearance necessary for manufacturing tolerance purposes) when the adapter and the battery pack are attached to the housing.

186. The adapter as in any one of embodiments 181-185, wherein:
the connecter is a female connector that comprises at least one contact pin and a peripheral wall that surrounds the at least one contact pin, and
the corresponding connector is a male connector that comprises at least one hole configured to receive the at least one contact pin and at least one contact plate (contact terminal) located within the at least one hole configured to physically and electrically contact the at least one contact pin.

187. The adapter as in any one of embodiments 181-186, wherein the adapter is configured to be affixable to the housing via a threaded fastener, e.g. a screw or a bolt.

188. The adapter as in embodiment 187, wherein the adapter is configured to be primarily positioned with respect to the housing by the coupling of the connectors and is secondarily positioned with respect to the housing by the tightened threaded fastener.

189. The adapter as in embodiment 187 or 188, wherein the adapter comprises a cylindrical portion, through which the threaded fastener is insertable in order to tighten the adapter onto the power tool housing.

190. The adapter as in embodiment 189, wherein the cylindrical portion is configured to be exposed through an outer surface of the power tool and is configured to be attached to a strap.

191. The adapter as in any one of embodiments 181-190, further comprising the features of any one of the adapters according to embodiment 1, 2 or 7-49.

192. The adapter as in any one of embodiments 181-191, further comprising a light coupled to a body of the adapter via a flexible arm.

REFERENCE SIGNS LIST

1, 1', 1", 1''', 1'''', 1''''': power tool system
10, 10': cordless power tool
11: electronic unit 12: controller
13: circuit board
14: discharge detector
16: memory
18: communicator
20: power FET
22: battery terminals
24: adapter communication terminal(s)
25: adapter power terminal(s)
26: battery pack communication terminal(s) (I/O terminal(s))
28: trigger switch
30: tool chuck
32: housing
33: slots
34: battery pack interface
35: space between power tool housing and battery pack
36: opening
37: female connector
38: contact pins
39: peripheral wall
40, 40': battery pack
42: controller
44: charge/discharge detector
46: memory
48: communicator
50: battery cell(s)
52: battery terminals
54: adapter communication terminal(s)
55: adapter power terminal(s)
56: power tool communication terminal(s) (I/O terminal(s))
58: switch
60: charging terminals
70, 70', 70'', 70''', 70'''', 70''''': adapter
72: controller
73: circuit board
74: communication terminal(s)
75: power terminal(s)
76: memory
78: communicator
79: antenna
80: display
81: LCD driver
82: battery terminals
84: charging terminals
85: charging terminal receivers
86: charger communication terminal(s) (I/O terminal(s))
88: switch
90: diode
91: cylindrical portion
92: threaded fastener
93: ribs
94: male connector
96: holes
97: contact terminals
98: projecting bodies
100: external device
102: controller
104: display
106: memory
108: communicator
120: charger
122: controller
124: adapter communication terminal(s)
126: memory
128: communicator
130: power source
132: charging terminals
138: switch
140: DC power supply
142: flexible power cord
144: belt
146: belt hook receiver
148: belt hook
150: strap
152: light
153: LED
154: flexible arm
155: contact current generator
156: ON/OFF switch
158: FET
170: dummy adapter
M: electric motor of power tool

The invention claimed is:

1. A power tool comprising:
 a motor;
 a controller;
 a power tool housing accommodating the motor and the controller,
 a battery pack interface defined on and/or in the power tool housing and electrically connected to the motor and the controller;
 a receptacle defined on and/or in the power tool housing to removably accommodate a wireless communication adapter such that the wireless communication adapter is disposed entirely within a shell of the power tool and no portion of the wireless communication adapter extends beyond an outer contour of the power tool housing, and
 at least one communication terminal disposed within the receptacle and configured to be electrically connected to at least one communication terminal on the wireless communication adapter to establish a data communication path with the controller so that the wireless communication adapter accesses data stored in the controller,
 wherein the controller is configured to output to the at least one communication terminal disposed within the receptacle at least one signal selected from the group consisting of:
  a charge level of a battery pack attached to the battery pack interface,
  a number of hours of operation of the power tool,
  a power tool overheated alert, and/or
  a battery pack overloaded alert.

2. The power tool according to claim 1, wherein the controller is configured to change an operating parameter of the power tool in response to receiving an operating parameter signal via the at least one communication terminal.

3. The power tool according to claim 1, wherein the controller is configured to output a serial number of the power tool to the at least one communication terminal.

4. The power tool according to claim 1, further comprising means for detachably connecting the wireless communication adapter to the power tool housing.

5. The power tool according to claim 4, wherein the means for detachably connecting the wireless communication adapter to the power tool housing includes one of a rib that engages in a slot defined in the receptacle or one or more slide rails.

6. The power tool according to claim 1, wherein the controller is configured to output to the at least one communication terminal disposed within the receptacle all of the following signals:

a charge level of a battery pack attached to the battery pack interface, a number of hours of operation of the power tool, a power tool overheated alert, and a battery pack overloaded alert.

7. The power tool according to claim 6, wherein the controller is configured to change an operating parameter of the power tool in response to receiving an operating parameter signal via the at least one communication terminal.

8. The power tool according to claim 7, wherein the controller is configured to output a serial number of the power tool to the at least one communication terminal.

9. The power tool according to claim 8, further comprising means for detachably connecting the wireless communication adapter to the power tool housing.

10. The power tool according to claim 9, wherein the means for detachably connecting the wireless communication adapter to the power tool housing includes one of a rib that engages in a slot defined in the receptacle or one or more slide rails.

11. The power tool according to claim 1, wherein a slot is defined in the receptacle and is configured to receive a rib formed on the wireless communication adapter.

12. The power tool according to claim 1, further comprising:

at least one power terminal disposed within the receptacle and configured to conduct current from the battery pack interface to at least one power terminal on the wireless communication adapter.

13. The power tool according to claim 1, wherein the receptacle is configured to receive the wireless communication adapter, which has a self-contained power supply.

14. The power tool according to claim 13, wherein the self-contained power supply is a battery disposed in the wireless communication adapter.

15. The power tool according to claim 14, further comprising:

at least one power terminal disposed within the receptacle and configured to conduct current from the battery pack interface to at least one power terminal on the wireless communication adapter.

16. The power tool according to claim 1, further comprising the wireless communication adapter, wherein the wireless communication adapter has a self-contained power supply.

17. The power tool according to claim 16, wherein the self-contained power supply is a battery disposed within the wireless communication adapter.

18. The power tool according to claim 17, wherein the controller is configured to output the charge level of the battery pack attached to the battery pack interface to the at least one communication terminal disposed within the receptacle.

19. The power tool according to claim 18, wherein the controller is configured to output the power tool overheated alert and the battery pack overloaded alert to the at least one communication terminal disposed within the receptacle.

20. The power tool according to claim 19, further comprising:

at least one power terminal disposed within the receptacle and configured to conduct current from the battery pack interface to at least one power terminal on the wireless communication adapter.

* * * * *